(12) United States Patent
Vishlitzky et al.

(10) Patent No.: US 7,340,461 B2
(45) Date of Patent: Mar. 4, 2008

(54) DEACTIVATING VIRTUAL DEVICES AND ROLLING BACKUP

(75) Inventors: Natan Vishlitzky, Brookline, MA (US); Hana Moreshet, Framingham, MA (US); Haim Kopylovitz, Newton, MA (US); Bruce A. Pocock, Titusville, FL (US); Douglas E. LeCrone, Hopkinton, MA (US)

(73) Assignee: EMC Corporation, Hopkinton, MA (US)

(*) Notice: Subject to any disclaimer, the term of this patent is extended or adjusted under 35 U.S.C. 154(b) by 721 days.

(21) Appl. No.: 10/306,268

(22) Filed: Nov. 27, 2002

(65) Prior Publication Data

US 2003/0195864 A1    Oct. 16, 2003

Related U.S. Application Data

(63) Continuation-in-part of application No. 10/120,016, filed on Apr. 10, 2002.

(51) Int. Cl.
*G06F 17/30* (2006.01)

(52) U.S. Cl. .......................... 707/8; 707/100

(58) Field of Classification Search ........ 707/200–205, 707/3–5, 2, 8, 100; 711/1, 6, 104, 113, 118, 711/100, 143
See application file for complete search history.

(56) References Cited

U.S. PATENT DOCUMENTS

| | | | |
|---|---|---|---|
| 4,853,843 A * | 8/1989 | Ecklund | 707/203 |
| 5,474,608 A * | 12/1995 | Beisswanger | 118/103 |
| 5,819,292 A | 10/1998 | Hitz et al. | |
| 5,915,264 A | 6/1999 | White et al. | |
| 6,076,148 A | 6/2000 | Kedem et al. | |
| 6,636,874 B1 * | 10/2003 | Douceur et al. | 707/201 |
| 6,857,057 B2 * | 2/2005 | Nelson et al. | 711/203 |
| 7,249,130 B2 * | 7/2007 | Vishlitzky et al. | 707/8 |
| 7,266,572 B2 * | 9/2007 | Vishlitzky et al. | 707/201 |

OTHER PUBLICATIONS

U.S. Appl. No. 10/134,420, filed Apr. 29, 2002.

* cited by examiner

*Primary Examiner*—Cheryl Lewis
(74) *Attorney, Agent, or Firm*—Muirhead and Saturnelli, LLC

(57) ABSTRACT

Handling data includes providing a first storage area of a first type that contains sections of data, providing a second storage area of the first type that contains sections of data, providing a third storage area of a second type where the second type has, for each section thereof, a pointer to one of: a corresponding section of data of the first storage area and a corresponding section of data of the second storage area, causing the third storage area to be not available for accessing, and after causing the third storage area to not be available for accessing, providing data from the second storage area corresponding to pointers of the third storage area that point to sections of the second storage area.

19 Claims, 31 Drawing Sheets

RESTORE TO NEW STD

RESTORE TO OLD STD DEV

STD AND VIR DEVICE

RESTORE TO MIRROR

RESTORE TO NEW VIR DEV

DEACTIVATING VIRTUAL DEVICES AND ROLLING BACKUP

CROSS REFERENCE TO RELATED APPLICATIONS

This application is a continuation-in-part of U.S. patent application Ser. No. 10/120,016 filed on Apr. 10, 2002 (pending).

BACKGROUND OF THE INVENTION

1. Technical Field

This application relates to computer storage devices, and more particularly to the field of providing copies of portions of data stored on a computer storage device.

2. Description of Related Art

Host processor systems may store and retrieve data using a storage device containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. The logical volumes may or may nor correspond to the actual disk drives.

In some instances, it may desirable to provide a copy of a logical volume where the copy is then accessed by other processes. For example, to test new software on actual stored data, a copy of a logical volume containing the data may be made and the copy, as opposed to the original data, may be used to test new software. Once the test is complete, the copy may be eliminated. Thus, the new software is tested on actual data without affecting the actual data. This reduces the likelihood that testing new software and/or functionality will corrupt actual data.

One difficulty with making such copies is that they require as much storage space as the logical volume from which the data is obtained since the copy process simply creates a new volume containing all the data of the original volume. In addition, in some instances, the differences between the original volume and the copy are minimal. Thus, the extra storage space required for such a copy of a logical volume is used somewhat inefficiently since it merely duplicates already-existing data. Accordingly, it would be desirable to provide a mechanism for copying data in a way that uses storage space efficiently.

SUMMARY OF THE INVENTION

According to the present invention, accessing stored data includes providing a virtual storage area having a table of pointers that point to sections of at least two other storage areas, where the virtual storage area contains no sections of data, in response to a request for accessing data of the virtual storage area, determining which particular one of the other storage areas contain the data, and accessing the data on the particular one of the other storage areas using the table of pointers. Accessing stored data may also include associating a first one of the other storage areas with the virtual storage area, where the virtual storage area represents a copy of data of the first one of the other storage areas. Accessing stored data may also include causing all of the pointers of the table to initially point to sections of the first one of the other storage areas when the virtual storage area is initially associated with the first one of the other storage areas. Accessing stored data may also include, in response to a write to a first section on the first one of the other storage areas, copying data of the first section to a second section that is on a second one of the other storage areas and causing a corresponding one of the pointers of the table to point to the second section. Prior to copying data from the first section to the second section, the second section may be maintained as a free section containing no data. Accessing stored data may also include maintaining a doubly linked list of all free sections of the second one of the other storage areas. Accessing stored data may also include associating a data indicator with sections of the first one of the other storage areas, where the data indicator for a particular section indicates whether a write operation has been performed to the particular section after the first one of the other storage areas has been associated with the virtual storage area. Accessing stored data may also include, in response to a write to a first section on the first one of the other storage areas and the data indicator indicating that no write operation has been performed to the first section after the first one of the other storage areas has been associated with the virtual storage area, copying data of the first section to a second section that is on a second one of the other storage areas and causing a corresponding one of the pointers of the table to point to the second section. Accessing stored data may also include sending status information to a device that caused the write operation to be performed following copying the data from the first section to the second section. Each of the sections of data may be a track of data. Each of the storage areas may be a storage device.

According further to the present invention, accessing stored data includes providing a first virtual storage area having a first table of pointers that point to sections of at least two other storage areas, where the first virtual storage area contains no sections of data, associating a first one of the other storage areas with the first virtual storage area, where the first virtual storage area represents a copy of data of the first one of the other storage areas at a first point in time, providing a second virtual storage area having a second table of pointers that point to sections of at least two other storage areas, where the second virtual storage area contains no sections of data, associating the first one of the other storage areas with the second virtual storage area, where the first virtual storage area represents a copy of data of the first one of the other storage areas at a second point in time, in response to a request for accessing data of one of the virtual storage areas, determining which particular one of the other storage areas contain the data, and accessing the data on the particular one of the other storage areas using one of the tables of pointers. Accessing stored data may also include causing all of the pointers of the first table to initially point to sections of the first one of the other storage areas when the first virtual storage area is initially associated with the first one of the other storage areas and causing all of the pointers of the second table to initially point to sections of the first one of the other storage areas when the second virtual storage area is initially associated with the first one of the other storage areas. Accessing stored data may further include associating a first data indicator with sections of the first one of the other storage areas, where the first data indicator for a particular section of the first other one of the storage areas indicates whether a write operation has been performed to the particular section after the first one of the other storage areas has been associated with the first virtual storage area, and associating a second data indicator with sections of the first one of the other storage areas, where the second data indicator for a particular section of the first other one of the storage areas indicates whether a write operation has been performed to the particular section after the second one of the other storage areas has been associated with the second virtual storage area. Accessing stored data may also include, in response to a write to a first section that is on the first one of the other storage areas and the data indicator indicating that no write operation has been performed to the first section after the first one of the other storage areas has been associated with the first virtual storage area, copying data of the first section to a second section that is on a second one of the other storage areas and causing a corresponding one of the pointers of the first table to point to the second section. Accessing stored data may also include, in response to a write to a first section that is on the first one of the other storage areas and the data indicator indicating that no write operation has been performed to the first section after the first one of the other storage areas has been associated with the first and second virtual storage areas, copying data of the first section to a second section that is on a second one of the other storage areas and causing a corresponding one of the pointers of the first table and a corresponding one of the pointers of the second table to point to the second section. Accessing stored data may also include, in response to a write to the first virtual storage area corresponding to the second section, copying data from the second section to a third section. Accessing stored data may also include causing a corresponding one of the pointers of the first table to point to the third section. Accessing stored data may also include causing a corresponding one of the pointers of the second table to point to the third section. The first time may be the same as the second time. The first time may be different from the second time. Each of the sections of data may be a track of data. Each of the storage areas may be a storage device.

According further to the present invention, a computer program product includes executable code that provides a virtual storage area having a table of pointers that point to sections of at least two other storage areas, where the virtual storage area contains no sections of data, executable code that determines which particular one of the other storage areas contain the data in response to a request for accessing data of the virtual storage area, and executable code that accesses the data on the particular one of the other storage areas using the table of pointers. The computer program product may also include executable code that associates a first one of the other storage areas with the virtual storage area, where the virtual storage area represents a copy of data of the first one of the other storage areas. The computer program product may also include executable code that causes all of the pointers of the table to initially point to sections of the first one of the other storage areas when the virtual storage area is initially associated with the first one of the other storage areas. The computer program product may also include executable code that copies data of the first section to a second section that is on a second one of the other storage areas and causes a corresponding one of the pointers of the table to point to the second section in response to a write to a first section on the first one of the other storage areas. The computer program product may also include executable code that associates a data indicator with sections of the first one of the other storage areas, where the data indicator for a particular section indicates whether a write operation has been performed to the particular section after the first one of the other storage areas has been associated with the virtual storage area. The computer program product may also include executable code that copies data of the first section to a second section that is on a second one of the other storage areas and causes a corresponding one of the pointers of the table to point to the second section in response to a write to a first section on the first one of the other storage areas and the data indicator indicating that no write operation has been performed to the first section after the first one of the other storage areas has been associated with the virtual storage area. The computer program product may also include executable code that sends status information to a device that caused the write operation to be performed following copying the data from the first section to the second section. Each of the sections of data may be a track of data. Each of the storage areas may be a storage device.

According further to the present invention, a virtual storage device includes at least one table for associating the virtual storage device with a standard storage device, storage for sections of data of the virtual storage device, where a first portion of the storage for sections is sections of data of the standard storage device, and a first plurality of pointers provided with the at least one table, where at least some of the pointers point to sections of the standard storage device corresponding to the first portion. The virtual storage device may also include a second portion of the storage for sections that contain data that is different from data on corresponding sections of the standard storage device that map to the second portion, and a second plurality of pointers provided with the at least one table, where the second plurality of pointers point to sections of a device different from the standard storage device. Each section of the second portion may contain an earlier version of data on a corresponding section of the standard storage device. Each of the sections of data may be a track of data.

According to the present invention, a host computer to establishes a coupling between a logical storage area of a storage device and a virtual storage area of the storage device, by sending a first command to the storage device to register the logical storage area, following the first command, the host computer sending a second command to the storage device to relate the logical storage area to the virtual storage area, and following the second command, the host computer sending a third command to the storage device to activate the coupling between the logical storage area and the virtual storage area, where following activating the coupling, pointers of the virtual storage area point to sections of the logical storage area and where a write to the logical storage area causes data to be copied from the logical storage area to an other area of the storage device and causes a corresponding pointer of the virtual storage area to point to the other area. The first command may cause creation of the virtual storage area. The second command may cause creation of the virtual storage area. The second command may include additional parameters, which may be selected from the group consisting of: a new name for the virtual storage area and an indicator that determines whether the virtual storage area is available to a host. The storage areas may be devices.

According further to the present invention, a host computer establishes a coupling between at least one of a plurality of logical storage areas of a storage device and at least one of a corresponding one of a plurality of virtual storage areas of the storage device by sending commands to the storage device to relate the at least one of the logical storage areas to a corresponding one of the virtual storage areas and by, following sending commands, causing an activation of couplings between at least one of the plurality of the logical storage areas and corresponding ones of the plurality of virtual storage areas, where following activation, pointers of at least one of the virtual storage areas corresponding to the couplings point to sections of a corresponding one of the logical storage areas and where a write to the corresponding one of the logical storage areas causes data to be copied from the corresponding one of logical storage areas to an other area of the storage device and causes a corresponding pointer of the at least one of the virtual storage areas to point to the other area. The host sending commands may cause creation of the at least one of the virtual storage areas. Causing activation may include the host sending additional commands. The additional commands may include parameters, which may be selected from the group consisting of: a new name for at least one of the virtual storage areas and an indicator that determines whether at least one of the virtual storage areas is available to a host. A host computer establishing a coupling between at least one of a plurality of logical storage areas of a storage device and at least one of a corresponding one of a plurality of virtual storage areas of the storage device may also include the host maintaining a list of the logical storage areas and the virtual storage areas. Activation of couplings may include passing the list from the host to the storage device. The list may be a linked list. Passing the list may include passing a pointer to a data structure that contains one of: the list and a pointer to the list. The logical storage areas may all be part of a single consistency group. Causing an activation of couplings may include the host providing one activate command to the storage device for each logical storage area/virtual storage area pair. Causing an activation of couplings may include the host providing a single activate command to the storage device that activates all of the logical storage area/virtual storage area pairs. The storage areas may be devices.

According further to the present invention, computer software that establishes a coupling between a logical storage area of a storage device and a virtual storage area of the storage device includes executable code that sends a first command to the storage device to register the logical storage area, executable code that sends a second command to the storage device to relate the logical storage area to the virtual storage area following sending the first command, and executable code that sends a third command to the storage device to activate the coupling between the logical storage area and the virtual storage area following the second command, where following activating the coupling, pointers of the virtual storage area point to sections of the logical storage area and where a write to the logical storage area causes data to be copied from the logical storage area to an other area of the storage device and causes a corresponding pointer of the virtual storage area to point to the other area. The second command may include additional parameters, which may be selected from the group consisting of: a new name for the virtual storage area and an indicator that determines whether the virtual storage area is available to a host.

According further to the present invention, computer software that establishes a coupling between at least one of a plurality of logical storage areas of a storage device and at least one of a corresponding one of a plurality of virtual storage areas of the storage device, includes executable code that sends commands to the storage device to relate the at least one of the logical storage areas to a corresponding one of the virtual storage areas and executable code that causes an activation of couplings between at least one of the plurality of the logical storage areas and corresponding ones of the plurality of virtual storage areas after the commands are sent, where following activation, pointers of at least one of the virtual storage areas corresponding to the couplings point to sections of a corresponding one of the logical storage areas and where a write to the corresponding one of the logical storage areas causes data to be copied from the corresponding one of logical storage areas to an other area of the storage device and causes a corresponding pointer of the at least one of the virtual storage areas to point to the other area. Executable code that causes activation may send additional commands. The additional commands may include parameters that may be selected from the group consisting of: a new name for at least one of the virtual storage areas and an indicator that determines whether at least one of the virtual storage areas is available to a host. The computer software may also include executable code that maintains a list of the logical storage areas and the virtual storage areas.

According further to the present invention, handling data includes providing a first storage area of a first type that contains sections of data, providing a second storage area of the first type that contains sections of data, providing a third storage area of a second type where the second type has, for each section thereof, a pointer to one of: a corresponding section of data of the first storage area and a corresponding section of data of the second storage area, causing the third storage area to be not available for accessing, and after causing the third storage area to not be available for accessing, providing data from the second storage area corresponding to pointers of the third storage area that point to sections of the second storage area. Handling data may also include, after providing the storage areas and prior to causing the third storage area to not be available, handling a write to a particular section of the first storage area pointed to by a corresponding pointer of the third storage area by copying data from the particular section of the first storage area to a corresponding section of the second storage area and adjusting the corresponding pointer of the third storage area to point to the corresponding section of the second storage area. Handling data may also include, after causing the third storage area to not be available, handling a write to a particular section of the first storage area by writing the data thereto. Causing the third storage area to not be available may include providing a value in a header for the first storage area, where the value indicates that no operation is to be performed in connection with a set protection bit encountered when data is written to a corresponding section of the first storage area. Handling data may also include inhibiting access to the first storage area prior to providing the value to the header and allowing access to the first storage area after providing the value to the header. The storage areas may be devices.

According further to the present invention, retrieving requested data from a virtual storage area includes determining if the virtual storage area is deactivated, if the virtual storage area is deactivated, determining if the requested data corresponds to data handled by the virtual storage area prior to being deactivated, and if the requested data corresponds to data handled by the virtual storage area prior to being deactivated, providing the requested data. Determining if the requested data corresponds to data handled by the virtual storage area prior to being deactivated may include examining protection bits of a corresponding standard logical storage area. Providing the requested data may include reading the virtual storage area. The storage areas may be devices.

According further to the present invention, restoring data to a previous version, includes obtaining a current version of the data, obtaining previously archived sections of the data, and iteratively applying the previously archived sections of data to the current version and to resulting intermediate versions until the data corresponds to the previous version of the data. Previously archived sections may correspond to versions of the sections that existed prior to archiving. Archiving may include providing a virtual storage area containing pointers to sections of data of a logical storage area and, in response to a write to a section of the logical storage area, copying data from the logical storage area to an other area and causing the virtual storage area to point to the other area, where the other area contains the archived data.

According further to the present invention, computer software handles data used in connection with a first storage area of a first type that contains sections of data, a second storage area of the first type that contains sections of data and a third storage area of a second type wherein the second type has, for each section thereof, a pointer to one of: a corresponding section of data of the first storage area and a corresponding section of data of the second storage area and the software includes executable code that causes the third storage area to be not available for accessing and executable code that, after the third storage area is not available for accessing, provides data from the second storage area corresponding to pointers of the third storage area that point to sections of the second storage area. Executable code that causes the third storage area to not be available may include executable code that provides a value in a header for the first storage area, where the value indicates that no operation is to be performed in connection with a set protection bit encountered when data is written to a corresponding section of the first storage area.

According further to the present invention, computer software that retrieves requested data from a virtual storage area includes executable code that determines if the virtual storage area is deactivated, executable code that, if the virtual storage area is deactivated, determines if the requested data corresponds to data handled by the virtual storage area prior to being deactivated, and executable code that, if the requested data corresponds to data handled by the virtual storage area prior to being deactivated, provides the requested data. The software may also include executable code that examines protection bits of a corresponding standard logical storage area. The software may also include executable code that reads the virtual storage area.

According further to the present invention, computer software that restores data to a previous version includes executable code that obtains a current version of the data, executable code that obtains previously archived sections of the data, and executable code that iteratively applies the previously archived sections of data to the current version and to resulting intermediate versions until the data corresponds to the previous version of the data. Previously archived sections may correspond to versions of the sections that existed prior to archiving.

According further to the present invention, accessing data includes a host establishing a relationship between a first storage area of a first type containing data and a second storage area of a second type containing pointers to data provided in storage areas of the first type, where the storage areas are provided in a storage device coupled to the host, in response to the host writing data to a particular section of the first storage area after establishing the relationship, the particular section being copied from the first storage area to a third storage area of the first type prior to the write operation being executed, and a corresponding pointer of the second storage area being adjusted to point to the third storage area. Accessing data may also include restoring data from the second storage area to the first storage area. Accessing data may also include restoring data from the second storage area to a fourth storage area of the first type. The fourth storage area may be a split mirror of the first storage area. The first and second storage areas may be storage devices. Establishing a relationship may include the host providing an optional new name for the second storage device. Establishing a relationship may include the host providing an optional online/offline parameter for the second storage device. Accessing data may also include deactivating the second storage area by making the second storage area not available to the host. Accessing data may also include making sections copied from the first storage area to the third storage area available to the host. The storage areas may be devices.

According further to the present invention, providing a virtual storage area containing no sections of data, includes providing first and second storage areas, each containing sections of data, and providing a plurality of pointers, where each pointer points to one of: a section of the first storage area and a section of the second storage area. The virtual storage area may represent a point in time copy of the first storage area. Prior to writing data to a particular section of the first storage area pointed to by a particular pointer of the virtual storage area, the particular section may be copied to the second storage area and the particular pointer may be made to point thereto. The pointers, virtual storage area, first storage area, and second storage area may all be provided on a storage device. Data corresponding to the virtual storage area may be accessed by a plurality of host processors coupled to the storage device. The storage areas may be storage devices.

According further to the present invention, accessing data stored in connection with a virtual storage area containing no sections of data includes obtaining a pointer of the virtual storage area corresponding to the data, in response to the pointer pointing to a first storage area, accessing the first storage area, and in response to the pointer pointing to a second storage area, accessing the second storage area. The pointers, virtual storage area, first storage area, and second storage area may all be provided on a storage device. Data corresponding to the virtual storage area may be accessed by a plurality of host processors coupled to the storage device. The storage areas may be devices.

According further to the present invention, computer software that provides a virtual storage area containing no sections of data, includes executable code that provides first and second storage areas, each containing sections of data and executable code that provides a plurality of pointers, wherein each pointer points to one of: a section of the first storage area and a section of the second storage area. The virtual storage area may represent a point in time copy of the first storage area. The computer software may also include executable code that, prior to writing data to a particular section of the first storage area pointed to by a particular pointer of the virtual storage area, executable code that copies the particular section to the second storage area and adjusts the particular pointer to point thereto.

According further to the present invention, computer software that accesses data stored in connection with a virtual storage area containing no sections of data, includes executable code that obtains a pointer of the virtual storage area corresponding to the data, executable code that, in response to the pointer pointing to a first storage area, accesses the first storage area, and executable code that, in response to the pointer pointing to a second storage area, accesses the second storage area.

According further to the present invention, establishing a plurality of storage areas includes associating each of a first plurality of storage areas of a first type that contain sections of data with corresponding ones of second plurality of storage areas of a second type having pointers to alternative sections of data storage areas of the first type, wherein initially none of the second plurality of storage areas is available for accessing data corresponding thereto, and, after associating all of the first and second plurality of storage areas, activating the second plurality of storage areas to make the second plurality of storage areas available for accessing data. Establishing a plurality of storage areas may also include, prior to activating the second plurality of storage areas, setting pointers of the second plurality of storage areas to point to sections of corresponding ones of the first plurality of storage areas. Establishing a plurality of storage areas may also include, after activating the second plurality of storage areas, responding to a write to one of the first plurality of storage areas by copying a portion of data thereof to the alternative sections of data storage areas and adjusting a pointer of a corresponding one of the second plurality of storage areas to point to the alternative sections of data storage areas. Establishing a plurality of storage areas may also include enabling exclusive access to the first plurality of storage areas prior to activating the second plurality of storage areas, and disabling exclusive access to the first plurality of storage areas after activating the second plurality of storage areas. Establishing a plurality of storage areas may also include enabling exclusive access to one of the first plurality of storage areas prior to activating a corresponding one of the second plurality of storage areas, and disabling exclusive access to the one of the first plurality of storage areas after activating the corresponding one of the second plurality of storage areas. Activating the second plurality of storage areas may include providing a value in device headers for each of the second plurality of storage areas. Establishing a plurality of storage areas may also include establishing a consistency group for the logical storage areas and the virtual storage areas. Associating each of the first plurality of storage areas with corresponding ones of the second plurality of storage areas may include making a list of associated storage areas that is used in connection with activating the storage areas. The list may be a linked list. Activating the second plurality of storage areas may includes setting a particular protection bit for each section of each of the first plurality of storage areas, and setting a value in each of the headers for each of the first plurality of storage areas, wherein the value indicates that special processing is to be performed in response to a write to a section of the first plurality of storage areas having a protection bit set. The storage areas may be devices.

According to the present invention, computer software that establishes a plurality of storage areas includes executable code that associates each of a first plurality of storage areas of a first type that contain sections of data with corresponding ones of second plurality of storage areas of a second type having pointers to alternative sections of data storage areas of the first type, where initially none of the second plurality of storage areas is available for accessing data corresponding thereto and executable code that, after associating all of the first and second plurality of storage areas, activates the second plurality of storage areas to make the second plurality of storage areas available for accessing data. The computer software may also include executable code that, prior to activating the second plurality of storage areas, sets pointers of the second plurality of storage areas to point to sections of corresponding ones of the first plurality of storage areas. The computer software may also include executable code that, after activating the second plurality of storage areas, responds to a write to one of the first plurality of storage areas by copying a portion of data thereof to the alternative sections of data storage areas and adjusting a pointer of a corresponding one of the second plurality of storage areas to point to the alternative sections of data storage areas. The computer software may also include executable code that enables exclusive access to the first plurality of storage areas prior to activating the second plurality of storage areas and executable code that disables exclusive access to the first plurality of storage areas after activating the second plurality of storage areas. The computer software may also include executable code that enables exclusive access to one of the first plurality of storage areas prior to activating a corresponding one of the second plurality of storage areas and executable code that disables exclusive access to the one of the first plurality of storage areas after activating the corresponding one of the second plurality of storage areas. Executable code that activates the second plurality of storage areas may include executable code that provides a value in device headers for each of the second plurality of storage areas. The computer software may also include executable code that establishes a consistency group for the logical storage areas and the virtual storage areas. Executable code that associates each of the first plurality of storage areas with corresponding ones of the second plurality of storage areas may also make a list of associated storage areas that is used in connection with activating the storage areas. The list may be a linked list. Executable code that activates the second plurality of storage areas may also set a particular protection bit for each section of each of the first plurality of storage areas and may also set a value in each of the headers for each of the first plurality of storage areas, where the value indicates that special processing is to be performed in response to a write to a section of the first plurality of storage areas having a protection bit set.

According further to the present invention, restoring data includes providing data in a first storage area of a first type that contains sections of data, providing data in a second storage area of a second type wherein the second type has, for each section of data thereof, at least one of: a pointer to a corresponding section of data of the first storage area and a pointer to corresponding section of data of a third storage area of the first type, and, for each particular section of data of the second storage area having a pointer to the third storage area, replacing a corresponding section of the first storage area with a pointer to the third storage area. Restoring data may also include, after replacing all of the particular sections of the first storage area, deallocating the second storage area. Restoring data may also include, after replacing all of the particular sections of the first storage area, causing data to be copied from the third storage area to the first storage area. The storage areas may be devices.

According further to the present invention, restoring data includes providing data in a first storage area of a first type that contains sections of data, providing data in a second storage area of a second type wherein the second type has, for each section of data thereof, at least one of: a pointer to a corresponding section of data of the first storage area and a pointer to corresponding section of data of a third storage area of the first type, for each particular section of data of the second storage area having a pointer to the third storage area, replacing a corresponding section of a fourth storage area of the first type with the pointer to the third storage area, and, for each particular section of data of the second storage area having a pointer to the first storage area, replacing a corresponding section of the fourth storage area with a pointer to the first storage area. Restoring data may also include, after replacing all of the particular sections of the fourth storage area, deallocating the second storage area. Restoring data may also include, after replacing all of the particular sections of the fourth storage area, causing data to be copied from the first and third storage areas to the fourth storage area. The storage areas may be devices.

According further to the present invention, restoring data includes providing data in a first storage area of a first type that contains sections of data, providing data in a second storage area of a second type where the second type has, for each section of data thereof, at least one of: a pointer to a corresponding section of data of the first storage area and a pointer to corresponding section of data of a third storage area of the first type, and, for each particular section of data of the second storage area having a pointer to the third storage area, replacing a corresponding section of a fourth storage area of the first type with a pointer to the third storage area, where the fourth storage area is at least a partial mirror copy of the first storage area. Restoring data may also include, after replacing all of the particular sections of the fourth storage area, deallocating the second storage area. Restoring data may also include, after replacing all of the particular sections of the fourth storage area, causing data to be copied from the third storage area to the fourth storage area. The storage areas may be devices.

According further to the present invention, restoring data includes providing data in a first storage area of a first type that contains sections of data, providing data in a second storage area of a second type wherein the second type has, for each section of data thereof, at least one of: a pointer to a corresponding section of data of the first storage area and a pointer to corresponding section of data of a third storage area of the first type, and copying data from the second storage area to a third storage area of the second type. Restoring data may also include, after copying data, deallocating the second storage area.

According further to the present invention, computer software restores data, in connection with a system that provides data in a first storage area of a first type that contains sections of data and provides data in a second storage area of a second type wherein the second type has, for each section of data thereof, at least one of: a pointer to a corresponding section of data of the first storage area and a pointer to corresponding section of data of a third storage area of the first type, and the software includes executable code that, for each particular section of data of the second storage area having a pointer to the third storage area, replaces a corresponding section of the first storage area with a pointer to the third storage area. The software may also include executable code that, after replacing all of the particular sections of the first storage area, causes data to be copied from the third storage area to the first storage area.

According further to the present invention, computer software restores data in connection with a system that provides data in a first storage area of a first type that contains sections of data and provides data in a second storage area of a second type wherein the second type has, for each section of data thereof, at least one of: a pointer to a corresponding section of data of the first storage area and a pointer to corresponding section of data of a third storage area of the first type, and the software includes executable code that, for each particular section of data of the second storage area having a pointer to the third storage area, replaces a corresponding section of a fourth storage area of the first type with the pointer to the third storage area, and executable code that, for each particular section of data of the second storage area having a pointer to the first storage area, replaces a corresponding section of the fourth storage area with a pointer to the first storage area. The computer software also includes executable code that, after replacing all of the particular sections of the fourth storage area, causes data to be copied from the first and third storage areas to the fourth storage area.

According further to the present invention computer software restores data in connection with a system that provides data in a first storage area of a first type that contains sections of data and provides data in a second storage area of a second type wherein the second type has, for each section of data thereof, at least one of: a pointer to a corresponding section of data of the first storage area and a pointer to corresponding section of data of a third storage area of the first type, and the software includes executable code that, for each particular section of data of the second storage area having a pointer to the third storage area, replacing a corresponding section of a fourth storage area of the first type with a pointer to the third storage area, where the fourth storage area is at least a partial mirror copy of the first storage area. The computer software also includes executable code that, after replacing all of the particular sections of the fourth storage area, causes data to be copied from the third storage area to the fourth storage area.

According further to the present invention, computer software restores data in connection with a system that provides data in a first storage area of a first type that contains sections of data and provides data in a second storage area of a second type wherein the second type has, for each section of data thereof, at least one of: a pointer to a corresponding section of data of the first storage area and a pointer to corresponding section of data of a third storage area of the first type and the software includes executable code that copies data from the second storage area to a third storage area of the second type.

DETAILED DESCRIPTION OF VARIOUS EMBODIMENTS

Figure 1:
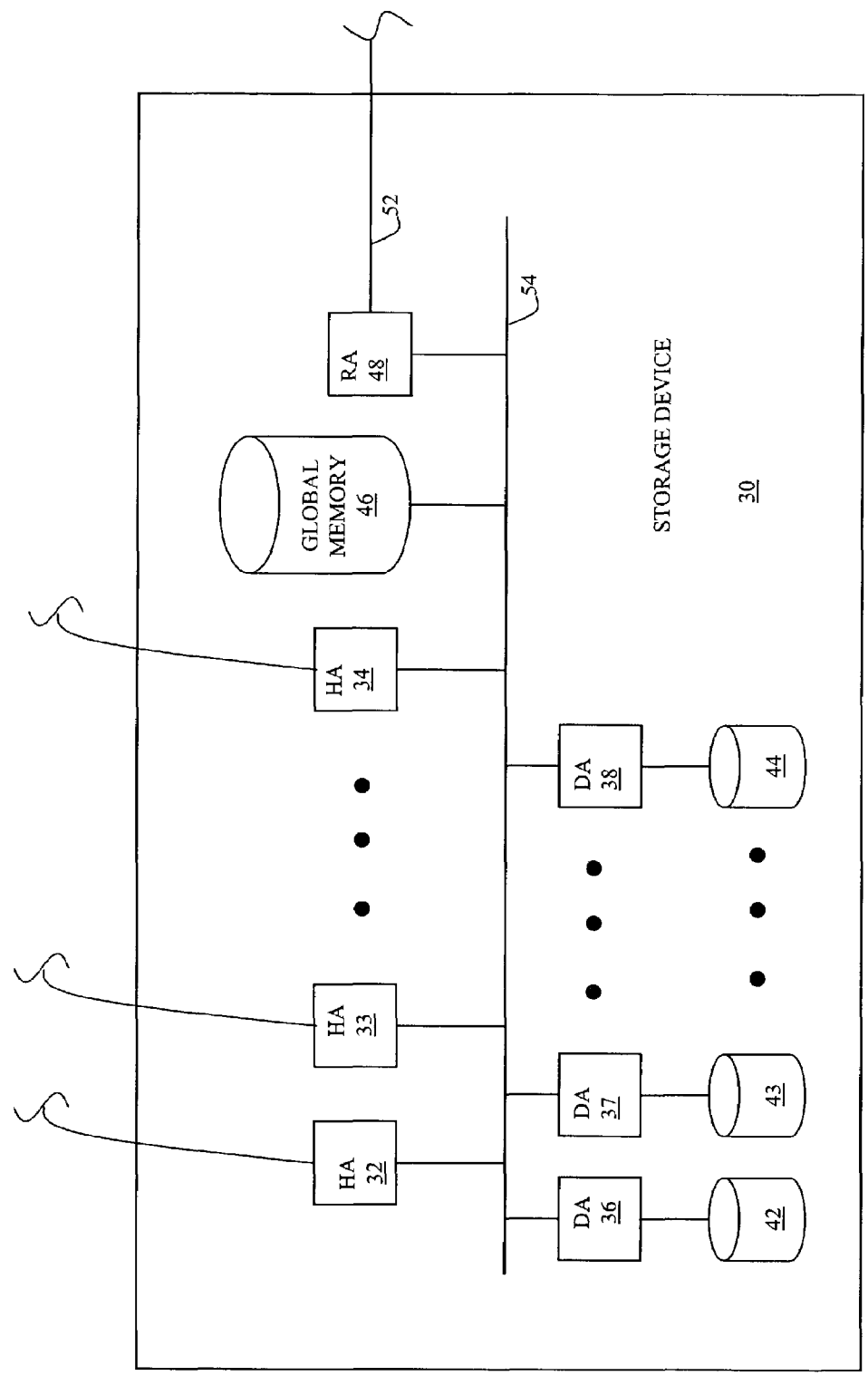
FIG. 1 is a diagram of a storage device used in connection with the system described herein.

Referring to FIG. 1, a storage device 30 includes a plurality of host adapters (HA) 32-34, a plurality of disk adapters (DA) 36-38 and a plurality of disk drives 42-44. Each of the disk drives 42-44 is coupled to a corresponding one of the DA's 36-38. The storage device 30 also includes a global memory 46 that may be accessed by the HA's 32-34 and the DA's 36-38. The storage device 30 also includes a RDF adapter (RA) 48 that may also access the global memory 46. The RA 48 may communicate with one or more additional remote storage devices (not shown) and/or one or more other remote devices (not shown) via a data link 52. The HA's 32-34, the DA's 36-38, the global memory 46 and the RA 48 are coupled to a bus 54 that is provided to facilitate communication therebetween.

Each of the HA's 32-34 may be coupled to one or more host computers (not shown) that access the storage device 30. The host computers (hosts) read data stored on the disk drives 42-44 and write data to the disk drives 42-44. The global memory 46 contains a cache memory that holds tracks of data from the disk drives 42-44 as well as storage for tables that may be accessed by the HA's 32-34, the DA's 36-38 and the RA 48. Note that, for the discussion herein, blocks of data are described as being a track or tracks of data. However, it will be appreciated by one of ordinary skill in the art, that the system described herein may work with any appropriate incremental amount, or section, of data, including possibly variable incremental amounts of data and/or fixed incremental amounts of data.

Figure 2:
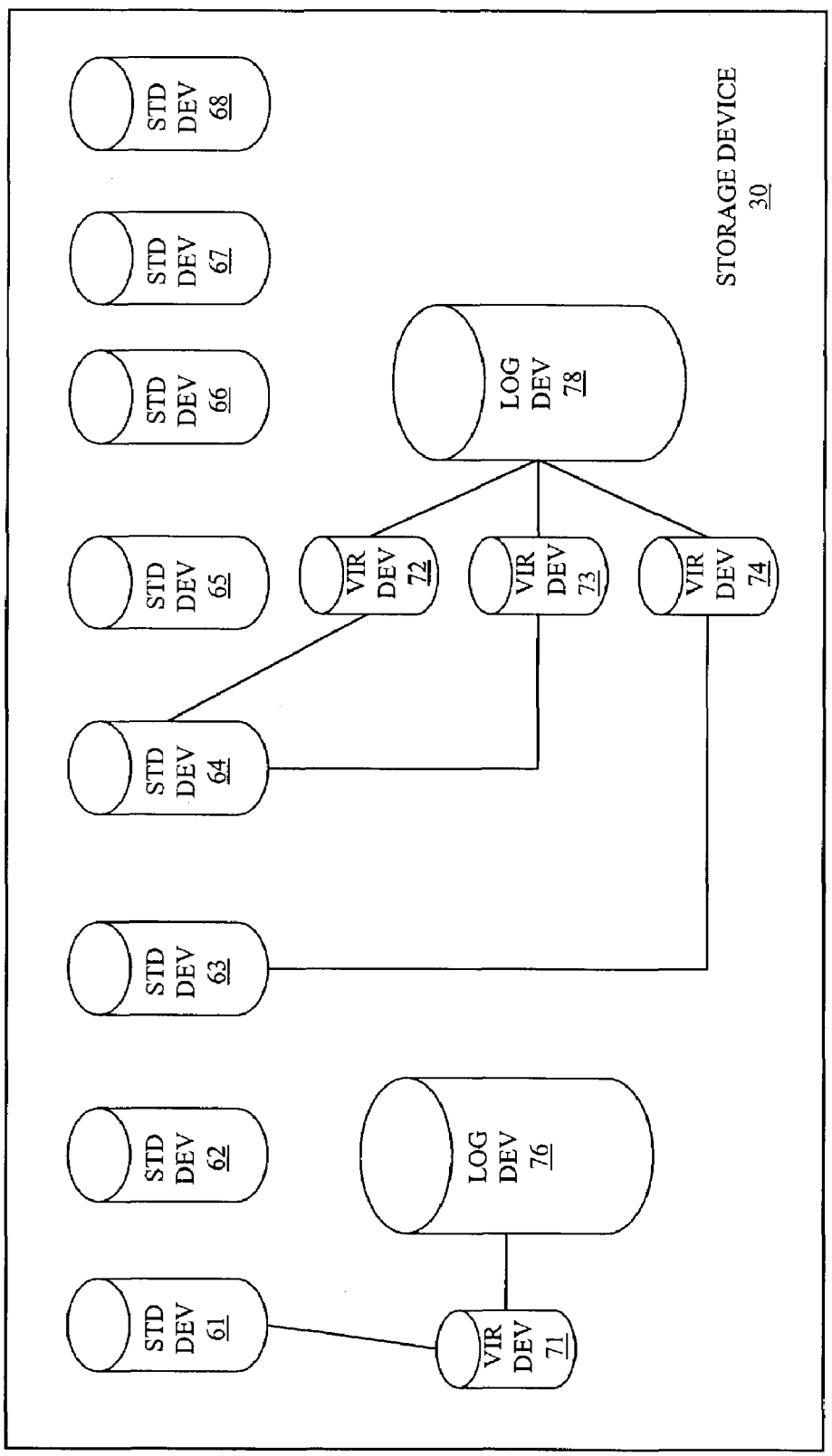
FIG. 2 is a diagram of a storage that shows various logical volumes that are used in connection with the system described herein.

Referring to FIG. 2, the storage device 30 is shown as including a plurality of standard logical devices 61-68. Each of the standard logical devices 61-68 may correspond to a volume that is accessible to one or more hosts coupled to the storage device 30. Each of the standard logical devices 61-68 may or may not correspond to one of the disk drives 42-44. Thus, for example, the standard logical device 61 may correspond to the disk drive 42, may correspond to a portion of the disk drive 42, or may correspond to a portion of the disk drive 42 and a portion of the disk drive 43. Each of the standard logical devices 61-68 appears to the host as a contiguous block of disk storage, even though each of the standard logical devices 61-68 may or may not correspond to actual contiguous physical storage of the disk drives 42-44.

The storage device 30 may also includes a plurality of virtual devices 71-74. The virtual devices 71-74 appear to a host coupled to the storage device 30 as volumes containing a contiguous block of data storage. Each of the virtual devices 71-74 may represent a point in time copy of an entire one of the standard logical devices 61-68, a portion of one of the standard logical devices 61-68, or a combination of portions or entire ones of the standard logical devices 61-68. However, as described in more detail elsewhere herein, the virtual devices 71-74 do not contain the track data from the standard logical devices 61-68. Instead, each of the virtual devices 71-74 is coupled to a log device 76 or a log device 78 that stores some or all the track data, as described in more detail elsewhere herein. The virtual devices 71-74 contain tables that point to tracks of data on either on the standard logical devices 61-68 or the log devices 76, 78.

The virtual device 71 may represent a point in time copy of the standard logical device 61. As described in more detail elsewhere herein, the virtual device 71 is coupled to the log device 76 that contains track data to facilitate the virtual device 71 appearing to a host to be a point in time copy of the standard logical device 61. It is possible for more than one virtual device to use a single log device. Thus, the virtual devices 72-74 are shown being coupled to the log device 78. Similarly, it is possible for more than one virtual device to represent point in time copies of a single standard logical device. Thus, the virtual devices 72,73 are shown as being point in time copies of the standard logical device 64. The virtual devices 72,73 may represent the same point in time copy of the standard logical device 64 or, alternatively, may represent point in time copies of the standard logical device 64 taken at different times. Note that only some of the standard logical devices 61-68 are shown as being associated with a corresponding one of the virtual devices 71-74 while others of the standard logical devices 61-68 are not.

In some embodiments, it may be possible to implement the system described herein using storage areas, instead of storage devices. Thus, for example, the virtual devices 71-74 may be virtual storage areas, the standard logical devices 61-68 may be standard logical areas, and the log devices 76,78 may be log areas. In some instances, such an implementation may allow for hybrid logical/virtual devices where a single logical device has portions that behave as a standard logical device, portions that behave as a virtual device, and/or portions that behave as log device. Accordingly, it should be understood that, in appropriate instances, references to devices in the discussion herein may also apply to storage areas that may or may not correspond directly with a storage device.

Figure 3:
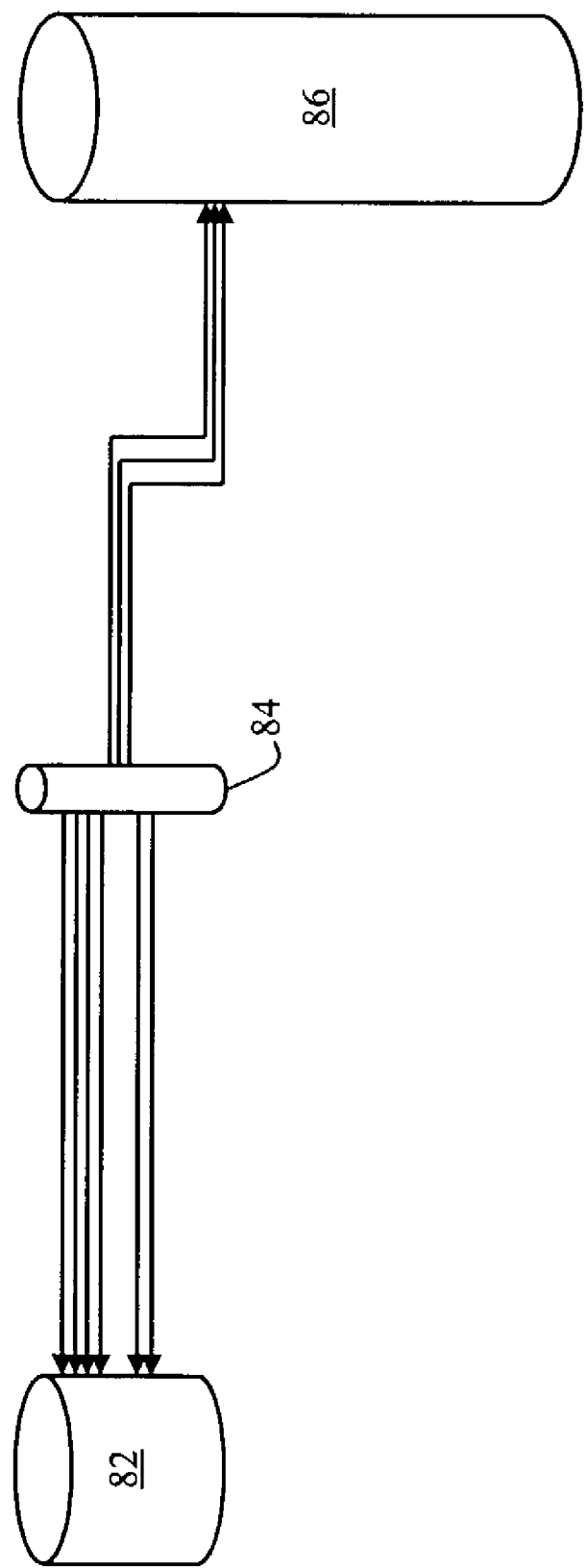
FIG. 3 is a diagram showing use of a virtual device according to the system described herein.

Referring to FIG. 3, a diagram shows a standard logical device 82, a virtual device 84, and a log device 86. As discussed above, the virtual device 84 may represent a point in time copy of all or a portion of the standard logical device 82. A host coupled to a storage device that accesses the virtual device 84 may access the virtual device 84 in the same way that the host would access the standard logical device 82. However, the virtual device 84 does not contain any track data from the standard logical device 82. Instead, the virtual device 84 includes a plurality of table entries that point to tracks on either the standard logical device 82 or the log device 86.

When the virtual device is established 84 (e.g., when a point in time copy is made of the standard logical device 82), the virtual device 84 is created and provided with appropriate table entries that, at the time of establishment, point to tracks of the standard logical device 82. A host accessing the virtual device 84 to read a track would read the appropriate track from the standard logical device 82 based on the table entry of the virtual device 84 pointing to the track of the standard logical device 82.

After the virtual device 84 has been established, it is possible for a host to write data to the standard logical device 82. In that case, the previous data that was stored on the standard logical device 82 is copied to the log device 86 and the table entries of the virtual device 84 that previously pointed to tracks of the standard logical device 82 would be modified to point to the new tracks of the log device 86 to which the data had been copied. Thus, a host accessing the virtual device 84 would read either tracks from the standard logical device 82 that have not changed since the virtual device 84 was established or, alternatively, would read corresponding tracks from the log device 86 that contain data copied from the standard logical device 82 after the virtual device 84 was established. Adjusting data and pointers in connection with reads and writes to and from the standard logical device 82 and virtual device 84 is discussed in more detail elsewhere herein.

In an embodiment described herein, hosts would not have direct access to the log device 86. That is, the log device 86 would be used exclusively in connection with the virtual device 84 (and possibly other virtual devices as described in more detail elsewhere herein). In addition, for an embodiment described herein, the standard logical device 82, the virtual device 84, and the log device 86 may be provided on the single storage device 30. However, it is possible to provide the different logical devices and the log device on separate storage devices interconnected using, for example, the RDF protocol or other remote communication protocols. In addition, it may be possible to have portions of one or more of the standard logical device 82, the virtual device 84, and/or the log device 86 provided on separate storage devices that are appropriately interconnected.

Figure 4:
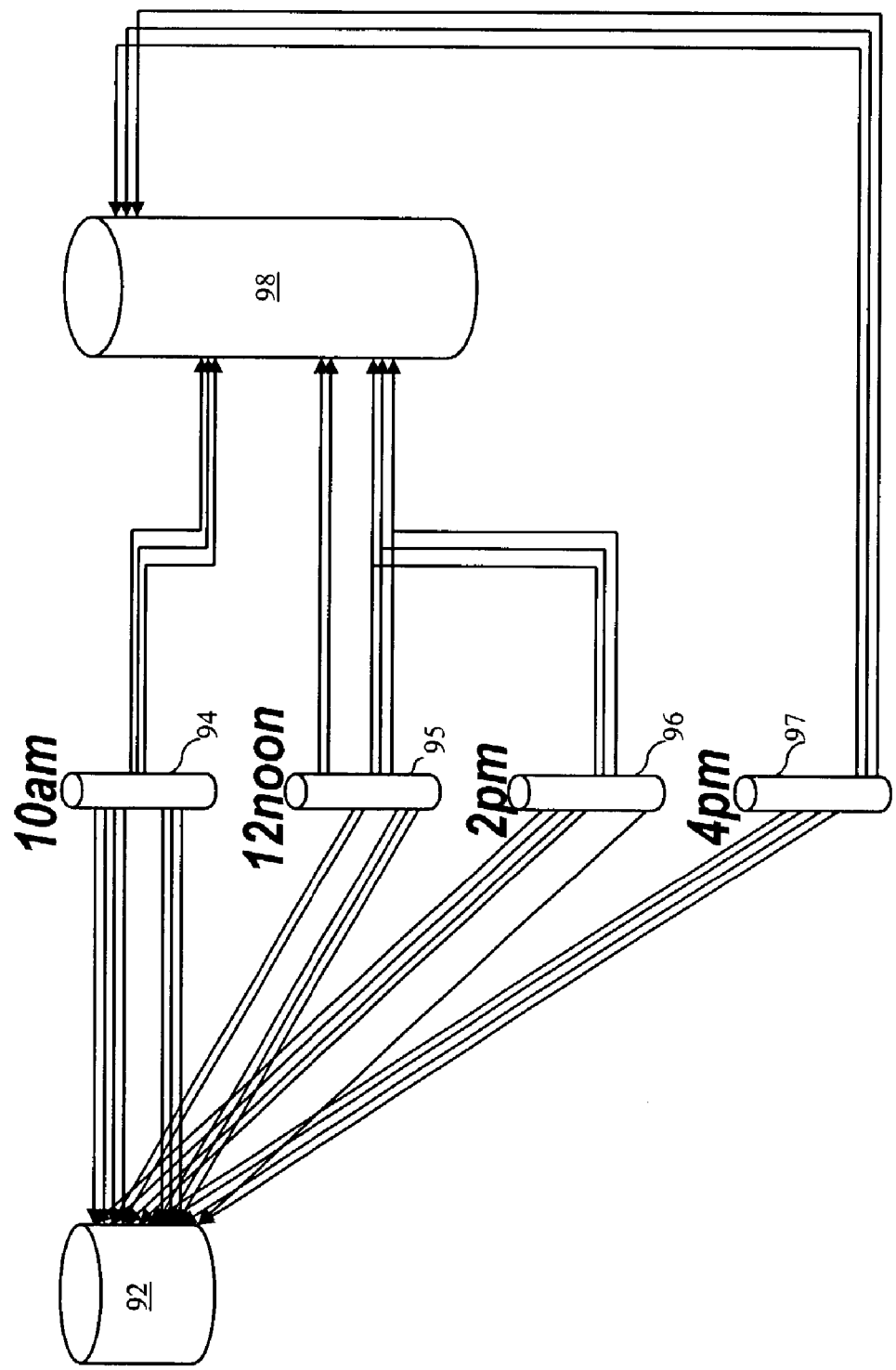
FIG. 4 is a diagram showing use of a plurality of virtual devices according to the system described herein.

Referring to FIG. 4, another example of the use of virtual devices shows a standard logical device 92, a plurality of virtual devices 94-97 and a log device 98. In the example of FIG. 4, the virtual device 94 represents a point in time copy of the standard logical device 92 taken at ten a.m. Similarly, the virtual device 95 represents a copy of the standard logical device 92 taken at twelve noon, the virtual device 96 represents a copy of the standard logical device 92 taken at two p.m., and the virtual device 97 represents a copy of the standard logical device 92 taken at four p.m. Note that all of the virtual devices 94-97 may share the log device 98. In addition, it is possible for table entries of more than one of the virtual devices 94-97, or, a subset of the table entries of the virtual devices 94-97, to point to the same tracks of the log device 98. For example, the virtual device 95 and the virtual device 96 are shown as having table entries that point to the same tracks of the log device 98.

In an embodiment discussed herein, the log device 98 and other log devices discussed herein are provided by a pool of log devices that is managed by the storage device 30. In that case, as a virtual device requires additional tracks of a log device, the virtual device would cause more log device storage to be created (in the form of more tracks for an existing log device or a new log device) using the log device pool mechanism. Pooling storage device resources in this manner is known in the art. Other techniques that do not use pooling may be used to provide log device storage.

Figure 5:
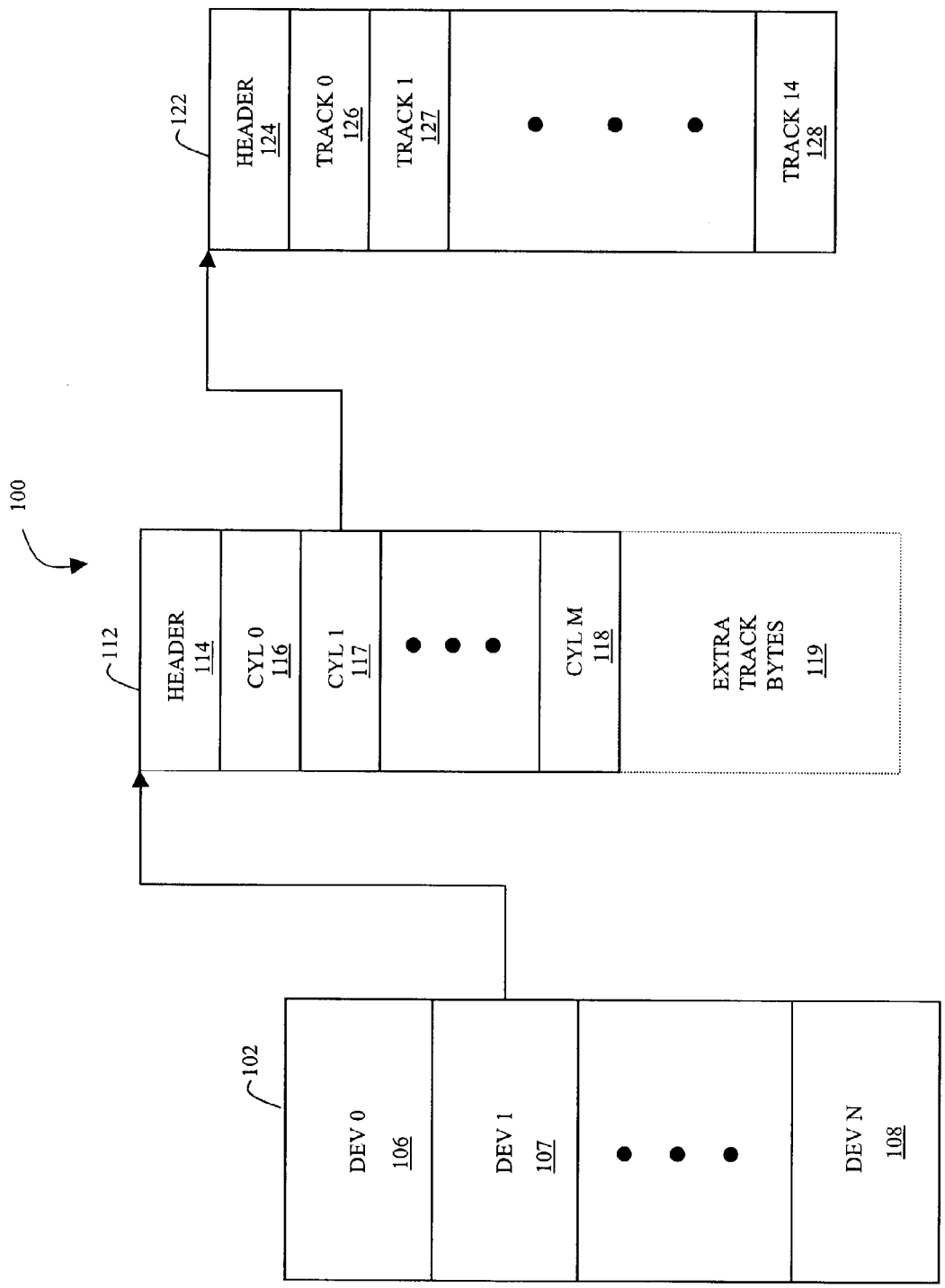
FIG. 5 is a diagram showing device tables used in connection with the system described herein.

Referring to FIG. 5, a diagram 100 illustrates tables that are used to keep track of device information. A first table 102 corresponds to all of the devices used by a storage device or by an element of a storage device, such as an HA and/or a DA. The table 102 includes a plurality of logical device entries 106-108 that correspond to all the logical devices used by the storage device (or portion of the storage device). The entries in the table 102 include descriptions for standard logical devices, virtual devices, log devices, and other types of logical devices.

Each of the entries 106-108 of the table 102 correspond to another table that contains information for each of the logical devices. For example, the entry 107 may correspond to a table 112. The table 112 includes a header that contains overhead information. The table 112 also includes entries 116-118 for each of the cylinders of the logical device. In an embodiment disclosed herein, a logical device may contain any number of cylinders depending upon how the logical device is initialized. However, in other embodiments, a logical device may contain a fixed number of cylinders.

The table 112 is shown as including a section for extra track bytes 119. The extra track bytes 119 are used in connection with the log devices in a manner that is discussed elsewhere herein. In an embodiment disclosed herein, there are eight extra track bytes for each track of a log device. For devices that are not log devices, the extra track bytes 119 may not be used.

Each of the cylinder entries 116-118 corresponds to a track table. For example, the entry 117 may correspond to a track table 122 that includes a header 124 having overhead information. The track table 122 also includes entries 126-128 for each of the tracks. In an embodiment disclosed herein, there are fifteen tracks for every cylinder. However, for other embodiments, it may be possible to have different numbers of tracks for each of the cylinders or even a variable number of tracks for each cylinder. For standard logical devices and log devices, the information in each of the entries 126-128 includes a pointer (either direct or indirect) to the physical address on one of the disk drives 42-44 of the storage device 30 (or a remote storage device if the system is so configured). Thus, the track table 122 may be used to map logical addresses of the logical device corresponding to the tables 102, 112, 122 to physical addresses on the disk drives 42-44 of the storage device 30. For virtual devices, each of the entries 126-128 of the table 122 points to a track of a corresponding standard logical device or corresponding log device. For other embodiments, however, it may be possible to use a different mechanism where the tables 102, 122, 122 are used only for standard logical devices that contain tracks of data while another type of table, such as a simple array of tracks, is used by virtual devices to map tracks of the virtual devices to tracks of corresponding standard logical devices or log devices.

Each track of a log device is either free, meaning that it is not being used by a virtual device, or is assigned, meaning that the track is pointed to by a table entry in one or more of the virtual devices. In an embodiment disclosed herein, the tracks of a log device are managed by first creating a doubly linked list of all of the free tracks of the log device. The pointers for the doubly linked list are provided by the extra track bytes 119 of the table 112 so that the extra track bytes 119 for a log device contains eight bytes for every track of the log device. For every track of the log device that is free, the extra eight bytes include a forward pointer pointing to the next free track of the log device and a backward pointer pointing to the previous free track of the log device. Using a doubly linked list in this manner facilitates accessing free tracks of the log device.

In addition, if a track of a log device is assigned (i.e., is used by one or more virtual devices), the corresponding extra track bytes 119 for the track may be used to point back to the corresponding track of the standard logical device. Thus, when a write is performed to the standard logical device after the virtual device has been established, the data from the standard logical device is copied to a new track of the log device and the extra track bytes corresponding to the new track of the log device are made to point back to the track of the standard logical device from which the data came. Having each track of the log device point back to the corresponding track of the standard logical device is useful in, for example, data recovery situations.

In addition, for an embodiment disclosed herein, the pointers for the extra eight bytes per track for an assigned track are stored with the data also. That is, when a particular track of a log device is assigned, the pointer back to the corresponding track of a standard logical device is stored with the extra track bytes 119 and, in addition, the pointer is stored with the track data itself on the track of the log device. For CKD formatted tracks, the extra eight bytes may be stored in block zero. For FBA formatted tracks, the extra eight bytes may be stored in an additional block appended on the end of the track. In an embodiment disclosed herein, a block is five hundred and twelve bytes and an FBA track contains forty blocks, which is increased to forty-one when an additional block is appended. Different track formats are disclosed, for example, in U.S. Pat. No, 5,206,939 to Yanai, et al., which is incorporated herein by reference.

The tables 102, 112, 122 of FIG. 5 may be stored in the global memory 46 of the storage device 30. In addition, the tables corresponding to devices accessed by a particular host may be stored in local memory of the corresponding one of the HA's 32-36. In addition, the RA 48 and/or the DA's 36-38 may also use and locally store portions of the tables 102, 112, 122.

Figure 6:
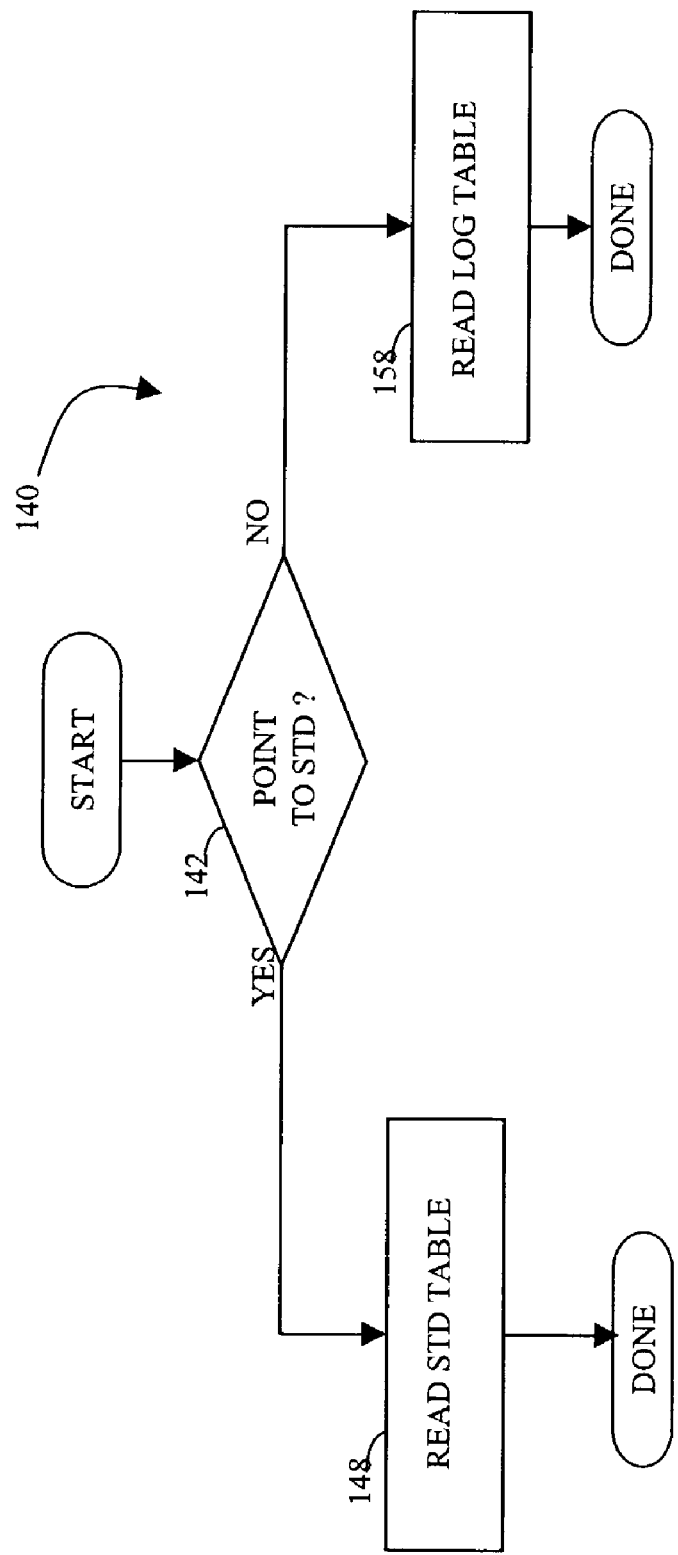
FIG. 6 is a flow chart illustrating reading a table used in connection with a virtual device according to the system described herein.

Referring to FIG. 6, a flow chart 140 illustrates steps performed when a host reads data from a device table corresponding to a track that is accessible through a virtual device. That is, the flow chart 140 illustrates obtaining information about a track that is pointed to by a table entry for a virtual device.

Processing begins at a test step 142 where it is determined if the track of interest (i.e., the track corresponding to the table entry being read) is on the standard logical device or the log device. This is determined by accessing the device table entry for the virtual device and determining whether the table entry for the track of interest points to either the standard logical device or the log device. If it is determined at the test step 142 that the pointer in the table for the virtual device points to the standard logical device, then control passes from the step 142 to a step 148 where the table entry of interest is read. Following the step 148, processing is complete.

If it is determined that the test step 142 that the pointer in the device table for the virtual device for the track of interest points to the log device, then control transfers from the step 142 to a step 158 where the log table entry of interest is read. Following the step 158, processing is complete.

Note that, in some instances, access to data may be controlled by a flag or lock that prohibits multiple processes having access to the data simultaneously. This is especially useful in instances where a device table is being read or modified. The system disclosed herein contemplates any one of a variety of mechanisms for controlling access to data by multiple processes, including conventional combinations of software and/or hardware locks, also known as "flags" or "semaphores". In some instances, a process accessing data may need to wait until another process releases the data. In one embodiment, a hardware lock controls access to a software lock (flag) so that a process first obtains control of the hardware lock, tests the software lock, and then, if the software lock is clear, the process sets the software lock and then releases the hardware lock. If the process gets the hardware lock and determines that the software lock is not clear, then the process releases the hardware lock so that another process that has set the software lock can clear the software lock at a later time. Further note that, in some instances, it is useful to first read a table entry corresponding to a particular track, read the track into a cache slot (if the track is not already in cache), lock the cache slot, and then reread the corresponding table entry.

Figure 7:
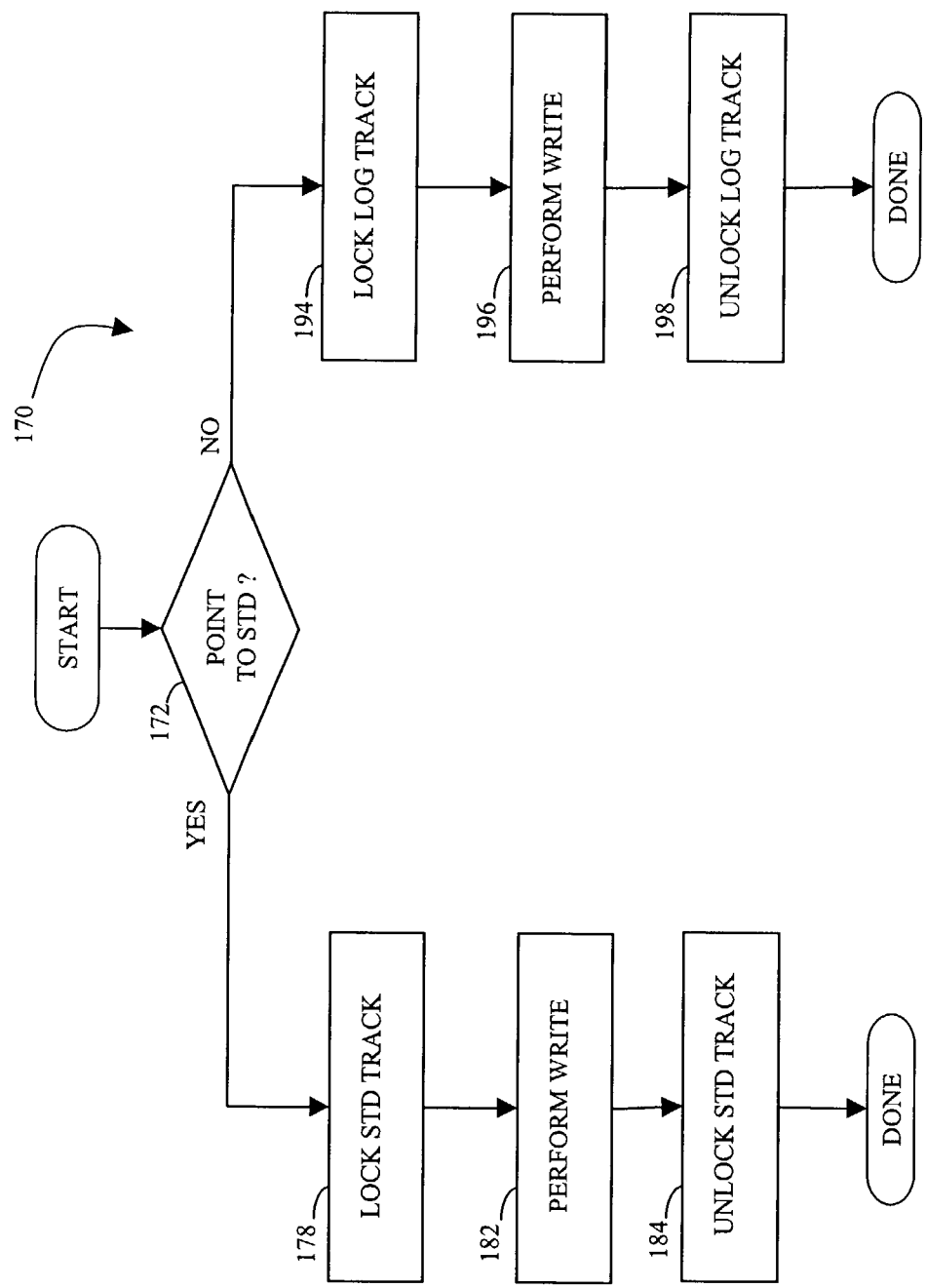
FIG. 7 is a flow chart illustrating writing to a table used in connection with a virtual device according to the system described herein.

Referring to FIG. 7, a flow chart 170 illustrates steps performed in connection with writing information to a device table for a virtual device corresponding to a standard logical device or a log device. Processing begins at a first step 172 where it is determined if the particular track corresponding to the device table entry being written is on the standard logical device or the log device. If it is determined the particular track of interest is on the standard logical device, control passes from the step 172 to a step 178 where the track corresponding to the device table entry being written is locked. Locking the track at the step 178 prevents other processes from getting access to the track, and from modifying the corresponding table entry, while the current process is modifying the device table entry corresponding to the track. Following the step 178 is a step 182 where the write operation is performed. Following the step 182 is a step 184 where the track is unlocked. Following the step 184, processing is complete.

If it is determined that the test step 172 that the track corresponding to the table entry for the virtual device that is being modified points to the log device, then control passes from the test step 172 to a step 194 where the track of the log device corresponding to the entry of the device table that is being written is locked. Following the step 194 is a step 196 where the write operation is performed. Following the step 196 is a step 198 where the track is unlocked. Following the step 198, processing is complete.

Figure 8:
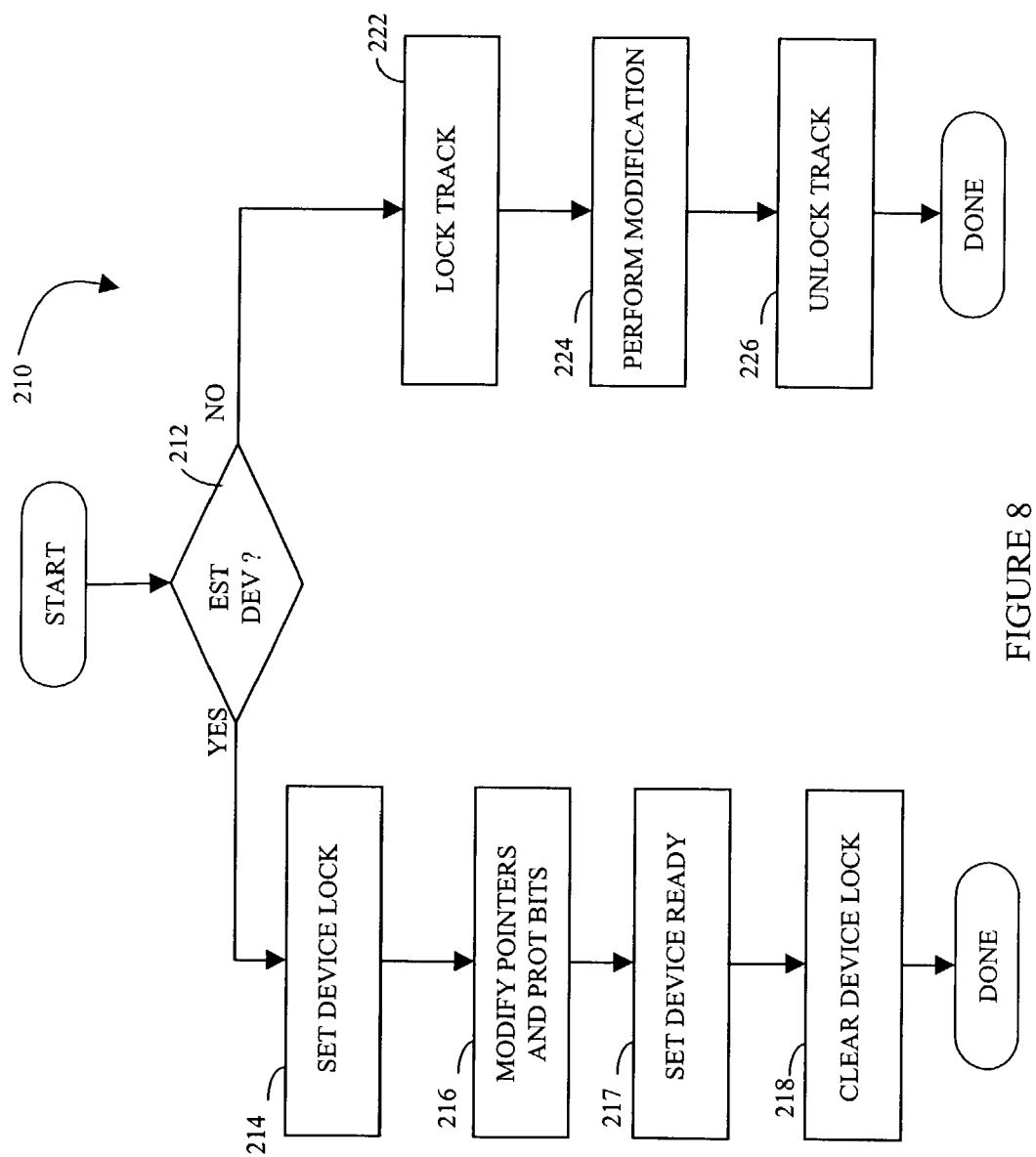
FIG. 8 is a flow chart illustrating modification of a virtual device table and establishing a virtual device according to the system described herein.

Referring to FIG. 8, a flow chart 210 illustrates steps performed in connection with modifying a device table corresponding to a virtual device. This may be contrasted with the flow chart 170 of FIG. 7 that illustrates modifying the device table for the standard logical device or the log device pointed to by an entry for a track of the device table for a virtual device. In flow chart 210, the device table for the virtual device is modified, as opposed to the device table for the standard logical device or the device table for the log device.

Processing begins at a first step 212 where it is determined if the modifications to the table relate to establishing the virtual device. As discussed elsewhere herein, establishing a virtual device includes making the virtual device available for access by a host after the virtual device is created. Establishing a virtual device causes the virtual device to be associated with a standard logical device (and thus, represent a point in time copy of the standard logical device at the time of establishment). Prior to being associated with a standard logical device, a virtual device is not established and is not accessible by a host. After being established, a virtual device is accessible by a host.

If it is determined at the step 212 that the modifications to the table relate to establishing the virtual device, then control passes from the step 212 to a step 214 where a device lock for the virtual device is set to prohibit access to the table by other processes. The device lock is comparable to the cache slot lock, discussed elsewhere herein.

Following the step 214 is a step 216 where the pointers of the virtual device table are made to point to tracks of the standard logical device and where a protection bit is set for each of the tracks of the standard logical device that corresponds to the virtual device being established. In an embodiment disclosed herein, each of the tracks of the standard logical device has sixteen bits which may be set as protection bits, one for each virtual device established to the standard logical device. In some embodiments, the protection bits may have uses that are unrelated to virtual devices. A new virtual device being established may be assigned a new bit position in the sixteen bit field while the bit for each track of the standard logical device may be set. As discussed in more detail elsewhere herein, the protection bit being set followed by a subsequent write to the standard logical device indicates that special processing needs to take place to accommodate the virtual device established to the standard logical device. The special processing is described in more detail elsewhere herein. Also at the step 216, the track entries for the device table for the virtual device are all modified to point to the corresponding tracks of the standard logical device. Thus, when the virtual device is first established, all of the pointers of the device table of the virtual device point to the tracks of the standard logical device.

Following the step 216 is a step 217 the virtual device is set to the ready state, thus making the virtual device accessible to hosts. Following the step 217 is a step 218 where the virtual device is unlocked, thus allowing access by other processes. Following the step 218, processing is complete.

If it is determined that the test step 212 that the virtual device is not being established (i.e., some other operation is being performed), then control passes from the test step 212 to a step 222 to lock a track corresponding to the entry of the device table for the virtual device that is being modified. Note that the track that is locked at the step 222 may either be a track on the standard logical device (if the entry of interest in the device table of the virtual device points to the standard logical device) or a track of the log device (if the entry of interest points to the log device). Following the step 222 is a step 224 where the modification to the device table for the virtual device is performed. Following the step 224 is a step 226 where the track is unlocked. Following the step 226, processing is complete.

Figure 9:
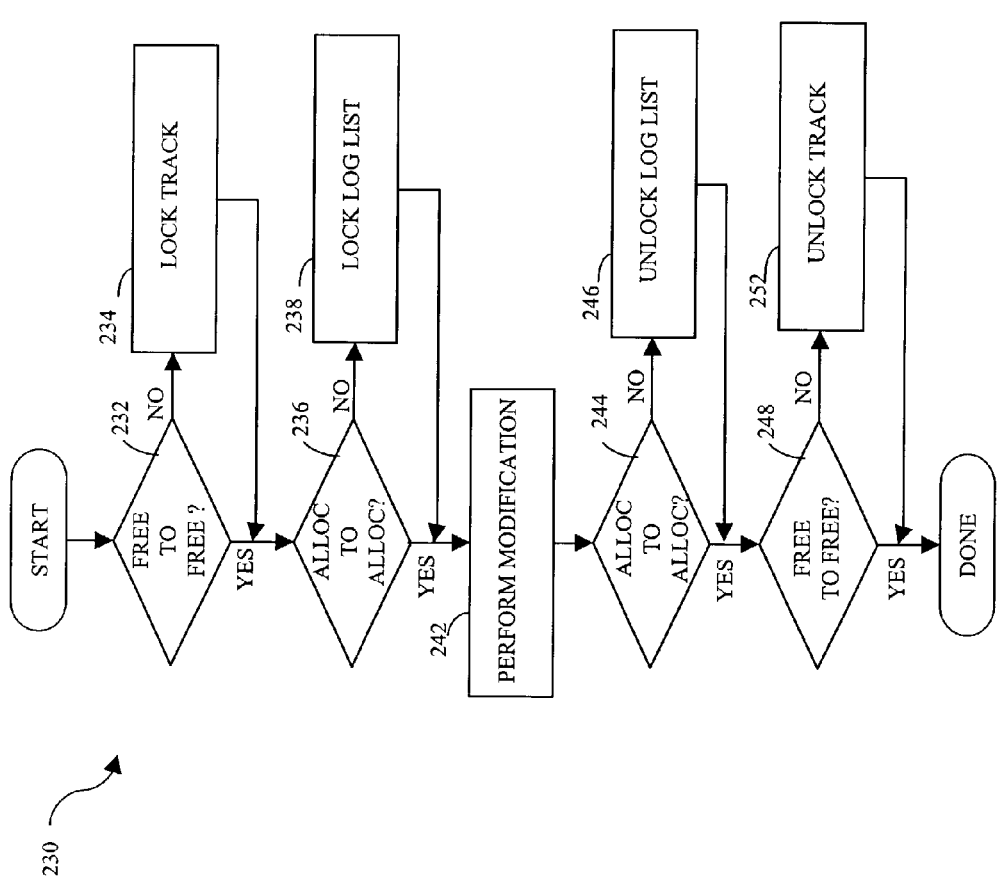
FIG. 9 is a flow chart illustrating modification of data structures used to handle tracks of a log device according to the system described herein.

Referring to FIG. 9, a flow chart 230 illustrates steps performed in connection with manipulating tracks of a log device. As discussed above, the tracks of a log device are maintained by creating a doubly linked list of tracks of the log device that are free (i.e. tracks that are available for accepting new data). Thus, if one or more tracks are needed for use in connection with a corresponding virtual device, the free tracks are obtained from the doubly linked list, which is modified in a conventional manner to indicate that the tracks provided for use by the virtual device are no longer free. Conversely, if one or more tracks that are used by one or more virtual devices are no longer needed, the tracks are returned to the doubly linked list, in a conventional manner, in order to indicate that the tracks are free. The flow chart 230 of FIG. 9 illustrates the steps performed in connection with controlling access to the tracks (and track pointers) by multiple processes which manipulate the tracks.

Processing begins at a test step 232 where it is determined if the operation being performed is modifying only tracks that are on the free list. Note that modifying tracks only on the free lists by, for example, transferring a free track from one part of the list to another part or from one free lists to another free list (in the case of multiple free lists), does not involve modifications for tracks corresponding to any data. If it is determined at the test step 232 that the modification being performed does not involve only tracks on the free list, then control transfers from the step 232 to a step 234 where the track is locked to prevent access by other processes.

Following the step 234 or the step 232 if the step 234 is not reached is a test step 236 where it is determined if the manipulation involves only allocated tracks. For any operation involving only allocated tracks, it is not necessary to lock the log device list of free tracks. If it determined at the step 236 that the operation being performed is not manipulating only allocated tracks, then control transfers from the step 236 to the step 238 where the log device list of free tracks is locked to prevent access by other processes. Following the step 238, or following the step 236 if the step 238 is not executed, is a step 242 where the modification is performed.

Following the step 242 is a test step 244 where it is determined if the manipulation involves only allocated tracks. If it is determined at the test step 244 that the modification being performed does not involve only allocated tracks, then control transfers from the step 244 to a step 246 where the log device free list is unlocked. Following the step 246 or the step 244 if the step 246 is not reached is a test step 248 where it is determined if the operation being performed is modifying only tracks that are on the free list. If it determined at the step 248 that the operation being performed is modifying only tracks that are on the free list, then control transfers from the step 248 to the step 252 where the track or tracks locked at the step 234 are unlocked. Following the step 252, or following the step 248 if the step 252 is not executed, processing is complete.

Figure 10:
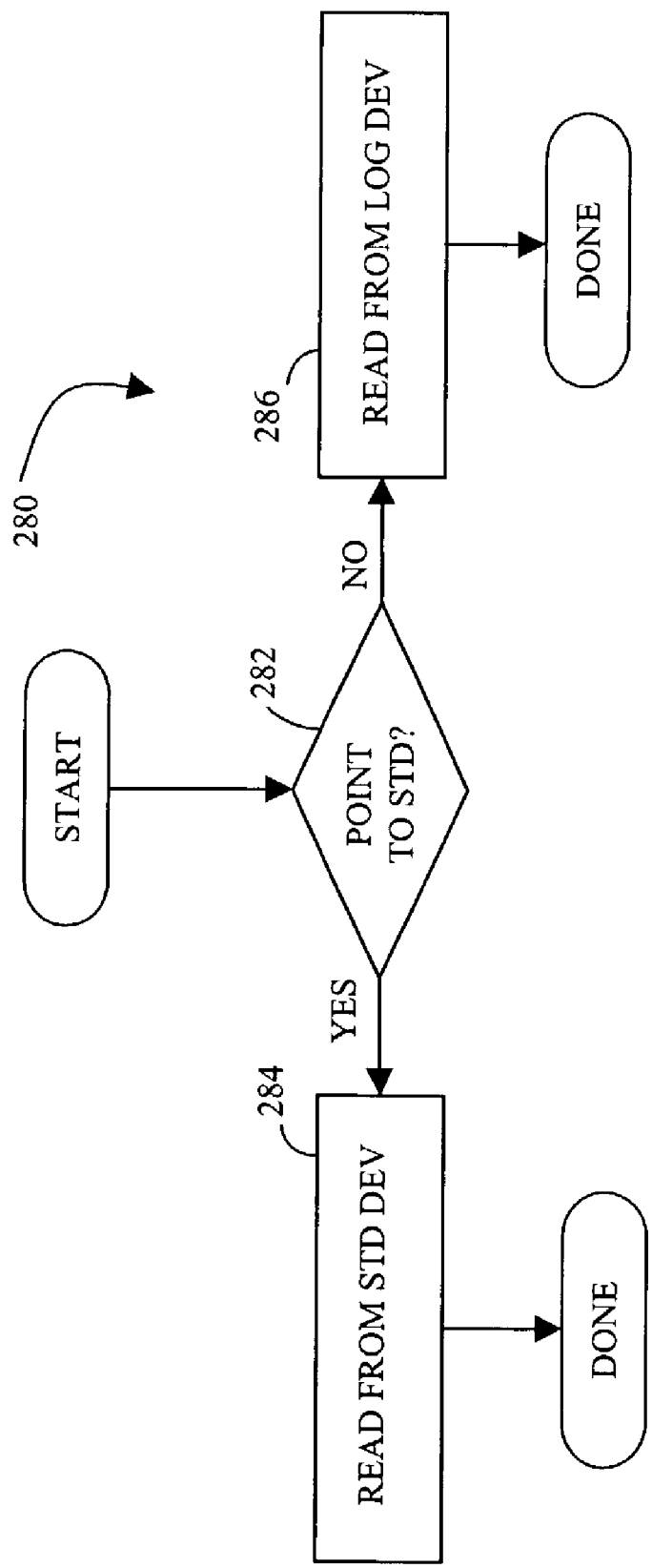
FIG. 10 is a flow chart illustrating steps performed in connection with reading a virtual device according to the system described herein.

Referring to FIG. 10, a flow chart 280 illustrates steps performed in connection with reading data from a virtual device. Processing begins at a test step 282, where it is determined if the device table entry for the track of interest of the virtual device points to the standard logical device or points to the log device. If it is determined at the test step 282 that the table points to the standard logical device, then control passes from the step 282 to a step 284, where the track is read from the standard logical device. Following the step 284, processing is complete. Alternatively, if it determined at the test step 282 that the device table of the virtual device points to the log device, then control passes from the step 282 to a step 286, where the track of interest is read from the log device. Following the step 286, processing is complete.

Note that in some instances, it may be possible that prior to the test step 282, it is determined that the track of interest being read is already in the cache memory (global memory). In that case, the track may be obtained from the cache memory without executing any of the steps 282, 284, 286.

Figure 11:
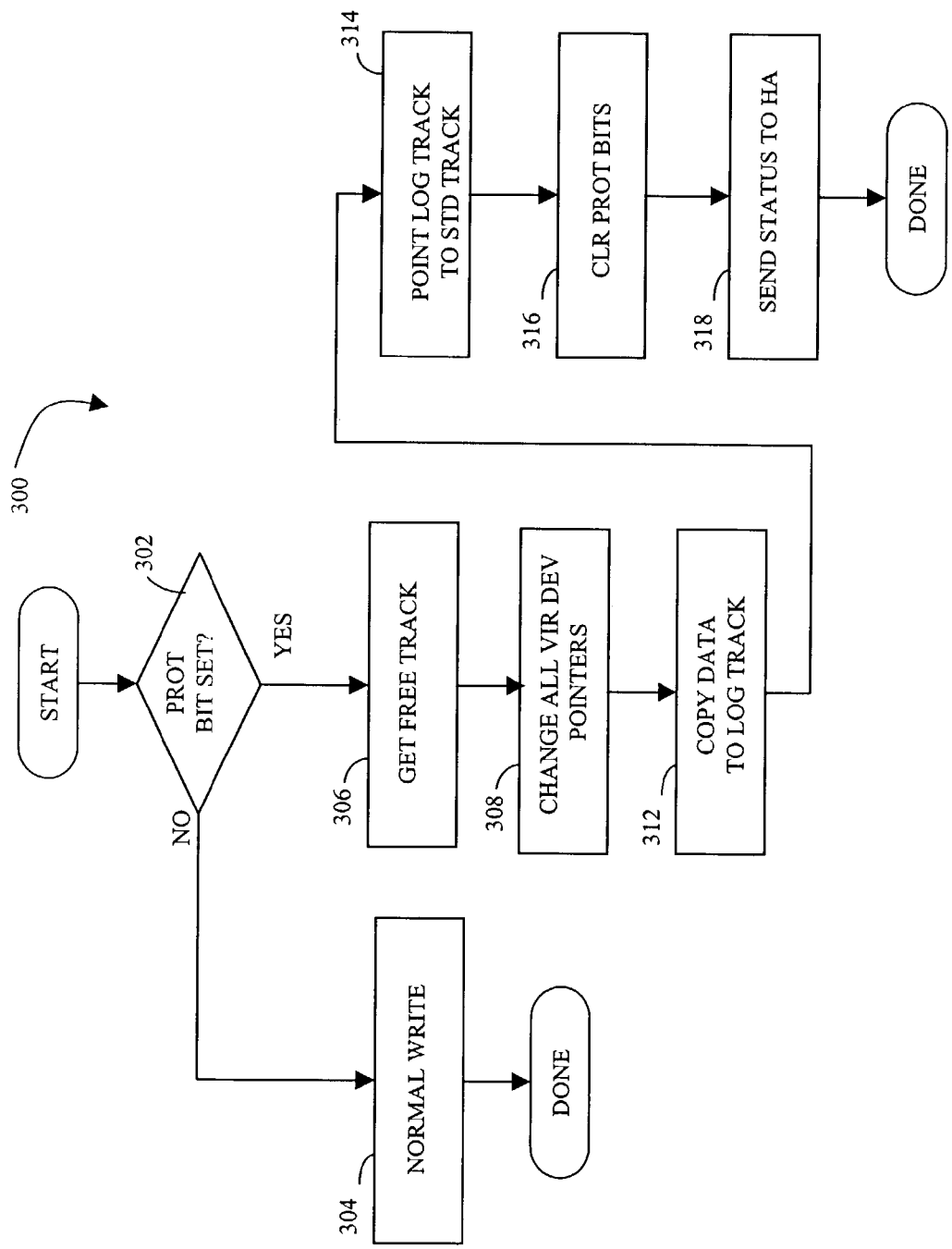
FIG. 11 is a flow chart illustrating steps performed by a disk adapter in connection with writing to a standard logical device to which a virtual device has been established according to the system described herein.

Referring to FIG. 11, a flow chart 300 illustrates steps performed by a DA in connection with writing to a track of a standard logical device to which a virtual device has been previously established. Processing begins at a first step 302 where it is determined if any protection bits for the track being written on the standard logical device have been set. If it determined at the test step 302 that the protection bits are not set, then control transfers from the step 302 to a step 304, where a normal write operation is performed. That is, at the step 304, data is written to the standard logical device in a conventional fashion without regard to the existence of a virtual device that had been previously established to the standard logical device. Following the step 304, processing is complete.

If it is determined at the test step 302 that one or more protection bits have been set on the track of the standard logical device that is being written, control passes from the step 302 to a step 306, where a free track of the log device is obtained. The free track of the log device is needed to copy data from the track of the standard logical device. Also, as described in more detail elsewhere herein, free tracks of the log device may be managed using a doubly-linked list of the free tracks. Thus, at the step 306, it may be possible to obtain a free track by traversing the list of free tracks of the log device and modifying the pointers appropriately to remove one of the free tracks for use.

Following the step 306 is a step 308, where, for each virtual device that corresponds to a protection bit that was determined to be set at the test step 302, the pointers of the virtual devices, which initially pointed to the track being written on the standard logical device, are modified at the step 308 to point to the free track of the log device obtained at the step 306. As discussed above, it is possible to have more than one virtual device established to a standard logical device. For each virtual device that has been established to a particular standard logical device, a specific protection bit will be set for each of the tracks of the standard logical device. Thus, at the step 308, the track pointers are changed for all the virtual devices corresponding to a set protection bit detected at the step 302. The track pointers in the device tables of virtual devices are modified to point to the new track that was obtained at the step 306.

Following the step 308 is a step 312, where the data is caused to be copied from the standard logical device to the new track on the log device that was obtained at the step 306. In an embodiment disclosed herein, the data may be copied by moving the data from disk storage to the global memory of the storage device (e.g., into a cache slot), and then setting a write pending indicator to cause the data to be copied to the track of the log device obtained at the step 306. The step 312 represents copying the data from the track of the standard logical device that is being written to the new track of the log device obtained at the step 306. Since all the pointers are modified at the step 308, any virtual device that has been established to the standard logical device prior to the track being written now points to the old data (i.e., the data as it existed on the track of the standard logical device when the virtual devices were established). Note also that, in connection with copying the track, the protection bits of the standard logical device track are copied to virtual device map bits for the track on the log device, which is explained in more detail elsewhere herein.

Following the step 312 is a step 314, where the track of the log device obtained at the step 306 is modified so that the extra bytes in the table (discussed elsewhere herein) are made to point back to the track of the standard logical device that is being written. Having the track of the log device point to the corresponding track of the standard logical device from which the data was provided is useful in many instances. For example, it may be useful in connection with data recovery. Following the step 314 is a step 316, where the protection bits of the tracks of the standard logical device being written are cleared. Following the step 316 is a step 318, where status is sent to the HA. Following the step 318, processing is complete.

Note that once the HA receives status, the HA may perform a normal write operation and, in that case, at the test step 302, the protection bits will not be set, since the bits are cleared at the step 316. The HA that is performing the write operation sees the protection bits that are set at the step 302 and sends a protection request to the appropriate DA. The HA then may disconnect from the DA and wait for status to arrive from the DA indicating that a normal write may be performed. While the HA is disconnected and waiting for status from the DA, the DA may perform the steps disclosed in the flow chart 300. This is described in more detail below.

Figure 12:
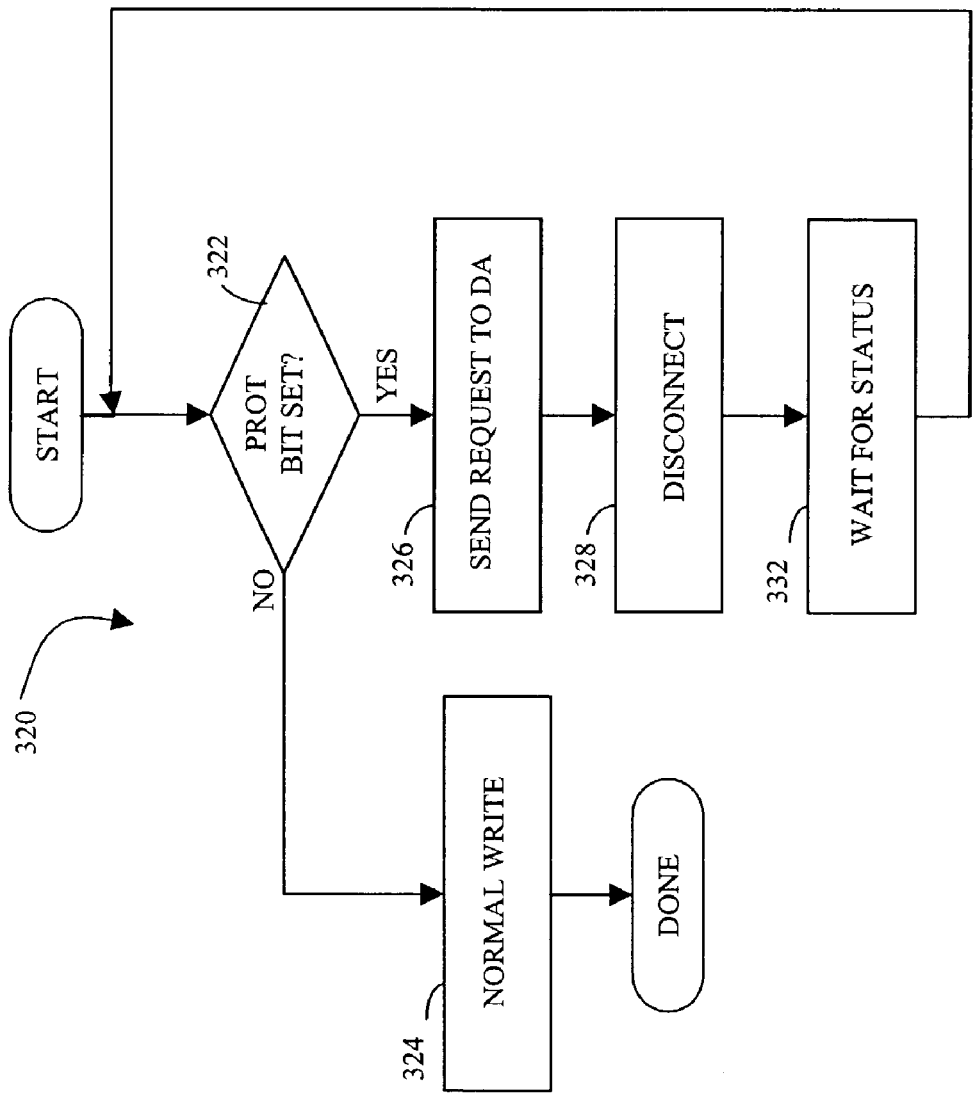
FIG. 12 is a flow chart illustrating steps performed by a host adapter in connection with writing to a standard logical device to which a virtual device has been established according to the system described herein.

Referring to FIG. 12, a flow chart 320 illustrates steps performed by an HA in connection with a write to a standard logical device to which one or more virtual devices have been established. Processing begins at a first test step 322, where it is determined if any protection bits are set for the tracks of the standard logical device that are being written. If it is determined at the test step 322 that no protection bits are set, then control passes from the step 322 to a step 324, where a normal write is performed. Following the step 324, processing is complete.

If it is determined at the test step 322 that one or more protection bits are set for the tracks of the standard logical device that are being written, control passes from the step 322 to a step 326, where the HA sends a request to the DA indicating that protection bits are set for the tracks. When the DA receives the request that is sent at the step 326, the DA performs the operations set forth in the flow chart 300 of FIG. 11, discussed above. Following the step 326 is a step 328, where the HA disconnects from the DA in order to allow (possibly unrelated) operations to be performed with the DA by other processes and/or other HA's.

Following the step 328 is a step 332, where the HA waits for the DA to perform the operations set forth in the flow chart 300 of FIG. 11 and to send status to the HA indicating that the appropriate steps have been performed to handle the set protection bits. Following the step 332, processing transfers back to the step 322, where the protection bits for the track of the standard logical device are again tested. Note that on a second iteration, it is expected that the protection bits of the track of the standard logical device that are being written would be clear at the step 322, since the DA would have cleared the protection bits in connection with performing the steps of the flow chart 300. Of course, it is always possible that a new virtual device will be established to the standard logical device in between the DA clearing the protection bits and the step 322 being executed again. However, it is usually expected that the second iteration of the step 322 for a particular track of the standard logical device will determine that all the protection bits are clear, and control will transfer from the step 322 to the step 324 to perform a normal write.

Figure 13:
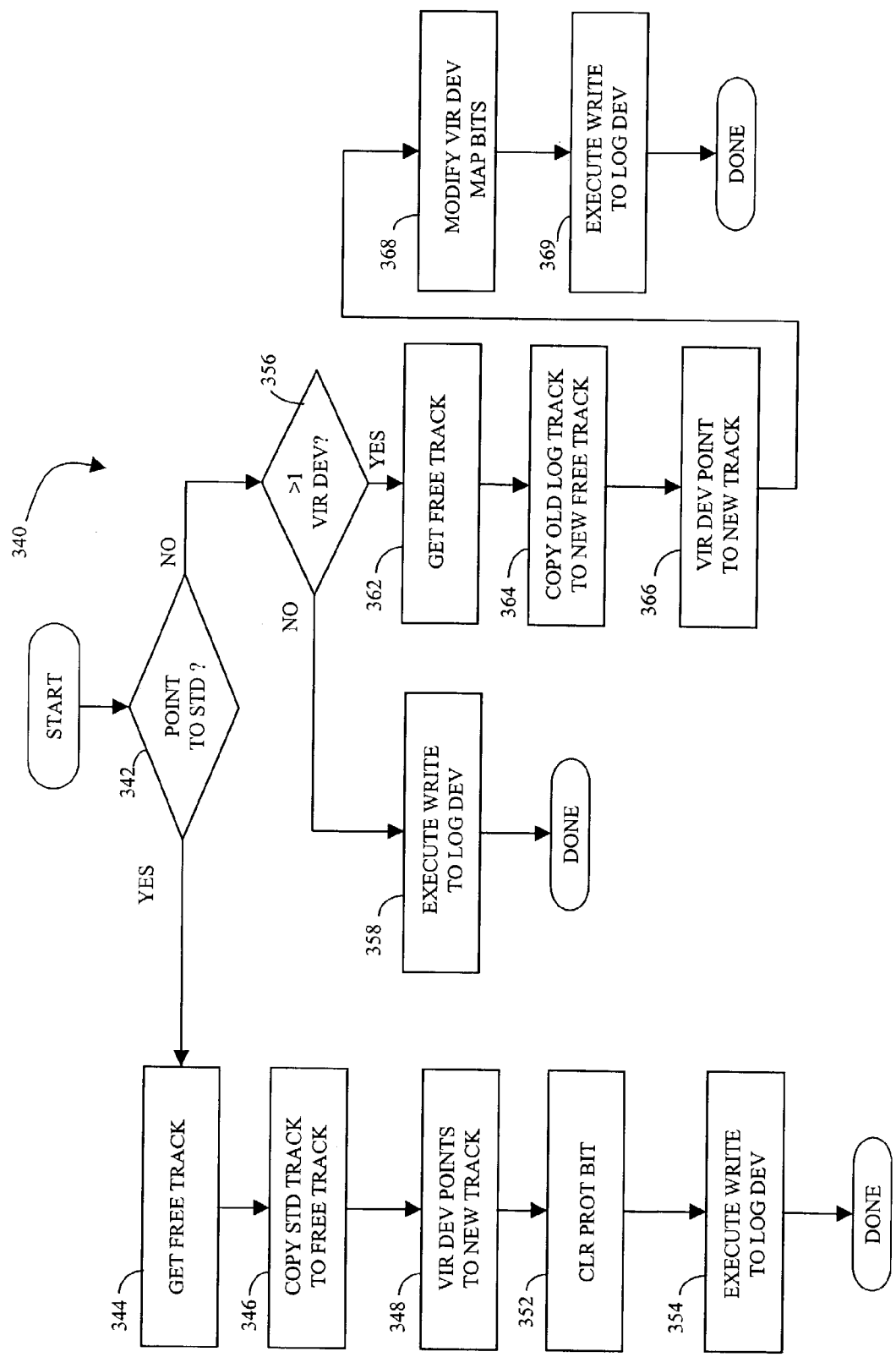
FIG. 13 is a flow chart illustrating steps performed in connection with writing to a virtual device according to the system described herein.

Referring to FIG. 13, a flow chart 340 illustrates steps performed in connection with writing to a virtual device. The flow chart 340 represents steps performed by both the HA and the DA and thus could have been provided as two flow charts, similar to the flow chart 300 of FIG. 11 and the flow chart 320 of FIG. 12. However, it will be understood by those of ordinary skill in the art that the flow chart 340 may represent a division of steps similar to those set forth in the flow charts 300, 320 and described in the corresponding portions of the text of the specification.

Processing begins at a first step 342, where it is determined if the virtual device points to the standard logical device. If so, then control transfers from the test step 342 to a step 344, where a free track of the log device is obtained. Following the step 344 is a step 346, where data from the standard logical device corresponding to the track being written is caused to be copied from the standard logical device to the track of the log device obtained at the step 344. Following the step 346 is a step 348, where the virtual device pointer for the track is adjusted to point to the track obtained at the step 344. Following the step 348 is a step 352, where a protection bit corresponding to the virtual device is cleared in the track data of the standard logical device, thus indicating that no special processing on behalf of the virtual device is required when writing to the track of the standard logical device. Following the step 352 is a step 354, where the write is executed. At the step 354, the data to be written may be a track or a portion of a track that is written to the track obtained at the step 344. Following the step 354, processing is complete. If the data corresponds to an entire track, then it may be possible to eliminate the step 346, which copies data from the track of the standard logical device to the new track of the log device, since writing an entire track's worth of data at the step 354 would overwrite all of the data copied at the step 346.

If it is determined at the test step 342 that the pointer for the track of the virtual devices being written does not point to the standard logical device, then control transfers from the step 342 to a test step 356, where it is determined if more than one virtual devices have been established to the standard logical device. If not, then control transfers from the step 356 to a step 358, where a normal write operation to the track of the log device is performed. If it is determined at the test step 356 that there is more than one virtual device established to the standard logical device, then control transfers from the step 356 to a step 362, where a free track from the log device is obtained.

Following the step 362 is a step 364, where the data of the track corresponding to the virtual device being written is copied to the track obtained at the step 362. Following the step 364 is a step 366, where the virtual device pointers are adjusted to point to the new track. In one embodiment, the pointer for the virtual device that is being written is made to point to the new track. Alternatively, it is possible to not change the pointer for the virtual device that is being written and, instead, adjust all the pointers for all of the other virtual devices that point to the track at the step 366.

Following the step 366 is a step 368 where the virtual device map bits for the tracks of the log device are modified. For the log device tracks, the virtual device map bits may be used to indicate which virtual devices point to each track, where, in one embodiment, there are sixteen virtual device map bits and each bit corresponds to a particular virtual device. Thus, the test at the step 356 may examine the virtual device map bits for the track.

Following the step 368 is a step 369, where the write is executed. Note that whether the write is executed to the track obtained at the step 362 or to the track that is initially pointed to by the virtual device being written depends upon how the pointers are adjusted at the step 366. In all cases, however, data is written to the track pointed to by the virtual device to which the data is being written. Following the step 369, processing is complete.

Figure 14:
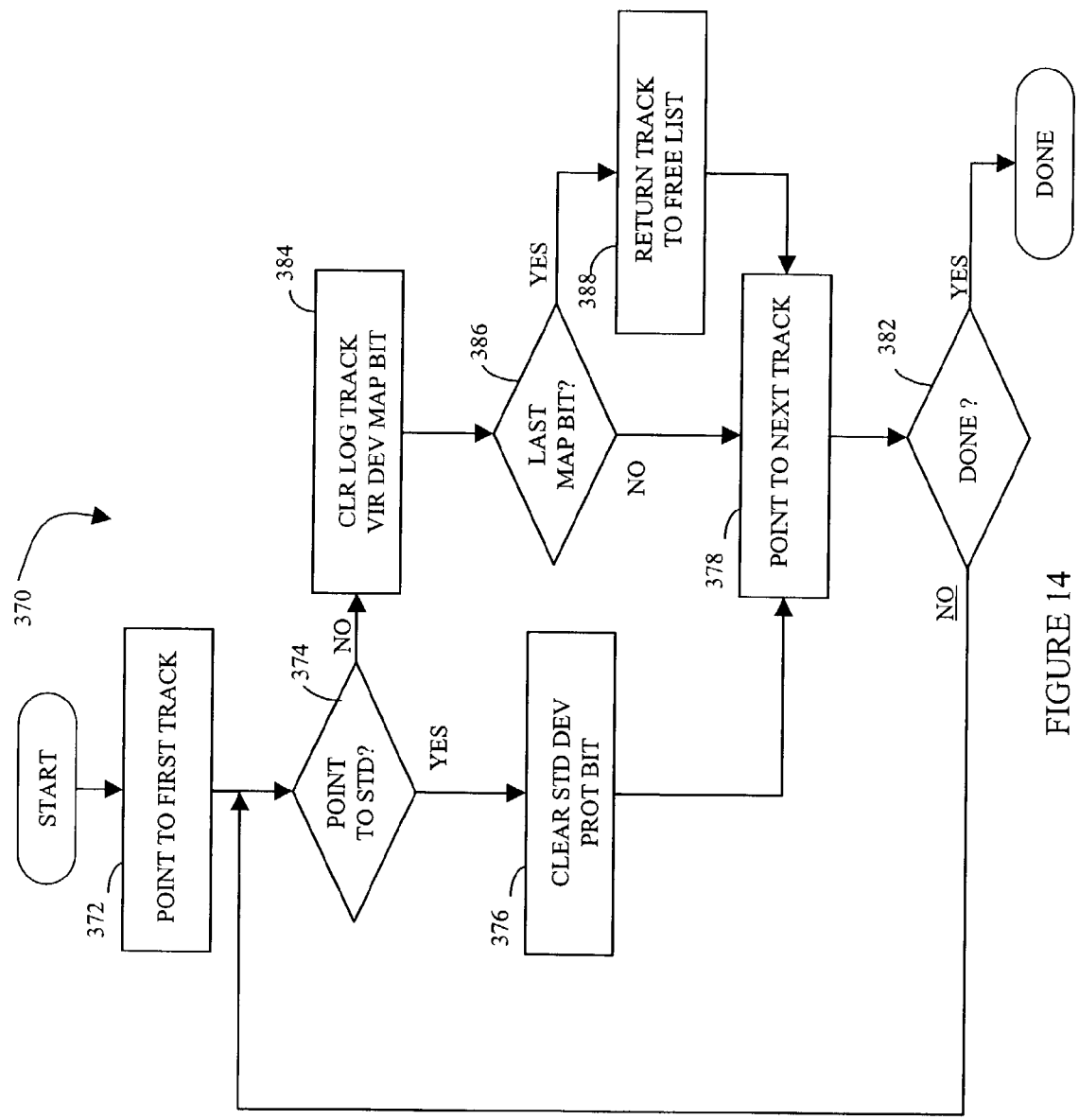
FIG. 14 is a flow chart illustrating steps performed in connection with removing a virtual device.

Referring to FIG. 14, a flow chart 370 illustrates steps performed in connection with removing (i.e., eliminating) a virtual device. Once a virtual device has been established and used for its intended purpose, it may be desirable to remove the virtual device. Processing begins at a first step 372, where a pointer is set to point to the first track of the virtual device. The virtual device is removed by examining each track corresponding to the virtual device.

Following the step 372 is a step 374, where it is determined if the track of the virtual device that is being examined points to the standard logical device. If so, then control transfers from the step 374 to a step 376 to clear the protection bit on the track of the standard logical device corresponding to the virtual device being removed. Following the step 376 is a step 378, where a pointer points to the next track of the virtual device in order to continue processing by examining the next track. Following the step 378 is a step 382, where it is determined if processing complete (i.e., all the tracks of the virtual device have been processed). If not, then control transfers from the step 382 back to the test step 374, discussed above.

If it is determined at the test step 374 that the track of the virtual device being examined does not point to the standard logical device, then control transfers from the step 374 to a step 384, where a virtual device map bit on the track of the log device that corresponds to the virtual device being removed is cleared. Each track of the log device may have a set of virtual device map bits indicating which virtual devices use the track of the log device. Thus, at the step 384, the virtual device map bit corresponding to the virtual device being removed is cleared.

Following the step 384 is a test step 386, where it is determined if the bit that was cleared at the step 384 was the last virtual device map bit that was set for the track. In other words, the test step 386 determines if there are other virtual devices that are using the track on the log device. If it is determined at the test step 386 that the last virtual device map bit was cleared at the step 384 (and thus, no other virtual devices use the track), then control transfers from the step 386 to a step 388, where the track of the log device is returned to the free list of tracks of the log device, discussed elsewhere herein. Following the step 388, or following the step 386 if it is determined that the bit cleared at the step 384 is not the last virtual device map bit of the track of the log device, is the step 378, discussed above, where the next track of the virtual device is pointed to for subsequent examination. Once all of the tracks corresponding to the virtual device have been processed, the tables and other data structures associated with the virtual device may also be removed although, in some embodiments, the tables and other data structures from the virtual device may be maintained, so long as the virtual device is not made available for use by hosts after the virtual device is deestablished.

In some embodiments, the virtual device may be made not ready to hosts prior to performing the steps illustrated by the flow chart 370. Alternatively, it may be possible to perform the steps illustrated by the flow chart 370 while the virtual device is ready to hosts and to simply issue an error message to any host that attempts to access the virtual device while the steps of the flow chart 370 are being performed and/or to any host attempting to access a track of the virtual device that has already been destroyed (i.e., returned to the list of free tracks).

Any one of a variety of techniques may be used for setting the protection bits on the tracks of the standard logical device at the step 216 of FIG. 8. For example, the protection bits for the tracks of the standard logical device may be set by locking the entire standard logical device (thus prohibiting any other access to the standard logical device) while all of the protection bits are being set. However, locking the entire standard logical device while all of the protection bits are being set may be unacceptable in certain instances. Accordingly, other techniques, described below, are available to set the protection bits in a way that does not necessarily cause the standard logical device to be inaccessible for as long as it takes to set all of the protection bits for all of the tracks.

Figure 15C:
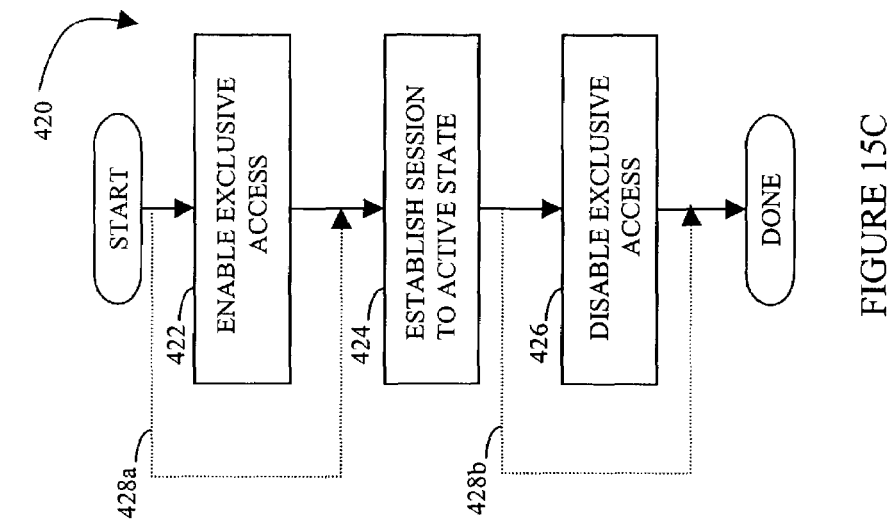
FIGS. 15A, 15B, and 15C are flow charts illustrating modifying protection bits of tracks of a storage device according to an embodiment of the system described herein.
Figure 15B:
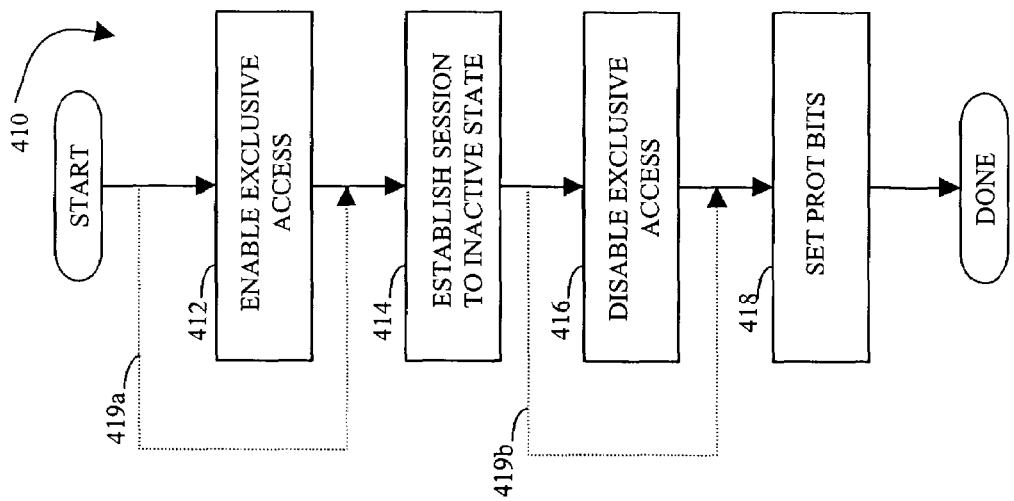
Figure 15A:
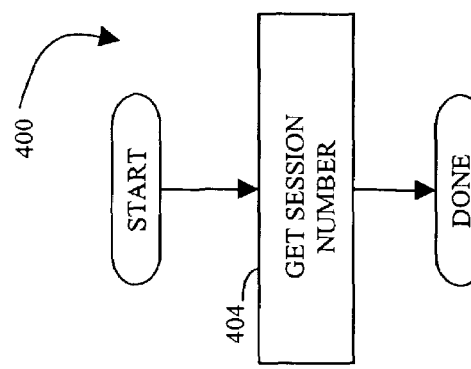

Referring to FIGS. 15A, 15B, and 15C, flow charts 400, 410, 420 illustrates steps performed in connection with a technique for setting protection bits of a standard logical device. The flow charts 400, 410, 420 are shown separately to illustrate that different parts of the process may be performed separately.

In the first flow chart 400 of FIG. 15A, processing begins at a first step 404, where a session number is obtained to reserve a particular session. In some embodiments, reserving a session number may be referred to as "attaching a session". In an embodiment disclosed herein, each particular session number corresponds to a particular bit position of a protection bit mask (i.e., corresponds to a particular protection bit). Following the step 404, processing is complete. In some embodiments where multiple processes may attempt to obtain a session number simultaneously, it may be necessary to provide additional functionality so that no two processes obtain the same session number. This functionality may be provided, for example, by locking the session resources (using software locks, hardware locks, or both) prior to obtaining the session number and then unlocking after obtaining the session number. Of course, other techniques exist and may be used to provide that the step 404 returns a unique session number to any process that requests a session number, even if multiple processes are requesting a session number at the same time.

Referring to FIG. 15B, the flow chart 410 illustrates steps for establishing a session to an inactive state and setting the protection bits. Processing begins at a first step 412, where the calling process is provided with exclusive access to the standard logical device (or at least to the portions the standard logical device relating to the operations that follow). In some instances, it is useful to provide a calling process with exclusive access to the resources being manipulated because simultaneous (or near simultaneous) accesses by multiple processes could cause improper operation. Thus, at the step 412 and in other instances throughout this application, exclusive access is given to a calling process. In addition, the mechanism for providing exclusive access could include any one of a variety of techniques, such as hardware locks, software locks (e.g., of system level data), time slicing, etc. Of course, in embodiments where there can only be one possible calling process (e.g., a non-multitasking system), it may not be necessary to perform any processing like that illustrated in the step 412 to enable exclusive access to a calling process.

Following the step 412 is a step 414 where the session (reserved previously at the step 404, discussed above) is established to an inactive state. In an embodiment herein, establishing the session to an inactive state involves moving a first value to a location in the header of the device table for the standard logical device. As discussed above, FIG. 5 shows the header field 114 in the device table 112. The header field 114 can contain various data locations, each of which corresponds to one of the protection bits (i.e., where each bit position corresponds to a particular session number). A value placed at each of the locations indicates the operation to be performed when a write occurs to a track having the corresponding one of the protection bits set. For example, there may be sixteen byte-length data locations in the header field 114, where each data location corresponds to one of sixteen possible protection bits (e.g., byte zero corresponds to protection bit zero, byte one corresponds to protection bit one, etc.). At the step 414, a first value is provided to one of the locations of the header field 114 to set the corresponding session to an inactive state.

Setting the session to an inactive state at the step 414 causes no operations to be performed when the corresponding protection bit is set. Thus, when a write occurs to a track where the protection bit is set, the code that handles management of protection bits will fetch the corresponding data from the device header, which in this case will indicate that the corresponding session is in an inactive state. In response to this, the code that handles management of protection bits will leave the protection bit set and will perform no other operations. The utility of this is discussed elsewhere herein.

Following the step 414 is a step 416 where the exclusive access provided at the step 412 is disabled. Disabling exclusive access at the step 416 allows multiple processes simultaneous access to the resources to which exclusive access was provided at the step 412. In some embodiments, disabling exclusive access at the step 416 simply undoes whatever was done at the step 412 (e.g., unlocking locked resources).

Following the step 416 is a step 418 where the corresponding protection bit is set for each of the tracks corresponding to the location of the header field 114 for the session number that was obtained at the step 404. Note that access by multiple process is provided to the standard logical device while the step 418 is performed. However, since the corresponding session is inactive, then any writes to tracks having a bit set at the step 418 that occur while the step 418 is being performed will result in no operations being performed and the protection bit remaining set. Following step 418, processing is complete. Note that the step 418 of setting the protection bits may be performed any time after the session is made inactive (and before the session is made active, discussed below). Thus, the step 418 does not necessarily need to immediately follow the steps performed to make the session inactive.

In some embodiments, it may not be necessary to enable/disable exclusive access to the resources of the standard logical device. For example, if establishing the session to an inactive state at the step 414 may be performed in a single unitary step (e.g., one uninterruptible write operation), it may not be necessary to execute the steps 412, 416. This is illustrated by alternative paths 419a, 419b shown in the flow chart 410.

Referring to FIG. 15C, the flow chart 420 illustrates steps performed to activate a session. Processing begins at a first step 422 where exclusive access to the standard logical device is enabled (like in the step 412, discussed above), thus preventing access thereto by another process. Following the step 422 is a step 424 where the session is made active by, for example, writing a second value to the header field 114 of the table for the standard logical device. The second value is provided in the same location as the first value and overwrites the first value. The second value indicates the special processing that is to be performed in connection with the corresponding protection bit being set. Such special processing is shown, for example, in FIGS. 11 and 12 which illustrate special processing for virtual devices.

Following the step 424 is a step 426 where exclusive access to the standard logical device is disabled. Following the step 426, any subsequent writes to tracks having a set protection bit will cause the special operation to be performed as indicated by the second value provided to the header field 114 of the device table for the standard logical device. For example, if the second value provided at the step 424 indicates that the corresponding track should be copied to a log device, that is the operation that will be performed in connection with a write to a track with a set protection bit. Of course, the second value provided at the step 424 can indicate any one of a number of special processes to be performed in connection with the protection bit for the track being set, such as, for example, processing to be performed in connection with a snap operation. Following the step 426, processing is complete.

Just as with the flow chart 410, discussed above, in some embodiments, it may not be necessary to enable/disable exclusive access to the resources of the standard logical device used in connection with the step 424. For example, if establishing the session to an active state at the step 424 may be performed in a single unitary step (e.g., one write operation), it may not be necessary to execute the steps 422, 426. This is illustrated by alternative paths 428a, 428b shown in the flow chart 420.

Figure 16B:
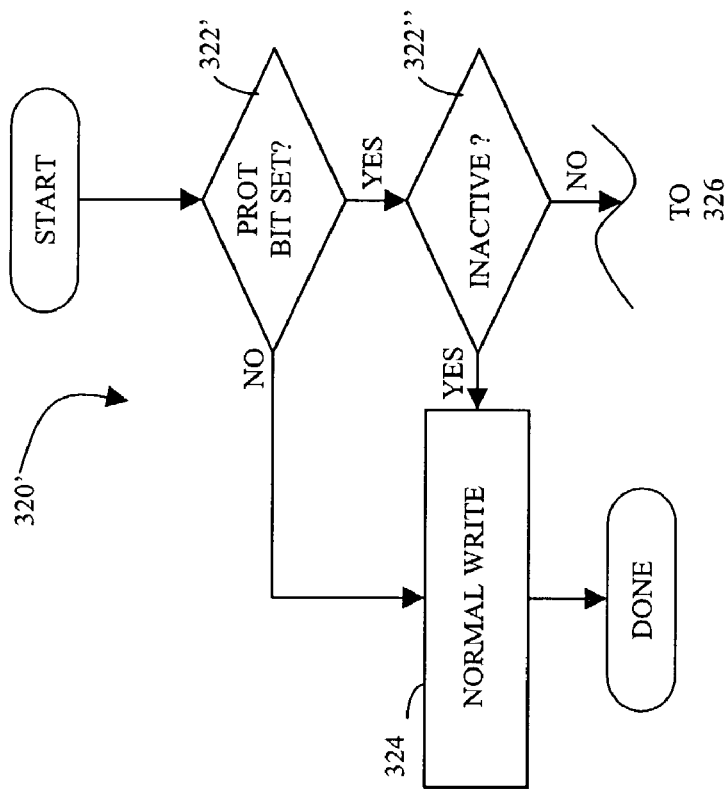
FIGS. 16A and 16B are portions of flow charts illustrating alternative processing for the flow charts of FIGS. 11 and 12, respectively, when protection bits are set according to the flow charts of FIGS. 15A, 15B, and 15C.
Figure 16A:
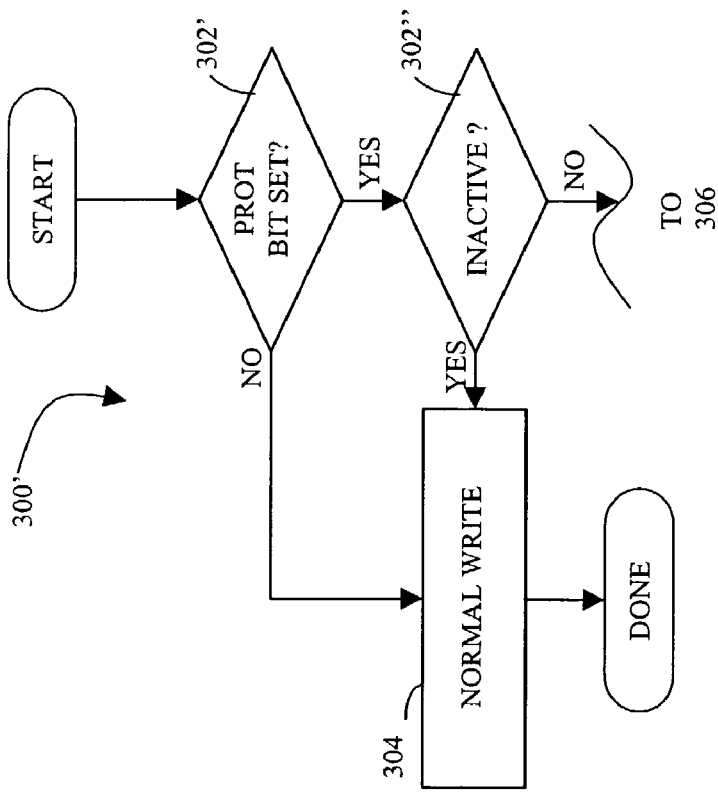

Referring to FIG. 16A, a portion of a flow chart 300' shows steps that correspond to steps of the flow chart 300 of FIG. 11. The steps of the flow chart 300' are modified to account for the use of the protection bit scheme illustrated in FIGS. 15A, 15B, and 15C and described above. A pair of steps 302', 302" replace the step 302 of the flow chart 300 of FIG. 11. The step 302' is a test step like the step 302 where it is determined if the protection bit for the track being written to is set. If not, then control passes from the step 302' to the step 304, discussed above in connection with FIG. 11, where a normal write is performed. Following the step 304, processing is complete.

If it is determined at the test step 302' that the protection bit of the track being written to is set, control passes from the step 302' to the test step 302" where it is determined if the corresponding session is inactive. As discussed above in connection with FIGS. 15A, 15B, and 15C, a session may be inactive so that no operations are performed in response to the protection bit being set. If it is determined at the test step 302" that the session is inactive, then control passes from the step 302" to the step 304, discussed above. Otherwise, control passes from the step 302" to continue on processing at the step 306, discussed above in connection with FIG. 11.

Referring to FIG. 16B, a portion of a flow chart 320' shows steps that correspond to steps of the flow chart 320 of FIG. 12 that are modified to account for the use of the protection bit scheme illustrated in FIGS. 15A, 15B, and 15C and described above. A pair of steps 322', 322" replace the step 322 of the flow chart 320 of FIG. 12. The step 322' is a test step like the step 322 where it is determined if the protection bit for the track being written to is set. If not, then control passes from the step 322' to the step 324, discussed above in connection with FIG. 12, where a normal write is performed. Following the step 324, processing is complete.

If it is determined at the test step 322' that the protection bit of the track being written to is set, control passes from the step 322' to the test step 322" where it is determined if the corresponding session is inactive. If it is determined at the test step 322" that the corresponding session is inactive, then control passes from the step 322" to the step 324, discussed above. Otherwise, control passes from the step 322" to continue on processing at the step 326, discussed above in connection with FIG. 12.

Establishing a virtual device to a standard logical device may be performed using three separate system calls. The first, Register, reserves a session number and corresponding bit position in the protection bits of the standard logical device and, for some embodiments, creates or obtains a corresponding virtual device. The second, Relate, relates a virtual device with the standard logical device by modifying the pointers for the virtual device, as described above, and also sets the protection bits of the standard logical device. The third, Activate, causes the virtual device to represent a point in time copy at the time that Activate is invoked and, in some cases, makes the virtual device ready to a host. In the case of using three system calls, the steps 214, 216, 217, 218 of FIG. 8, discussed above, may not be performed or may be performed differently, as set forth in the discussion below.

In addition, as described in more detail below, it may be possible perform the Register and Relate steps for multiple pairs of virtual devices and standard logical devices and then perform a single Activate step that causes all of the virtual devices to be established to their corresponding standard logical devices. Note also that, for purposes of the description herein, standard logical device may refer to any logical storage device generally having its own storage tracks (even if some of the tracks could be indirect at times) while virtual storage device may refer to a storage device that, by definition, uses storage tracks of other devices.

Figure 17:
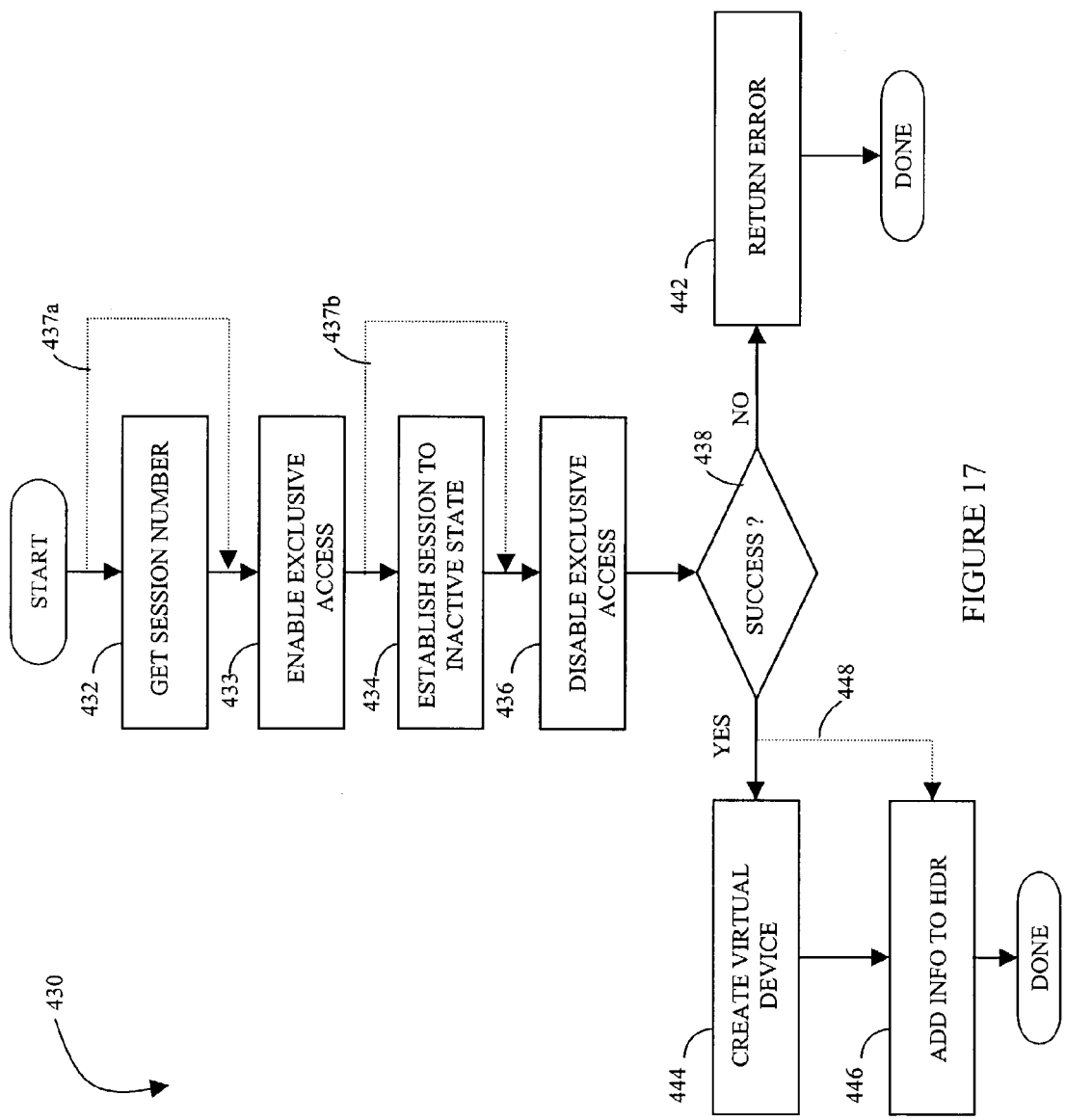
FIG. 17 is a flow chart illustrating registering a standard logical device/virtual device pair according to the system described herein.

Referring to FIG. 17, a flow chart 430 illustrates steps performed in connection with registering a standard logical device. Registering may be performed using a system call (syscall) that is passed identifiers for the standard logical device and, for some embodiments, a corresponding virtual device. In some embodiments, the Register syscall may be passed only the standard logical device and may return an identifier for a virtual device created by the Register syscall. In other embodiments, the Register syscall does not handle any virtual devices and is simply passed a standard logical device.

Processing begins at a first step 432 where a session number is reserved in a manner similar to that discussed above in connection with the step 404 of FIG. 15A. Following step 432 is a step 433 where exclusive access to appropriate resources (e.g., of the standard logical device) is enabled in a manner similar to that discussed above in connection with FIGS. 15B and 15C. Following the step 433 is a step 434 where the corresponding session is established to an inactive state in a manner similar to that discussed above in connection with the step 414 of FIG. 15B. Following the step 434 is a step 436 where exclusive access to appropriate resources is disabled in a manner similar to that discussed above. Note that establishing the session to an inactive state does not alter write processing to the standard logical device. Note also that, just as with FIGS. 15B and 15C, for some embodiments it may not be necessary to enable and disable exclusive access to the resources used in connection with the step 434. This is illustrated by alternative paths 437a, 437b.

Following the step 436 is a test step 438 which determines if the operations performed at the previous steps 432-434, 436 were successful. The operations may not have been successful for a variety of reasons including, for example, the fact that all of the protection bits for the standard logical device have already been used for other purposes. In an embodiment illustrated herein, there are sixteen protection bits. Thus, if prior to executing step 432, all sixteen protection bits for the standard logical device are being used, then the result at the test step 438 will indicate that the previous operations were not successful. If it is determined at the test step 438 that the previous operations were not successful, control passes from the step 438 to a step 442 where an error is returned. Following step 442, processing is complete.

If it is determined at the test step 438 that the previous operations were successful, then control passes from the step 438 to a step 444 where the virtual device is created. In some embodiments, the virtual device is created at the step 444 and passed back to the caller of the Register routine. In other embodiments, the virtual device may exist prior to invoking the Register routine, in which case there is no need to create a new virtual device at the step 444. In still other embodiments (discussed below), the Register routine does not handle (i.e., create or get passed) any virtual devices. Rather, the virtual device may be created or obtained in a separate step either before or after the Register routine, such as in connection with a Relate routine (described below), or as part of a general system configuration.

Following step 444 is a step 446 where information regarding the standard logical device (and perhaps a virtual device, if one is created and/or used in connection with the Register routine) is placed in the header of the device table for the standard logical device. Providing the information in the header of the device table of the standard logical device facilitates processing later on once the standard logical device and a corresponding virtual device is activated (described below). In some embodiments, it may be useful to enable exclusive access to appropriate resources of the standard logical device prior to placing the information in the header. Following the step 446, processing is complete.

Note that the processing illustrated in the flow chart 430 does not cause any virtual device to be a point in time copy of the standard logical device and does not make any virtual device accessible. The Register routine illustrated by the flow chart 430 corresponds to preliminary operations that facilitate later activation of a standard logical device/virtual device pair. Note also an alternative path 448 from the step 438 to the step 446 illustrates embodiments where the Register routine does not cause any virtual device to be created. Thus, if the Register routine does not handle virtual devices, then control passes from the test step 438 directly to the step 446 via the path 448 if the Register operation was successful.

Figure 18:
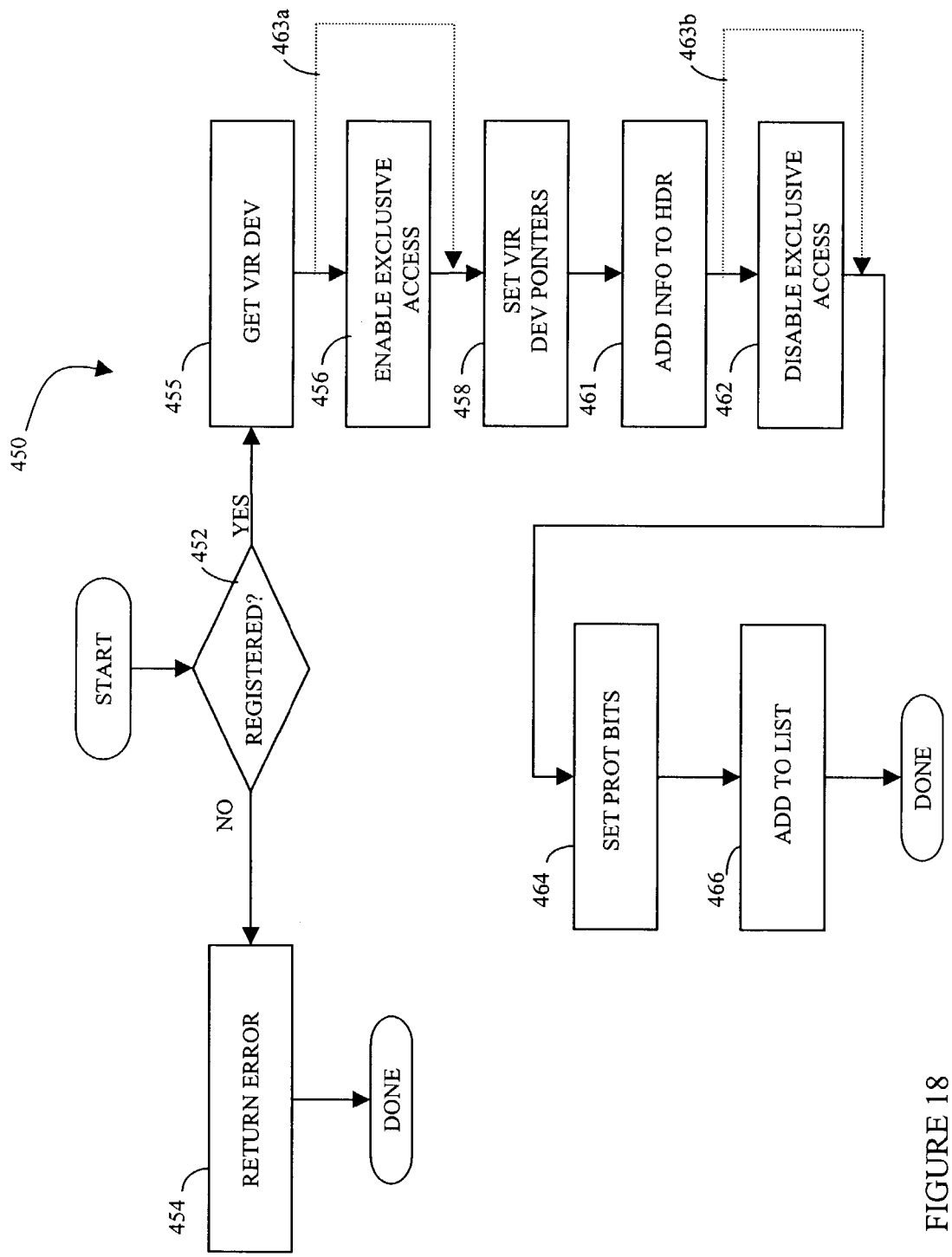
FIG. 18 is a flow chart illustrating relating a standard logical device to a virtual device according to the system described herein.

Referring to FIG. 18, a flow chart 450 illustrates steps performed in connection with relating a virtual device to a standard logical device. Just with the Register routine, the Relate routine is part of the preliminary processing that is performed prior to activation and use of a standard logical device/virtual device pair. Relating may be performed by making a system call in which the parameters are the standard logical device and, for some embodiments, a corresponding virtual device (passed, for example, by a host). In other embodiments, the Relate routine may cause a virtual device to be created (e.g., by calling a separate create routine) or may simply obtain a preexisting unused virtual device that is provided in connection with system configuration or provided by some other means. In those embodiments, the Relate routine may be passed a pointer to storage that the Relate routine uses to place an identifier for the newly created/obtained virtual device.

Processing begins at a first test step 452 where it is determined if the standard logical device being related has been previously registered. Note that the Relate routine may not be called for a standard logical device unless the standard logical device has been previously registered. If the standard logical device has not been registered, then control passes from the step 452 to a step 454 wherein an error is returned. Following the step 454, processing is complete. Note that the step 454 (and other error steps described herein) may actually refer to separate error processing that does something different than report errors. For example, the processing performed at the step 454 may include measure taken to correct an error and continue processing.

If it is determined that the test step 452 that the standard logical device has been registered, then control passes from the step 452 to a step 455 where a virtual device is obtained for pairing with the standard logical device. In some embodiments, the virtual device is created or obtained in connection with the Register routine (or at least before the Relate routine is called), in which case the step 455 may represent the Relate routine being passed the virtual device previously created (by, for example, a host) or obtained and an identifier for the virtual device is passed back to the calling routine. In other embodiments, the virtual device is created or obtained by the Relate routine at the step 455. Following the step 455 is a step 456 where exclusive access to appropriate resources (e.g., the standard logical device) is enabled in a manner similar to that discussed above in connection with FIGS. 15B and 15C. Following the step 456 is a step 458 where all the pointers in the device table for the virtual device are made to point to corresponding tracks of the standard logical device. The processing performed at the step 458 is analogous to the pointer modifications provided at the step 216 of the flow chart 210 of FIG. 8, discussed above. Following the step 458 is a step 461 where information about the standard logical device/virtual device pair is placed in the headers of both the standard logical device and the virtual device. This information is used in connection with subsequent accesses for the devices, as described elsewhere herein. Following the step 461 is a step 462 where exclusive access to appropriate resources is disabled in a manner similar to that discussed above. In some embodiments, exclusive access may be enabled prior to placing the information in the header and may be disabled after the information is placed therein. Note that, just as with FIGS. 15B and 15C, for some embodiments it may not be necessary to enable and disable exclusive access to the resources used in connection with the step 458 and/or the step 461. This is illustrated by alternative paths 463a, 463b.

Following the step 462 is a step 464 where the protection bits for the standard logical device are set, thus indicating special processing to be performed when a write is provided to a track of the standard logical device. Note, however, that when the protection bits are set at the step 464, no special processing will take place upon writes to the tracks of the standard logical device because, as discussed above, the session is initially inactive. Thus, even though a protection bit may have been set for a track at the step 464, writes to the standard logical device will cause no special processing is to be performed because the session is inactive. This is illustrated above in connection with the steps 302" and 322" of FIG. 16A and FIG. 16B.

Following the step 464 is a step 466 where the standard logical device/virtual device pair is added to a list. As discussed in more detail below, it is possible to activate a plurality of standard logical device/virtual device pairs with one call. The list used at the step 466 contains a list related pairs that have not yet been activated. As discussed in more detail below, the list is used by the Activation routine. Alternatively, the Relate routine may return the standard logical device/virtual device pair (or just the virtual device or just the standard logical device) to the calling routine (e.g., a host application) that maintains the list. Alternatively still, the Relate routine may be passed a list identifier, which is used by the Relate routine to determine a particular list to which the standard logical device/virtual device pair is to be added. In that case, it may be useful to have a separate routine that creates the list identifiers and/or list structures/storage and which maintains the lists. In instances where the list and/or list id is a passed parameter, it may be possible for the calling routine to maintain more than one list. The Relate routine may create the list after being passed a plurality of standard logical devices and, optionally, a corresponding plurality of virtual devices. In that case, the Relate routine may pass back the list that is created.

Figure 19A:
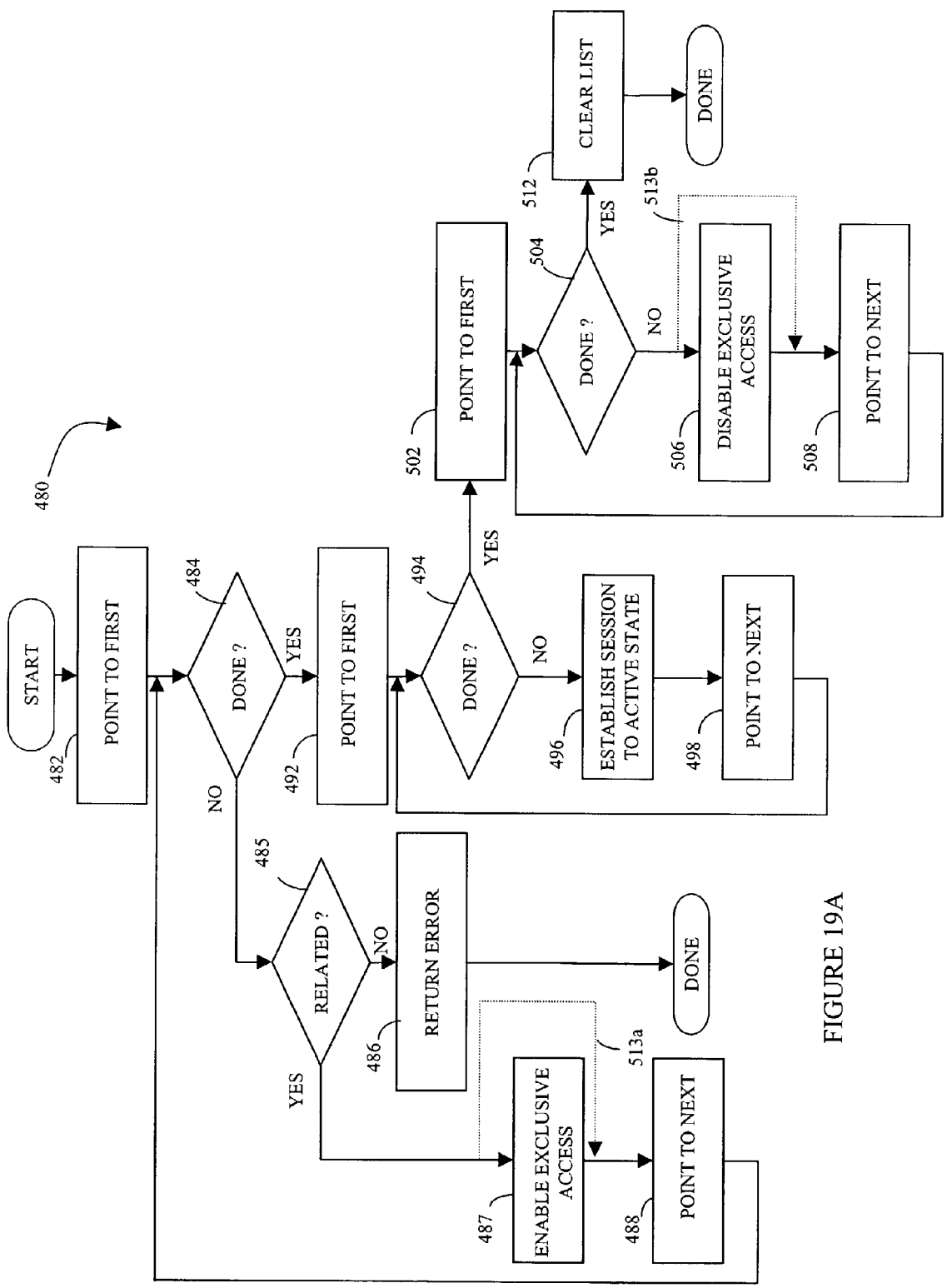
FIG. 19A is a flow chart illustrating steps performed in connection with activation of one or more standard logical device/virtual device pairs according to the system described herein.

Referring to FIG. 19A, a flow chart 480 illustrates steps performed in connection with the Activate routine that activates one or more standard logical device/virtual device pairs. Prior to activation, an unused virtual device is not ready to any host. However, in the course of activation, a virtual device is made ready to one or more hosts.

Processing begins at a first step 482 where a pointer is set to point to the first item on a list like the list described above in connection with the step 466 of the flow chart 450. The pointer is used to point to various elements on the list. The list may be passed as a parameter to the Activate routine. Alternatively, a list id may be passed where the list id is used by the Activate routine to distinguish between lists to which the Activate routine has access. Alternatively still, the Relate and Activate routines may use a single global list so that any call to the Activate routine causes all previously-related standard logical device/virtual device pairs to be activated. Of course, instead of a formal list structure, it may be possible to pass each of the standard logical device/virtual device pairs as parameters to the Activate routine.

Following the step 482 is a test step 484 where it is determined if processing is complete (i.e. if the end of the list has been reached). This may be determined by examining the pointer used to iterate through the list. If processing of the list is not complete, then control passes from the step 484 to a step 485, which determines if the Relate operation was previously performed on the standard logical device/virtual device pair indicated by the pointer. If the Relate operation was not previously performed (and thus no activation is possible), then control transfers from the step 485 to a step 486 where an error is returned. Following the step 486, processing is complete.

If it is determined at the step 485 that the Relate routine was performed on the standard logical device/virtual device pair being activated, then control transfers from the step 485 to a step 487 where exclusive access to appropriate resources (e.g., the standard logical device) is enabled in a manner similar to that discussed above in connection with FIGS. 15B and 15C. Following the step 487 is a step 488 where the pointer is made to point to the next standard logical device/virtual device pair on the list. Following the step 488, control transfers back to the test step 484 to determine if processing of the list is complete.

If it is determined at the test step 484 that processing of the list is complete (and thus all standard logical devices corresponding to virtual devices to be activated have been determined to have been previously related), control passes from the step 484 to a step 492 where the pointer that keeps track of elements on the list is made to point to the first item in the list of standard logical device/virtual device pairs. Following the step 492 is a test step 494 where it is determined if the entire list has been processed. If not, then control transfers from the step 494 to a step 496 to activate the session corresponding to the protection bit that has been set for the standard logical device/virtual device pair. Activating the session at the step 496 is analogous to the processing performed at the step 424 in the flow chart 420, of FIG. 15C, discussed above. Activating the session at the step 496 causes the special virtual device processing, discussed elsewhere herein, to be performed when a write occurs to a track of the standard logical device having a set protection bit. In addition, activating a session makes the virtual device ready to a host. Following the step 496 is a step 498 where the pointer that is keeping track of the processed items on the list is made to point to the next item. Following the step 498, control transfers back to the test step 494.

If it is determined at the test step 494 that the entire list of standard logical device/virtual device pairs has been processed (so that all standard logical devices corresponding to virtual devices being activated have had the corresponding sessions made active), control transfers from the step 494 to a step 502 where the pointer is made to point to the first standard logical device/virtual device pair in the list. Following the step 502 is a step 504 where it is determined if the entire list has been processed. If is determined that the entire list has been processed, control transfers from the step 504 to a step 506 where exclusive access to appropriate resources (obtained at the step 487) is disabled in a manner similar to that discussed above. Following the step 506 is a step 508 where the pointer is made to point to the next item on the list. Following the step 508, control transfers back to the test step 504 to determine if the end of the list has been reached.

If it is determined at the test step 504 that the end of the list has been reached, control transfers from the step 504 to a step 512 where the list is cleared so that a subsequent call to the Activate routine will not attempt to reactivate already activated standard logical device/virtual device pairs. Following the step 512, processing is complete. Note that, just as with FIGS. 15B and 15C, for some embodiments it may not be necessary to enable and disable exclusive access to the resources used in connection with the steps 487, 506. This is illustrated by alternative paths 513*a*, 513*b*.

Note that, in some instances, exclusive access for some standard logical devices of a list may have been enabled at the step 487 prior to one of the devices on the list causing an error at the step 485. In those cases, prior to execution of the step 486, the standard logical devices to which exclusive access has already been enabled have exclusive access thereto disabled in a manner similar to that illustrated above in connection with the steps 502, 504, 506, 508.

In some embodiments, it may be possible to not use a list at the step 466 of FIG. 18 for keeping track of the standard logical device/virtual device pairs. Instead, the Activate routine could be called by passing the various standard logical device/virtual device pairs directly thereto. In that case, the list used in the processing illustrated by the flow chart 480 of FIG. 19A would be the list of parameters passed to the Activate routine.

In other embodiments, it may be possible to provide additional calls such as Begin Group and Process Group where a Begin Group call is provided prior to a plurality of Relate calls (or Register and Relate calls). Then, when it is time to activate the various standard logical device/virtual device pairs that were registered and related after the Begin Group call, the call to Process Group is made. The Process Group call, in effect, activates all of the standard logical device/virtual device pairs that were registered and related after the Begin Group call. Such embodiments may use the list, discussed above in connection with FIGS. 18 and 19A, where a Begin Group call causes creation of a new, empty, list and a Process Group call causes the processing shown in the flow chart 480 of FIG. 19A to be performed. In such a system, a Relate call that is not bracketed by a Begin Group/Process Group pair (i.e. a Relate that is not called after a Begin Group call) could cause the Activate to be executed immediately after the relate is successfully completed. That is, any Register call and Relate call for a standard logical device/virtual device pair that is not after a Begin Group call may cause automatic activation of the standard logical device/virtual device pair. In other embodiments, the Activate call would not be automatic. Note also that, in some embodiments, it may be possible to use multiple lists to separately activate different sets of standard logical device/virtual device pairs. In those cases, the specific list may be a parameter passed to a Process Group call, which could then be passed on, in some fashion, to the Activate routine.

In some embodiments, any one of the Register, Relate and/or Activate calls may include optional parameters for modifying the device name (or other device identifiers) for the virtual device. This may be useful in operating systems where it is impermissible to have two devices that have exactly the same name and/or device identifiers. If a virtual device is a copy of a standard logical device, it may be necessary to change the name of the virtual device. In addition, in some embodiments, it may be possible to have an optional parameter indicating whether the virtual device will be on line or off line upon activation. In some operating systems, an on-line device is accessible to a host (ready to the host) while an off-line device (not ready to a host) is not. Thus, for host applications that wish to create a virtual device but do not wish to permit access thereto, it may be possible to pass a parameter to any one of the Register, Relate and/or Activate calls to indicate that the virtual device is to be on line or off line upon activation.

Figure 19B:
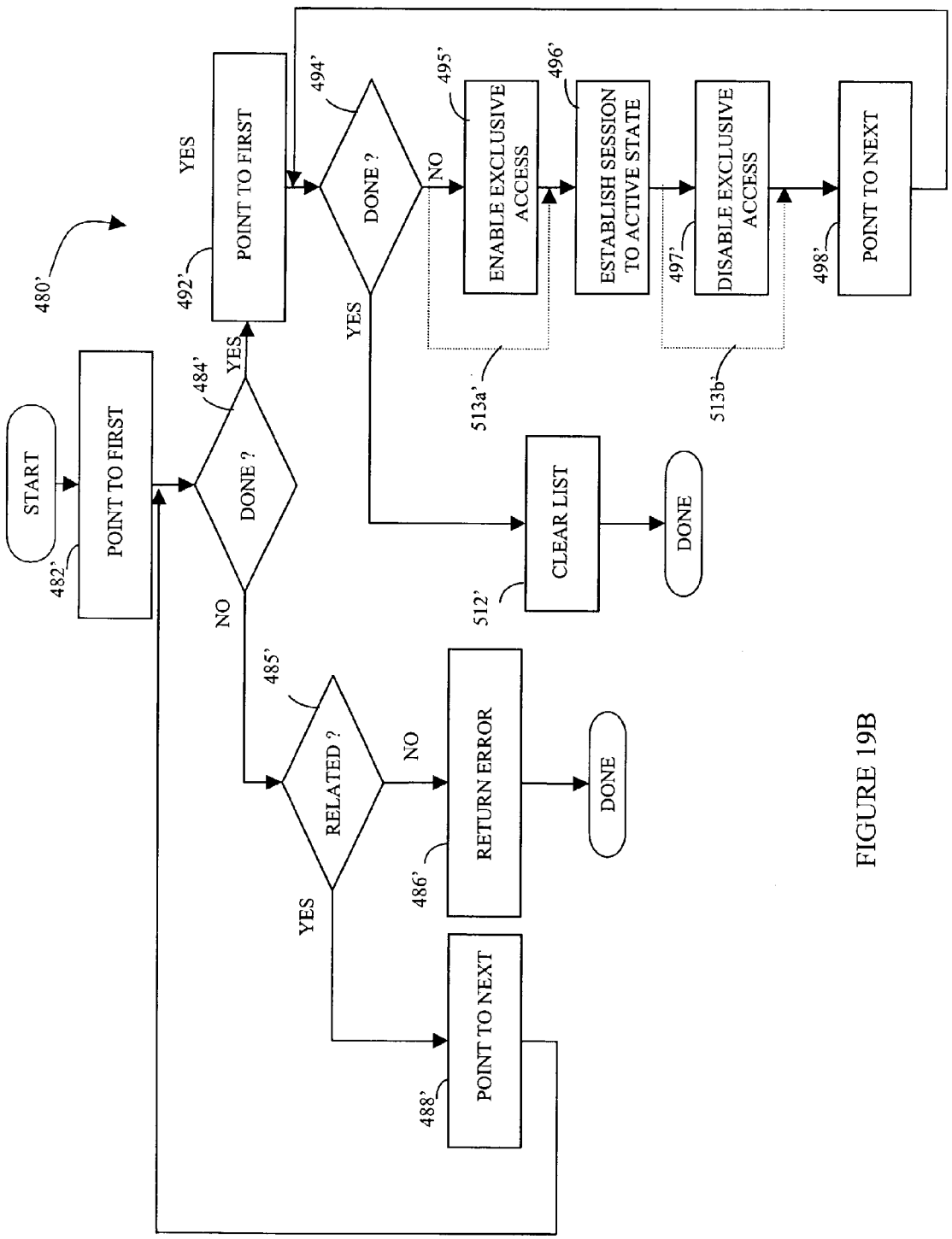
FIG. 19B is a flow chart illustrating steps performed in connection with activation of one or more standard logical device/virtual device pairs according to another embodiment of the system described herein.

Referring to FIG. 19B, a flow chart 480' illustrates steps performed in connection with an alternative embodiment for the Activate routine that activates one or more standard logical device/virtual device pairs. Processing begins at a first step 482' where a pointer is set to point to the first item on a list like the list described above in connection with the step 466 of the flow chart 450. The pointer is used to point to various elements on the list. The list may be passed as a parameter to the Activate routine. Alternatively, a list id may be passed where the list id is used by the Activate routine to distinguish between lists to which the Activate routine has access. Alternatively still, the Relate and Activate routines may use a single global list so that any call to the Activate routine causes all previously-related standard logical device/virtual device pairs to be activated. Of course, instead of a formal list structure, it may be possible to pass each of the standard logical device/virtual device pairs (or only one pair) as parameters to the Activate routine.

Following the step 482' is a test step 484' where it is determined if processing is complete (i.e. if the end of the list has been reached). This may be determined by examining the pointer used to iterate through the list. If processing of the list is not complete, then control passes from the step 484' to a step 485', which determines if the Relate operation was previously performed on the standard logical device/virtual device pair indicated by the pointer. If the Relate operation was not previously performed (and thus no activation is possible), then control transfers from the step 485' to a step 486' where an error is returned. Following the step 486', processing is complete.

If it is determined at the step 485' that the Relate routine was performed on the standard logical device/virtual device pair being activated, then control transfers from the step 485' to a step 488' where the pointer is made to point to the next standard logical device/virtual device pair on the list. Following the step 488', control transfers back to the test step 484' to determine if processing of the list is complete.

If it is determined at the test step 484' that processing of the list is complete (and thus all standard logical devices corresponding to virtual devices to be activated have been reviewed), control passes from the step 484' to a step 492' where the pointer that keeps track of elements on the list is made to point to the first item in the list of standard logical device/virtual device pairs. Following the step 492' is a test step 494' where it is determined if the entire list has been processed. If not, then control transfers from the step 494' to a step 495' where exclusive access to appropriate resources (e.g., the standard logical device) is enabled in a manner similar to that discussed above in connection with FIGS. 15B and 15C. Following the step 495' is a step 496' which activates the session corresponding to the protection bit that has been set for the standard logical device/virtual device pair. Activation the session at the step 496' is analogous to the processing performed at the step 424 in the flow chart 420, of FIG. 15C, discussed above. Activating the session at the step 496' causes the special virtual device processing, discussed elsewhere herein, to be performed when a write occurs to a track of the standard logical device having a set protection bit. Following the step 496' is a step 497' where exclusive access to appropriate resources is disabled in a manner similar to that discussed above. Following the step 497' is a step 498' where the pointer that is keeping track of the processed items on the list is made to point to the next item. Following the step 498', control transfers back to the test step 494'.

If it is determined at the test step 494' that the entire list of standard logical device/virtual device pairs has been processed (so that all standard logical devices corresponding to virtual devices being activated have had the corresponding sessions made active), control transfers from the step 494' to a step 512' where the list is cleared so that a subsequent call to the Activate routine will not attempt to reactivate already activated standard logical device/virtual device pairs. Following the step 512', processing is complete. Note that, just as with FIGS. 15B and 15C, for some embodiments it may not be necessary to enable and disable exclusive access to the resources used in connection with the step 496'. This is illustrated by alternative paths 513a', 513b'.

The alternative embodiment illustrated by the flow chart 480' of FIG. 19B may be used in instances where it is not essential that all standard logical device/virtual device pairs be activated synchronously and/or in instances where a host application performs processing to synchronize activations when necessary. Different options for host application processing that may be used with FIG. 19B (or FIG. 19A) is discussed elsewhere herein.

In some instances, it may be desirable to restore a virtual device back to the corresponding standard logical device or to another standard logical device. That is, it may be useful to convert the virtual device to an actual logical device with its own data storage or transfer a virtual device to another virtual device.

Figure 20C:
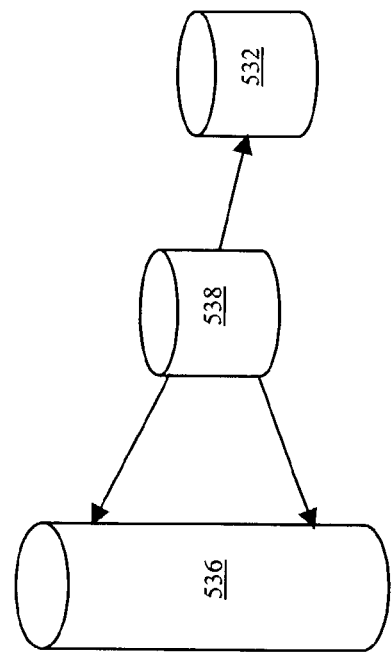
FIGS. 20A, 20B, 20C, 20D, and 20E illustrate different ways to restore a virtual device to a standard logical device or another virtual device according to the system described herein.
Figure 20B:
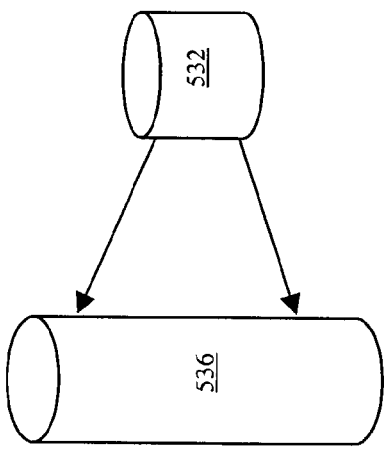
Figure 20A:
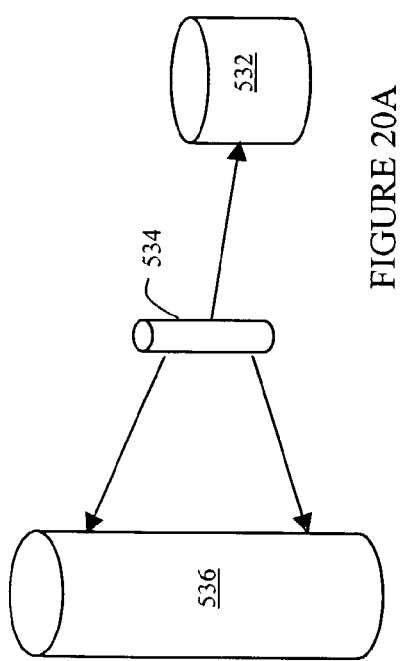

Referring to FIG. 20A, a standard logical device 532 is shown as corresponding to a virtual device 534 and a log device 536 where it is desirable to restore the virtual device 534 to a logical device having its own storage. Note that, in the example of FIG. 20A, some tracks of the standard logical device 532 that are pointed to by the virtual device 534 have not changed since the virtual device 534 was established. Other tracks of the log device 536 that are pointed to by the virtual device 534 correspond to tracks of the standard logical device 532 that have changed since the virtual device 534 was established.

Referring to FIG. 20B, the results of restoring the virtual device 534 to the standard logical device 532 of FIG. 20A (the old std dev) are shown. The virtual device 534 has been eliminated. In addition, for any tracks of the standard logical device 532 that are pointed to by the virtual device 534, no special processing has been performed. However, for tracks of the log device 536 that are pointed to by the virtual device 534, the corresponding tracks of the standard logical device 532 are modified to point to the corresponding tracks of the log device 536. Thus, a host accessing the standard logical device 532 will, in effect, access the data on the track of the log device 536. This indirection mechanism provides a way to restore the standard logical device 532 without having to immediately move all of the data from the log device 536 to the standard logical device 532. In an embodiment herein, the appropriate tracks of a standard logical device 532 are made to point to corresponding tracks of a log device 536 and, in addition, a background copy process copies to the standard logical device 532 any tracks that are pointed to by the standard logical device 532. In an embodiment herein, the background copy process is designed to not appreciably interfere with normal access of the standard logical device 532. In addition, in the case of accessing a track of the standard logical device 532 that points to a track of the log device 536, a copy is also performed when the track is accessed rather than waiting for the background task to copy the track. Note that when a virtual device is restored to the standard logical device to which the virtual device was established, there are no other virtual devices established to the standard logical device. However, for other types of restore, discussed below, there may be more than one virtual device established to a standard logical device prior to restoring the virtual device to another standard logical device or to another virtual device.

Referring to FIG. 20C, another type of restore is illustrated where the data represented by the virtual device 534 of FIG. 20A is copied to a new standard logical device 538. In that case, the new standard logical device 538 consists entirely of indirect tracks that point to either the standard logical device 532 in instances where the virtual device 534 previously pointed to the standard logical device 532 or, alternatively, point to the log device 536 in instances where the virtual device 534 previously pointed to the log device 536. As in the embodiment illustrated in FIG. 20B, a background copy task may be used to copy data from the standard logical device 532 and the log device 536 to the tracks of the standard logical device 538 so that, eventually, the standard logical device 538 will not contain any indirect tracks from the restore operation. Also, as in the embodiment of FIG. 20B, access to a particular track of the standard logical device 538 may cause that track to be copied in connection with the access rather than waiting for the background copy to move the track.

Figure 20D:
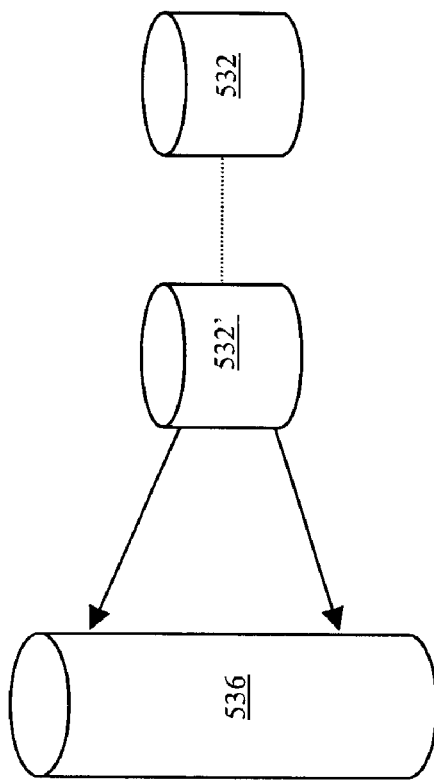

Referring to FIG. 20D, a mirror logical device 532' is a logical volume that represents a point in time copy of the standard logical device 532. Like the standard logical device 532, the mirror logical device 532' contains its own storage for tracks of data. In an embodiment herein, the mirror logical device 532' is first established to the standard logical device 532, which initially causes data to be copied from the standard logical device 532 to the mirror logical device 532'. Once the initial copying is complete, the logical devices 532, 532' are "synced". Write operations performed to the standard logical device 532 are also performed to corresponding tracks of the mirror logical device 532'. Any read operations for a track not in cache may be performed to either of the devices 532, 532'.

After the mirror logical device 532' has been established to the standard logical device 532, it is possible to "split" the devices 532, 532' so that operations performed on one of the devices 532, 532' (e.g., writes) are not automatically performed on the other one of the devices 532, 532'. However, even after splitting the devices 532, 532', there may be a mechanism that keeps track of the changes that occur after the split so that, for example, it is possible to resync the devices 532, 532' after a split without having to copy all of the data from the standard logical device 532 to the mirror logical device 532'.

In the embodiment illustrated by FIG. 20D, the mirror logical device 532' was split from the standard logical device 532 after the virtual device 534 was established to the standard logical device 532. In this case, restoring the virtual device 534 to the mirror logical device 532' is like restoring the virtual device to the standard logical device 532 as shown in FIG. 20B, where tracks of the mirror logical device 532' that have changed after the virtual device 534 was established are made to be indirect pointers to tracks of the log device 536 and tracks that did not change after the virtual device 534 was established may be accessed directly on the mirror logical device 532'. This is explained in more detail below. Note that the embodiment of FIG. 20D exhibits the advantages of the embodiment of FIG. 20B (less indirection and less background copying) and the advantages of the embodiment of FIG. 20C (standard logical device 532 is not modified to perform the restore).

Figure 20E:
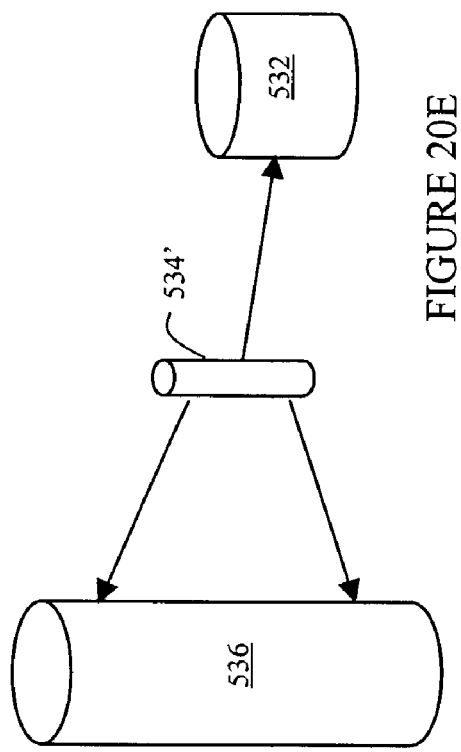

Referring to FIG. 20E, the virtual device 534 is restored to a new virtual device 534'. In this case, the new virtual device 534' is essentially a copy of the original virtual device 534, with pointers to the standard logical device 532 and the log device 536.

In some embodiments, it may be possible to provide an optional parameter for restoring that allows changing the name of the device to which the virtual device is being restored in connection with the restoration. Similarly, an optional parameter may be used so that the device to which the virtual device is being restored may be made on line or off line. In addition, it may be possible to restore multiple devices synchronously using Begin Group and Process Group commands similar to those discussed above in connection with establishing virtual devices.

Figure 21:
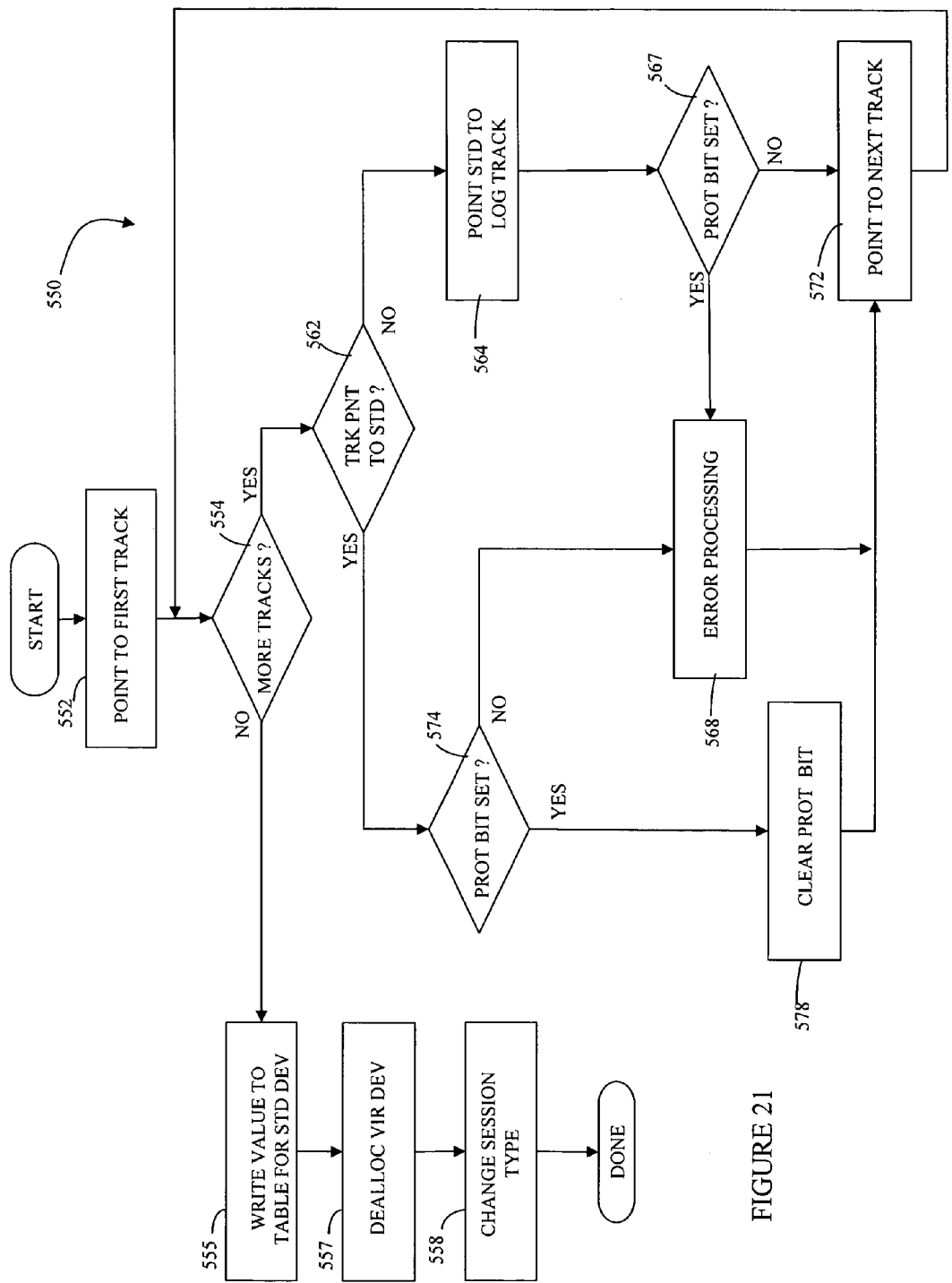
FIG. 21 is a flow chart that illustrates steps performed to restore a virtual logical device to a standard logical device according to a first embodiment of the system described herein.

Referring to FIG. 21, a flow chart 550 illustrates steps performed in connection with performing a restore like that illustrated in FIG. 20B and discussed above where a virtual device is restored to a standard logical device to which the virtual device was previously established. Processing begins at a first step 552 where the first track of the virtual device is pointed to. A pointer is used to iterate through and process each track of the virtual device. Following step 552 is a test step 554, which determines if there are more tracks to be processed. If not, then control transfers from the step 554 to a step 555 where a value indicating that a restore has been performed for the standard logical device is written to a portion of the header field of the device table corresponding to the session that had been used for the virtual device. Following the step 555 is a step 557 where the virtual device is deallocated in a manner similar to that described above in connection with FIG. 14, except, of course, that the log tracks are not returned to the free list.

Following step 557, is a step 558 where the session type is changed. In an embodiment herein, the session type is changed at the step 558 to indicate that the standard logical device has tracks thereon that indirectly point to tracks of the log device (explained in more detail below). For this session type, tracks are gradually migrated from the log device to the standard logical device. This migration may be performed by a system-wide task that resolves indirect tracks for the session type set at the step 558. Alternatively, it is also possible to explicitly start a background copy task (like a background copy that might be used in a snap operation). The background copy task resolves indirect pointers by copying data from tracks of the log device to the standard logical device. Note that, as tracks are moved from the standard logical device to the log device, tracks of the log device that are not pointed to by other virtual devices are returned to the free list in a manner similar to that discussed above in connection with the steps 386, 388 of FIG. 14. Note also that if a write occurs to an indirect track of the standard logical device that points to a track of the log device, the track containing the data is first copied from the log device to the standard logical device (and possibly returned to the free list of log device tracks) prior to the write being executed. In other embodiments, writes to an indirect track where the data is on the log device may cause the write to be executed directly to the log device track. Following the step 558, processing is complete.

If it is determined that the test step 554 that there are more tracks to be processed, then control passes from the step 554 to a test step 562 where it is determined that if the virtual device track being processed points to the standard logical device. If not (meaning that the track of the virtual device points to the log device), then control transfers from the step 562 to a step 564 where the track of the standard logical device is made to point to the corresponding track of the log device. In that way, a subsequent access to the track of the standard logical device will fetch the data stored on the track of the log device. However, as discussed above, the tracks will be migrated from the log device to the standard logical device so that, eventually, the standard logical device will contain the data that is initially provided on the log device. Note that accessing and modifying tracks of a storage device as discussed herein may require inhibiting access by other processes by, for example, locking the tracks prior to determining the state thereof and/or prior to modifying the tracks. Steps for inhibiting access by other processes are not explicitly shown herein, but it is understood that such steps will be performed when needed.

Following the step 564 is a step 567 where it is determined if the protection bit for the track is set. Since the track of the virtual device points to the log device, it is expected that the protection bit would be clear at this step, in accordance with other processing discussed herein. Thus, if it is determined at the step 567 that the protection bit for the track is set, control passes from the step 567 to a step 568, where error processing is performed. The error processing may include simply logging the error, suspending processing and returning an error indicator, taking steps to correct the error, etc.

If it is determined at the step 567 that the protection bit for the track is not set, or following the step 568, control transfers to a step 572 where the next track of the virtual device is pointed to in order to perform the processing described herein. Following the step 572, control transfers back to the test step 554, discussed above.

If it is determined at the test step 562 that the virtual device track being processed points to the standard logical device, control transfers from the step 562 to a step 574, where it is determined if the protection bit for the track is set. In accordance with other processing discussed herein, it is expected that the protection bit would be set if the virtual device track (table) points to the standard logical device. Thus, if it is determined at the step 574 that the protection bit is not set, control transfers from the step 574 to the step 568, discussed above.

If it is determined at the step 574 that the protection bit is set (as expected), control transfers from the step 574 to a step 578, where the protection bit is cleared so that no special processing will be performed on behalf of the previous standard logical device/virtual device session in connection a write to the track of the standard logical device. Note however that, as discussed below, other types of restore operations may require special processing in connection with writes to tracks of the standard logical device. Following the step 578, control transfers to the step 572 to process the next track.

Figure 22:
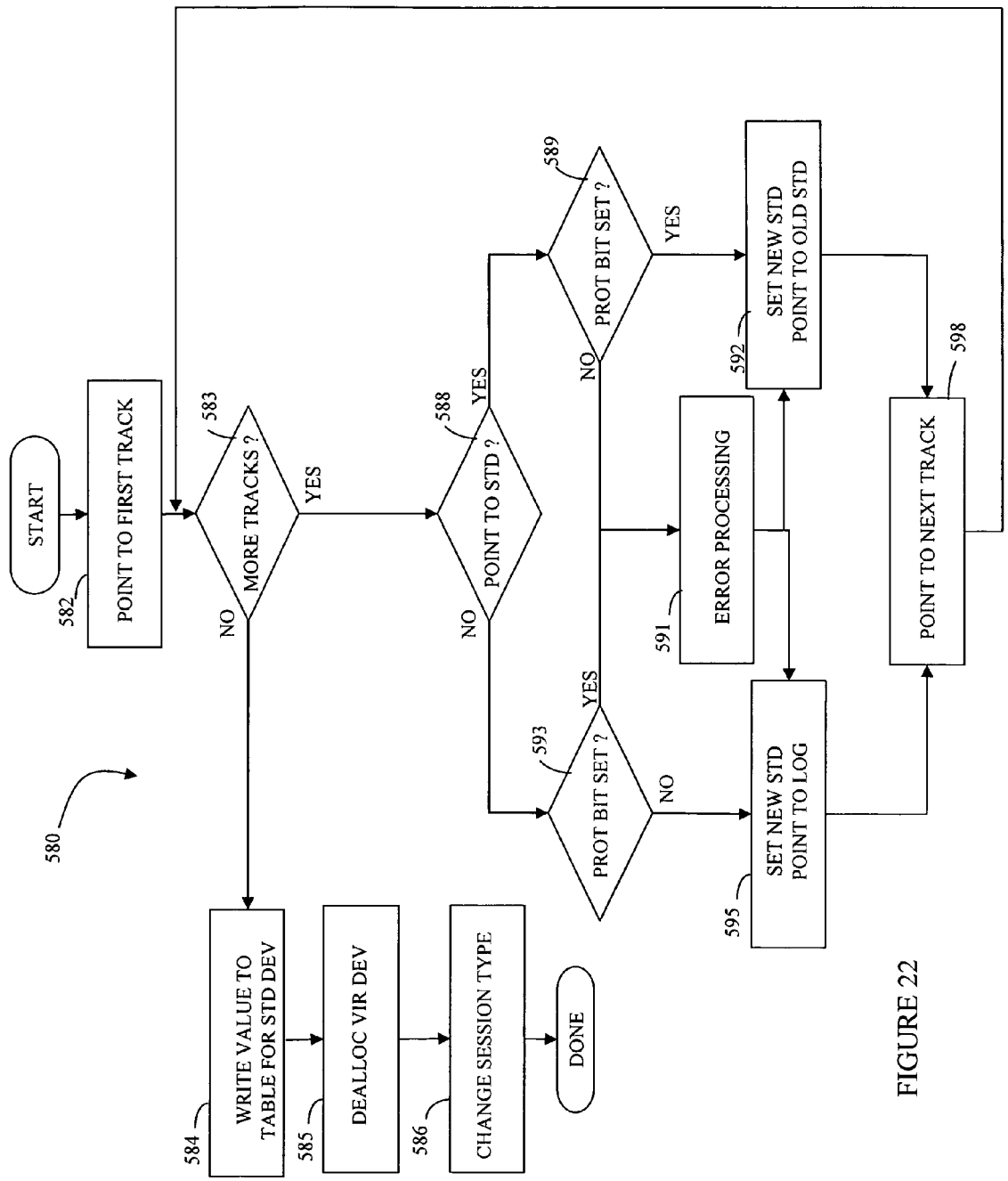
FIG. 22 is a flow chart that illustrates steps performed to restore a virtual logical device to a standard logical device according to a second embodiment of the system described herein.

Referring to FIG. 22, a flow chart 580 illustrates steps performed in connection with restoring a virtual device to a new standard logical device as illustrated in FIG. 20C and discussed above. Processing begins at a first step 582 where a first track of the virtual device is pointed to. Following step 582 is a test step 583 where it is determined if there are more tracks of the virtual device to be processed. If not, then control transfers from the step 583 to a step 584 where a value that indicates that a restore has been performed for the virtual device is written to a portion of the header field of the device table of the standard logical device corresponding to the session that had been used for the virtual device in a manner similar to that discussed above in connection with the step 555. Note, however, that in the case of the flow chart 580, there is no corresponding step for clearing all of the protection bits. This is because, as discussed in more detail below, the protection bits are used after the restore in this embodiment.

Following the step 584 is a step 585 where the virtual device is deallocated in a manner similar to that described above in connection with FIG. 21. Following the step 585 is a step 586 where the session type is changed to facilitate migrating tracks in a manner similar to that discussed above in connection with the step 558. Note in this case, however, that all of the tracks of the new standard logical device are indirect, so that tracks will be migrated from both the log device and the standard logical device that was previously associated with the virtual device that is being restored. However, just as with the embodiment of FIG. 21, free tracks of the log device will be returned to the free list and writes to indirect tracks may cause the track to be copied to resolve the indirection. In other embodiments, writes to an indirect track on the log device may cause the write to be executed directly to the log device track. Following step 586, processing is complete.

If it is determined at the test step 583 that there are more tracks to be processed, then control transfers from the step 583 to a test step 588, where it is determined if the track (table) of the virtual device points to the standard logical device. If so, then control transfers to a test step 589, where it is determined if the protection bit is set for the track. In accordance with the other processing discussed herein, it is expected that the protection bit would be set of the virtual device points to the standard logical device. Accordingly, if it determined at the step 589 that the protection bit is not set, then control transfers from the step 589 to a step 591 where an error processing is provided in a manner similar to that discussed above in connection with the step 568. In some embodiments, the processing at the step 591 includes setting the protection bit to the correct value. If it is determined at the step 589 that the protection bit for the standard logical device is set, or following the step 591, control transfers to a step 592, where the track of the new standard logical device is set to be an indirect pointer to the track of the old standard logical device (i.e., the standard logical device previously established to the virtual device being restored).

If it is determined at the test step 588, that the track (table) of the virtual device does not point to the standard logical device, control transfers to a test step 593, where it is determined if the protection bit is set for the track. In accordance with the other processing discussed herein, it is expected that the protection bit would not be set if the virtual device does not point to the standard logical device (i.e., points to the log device). Accordingly, if it determined at the step 593 that the protection bit is set, then control transfers from the step 593 to the step 591, discussed above. If it is determined at the step 593 that the protection bit for the standard logical device is not set, or following the step 591, control transfers to a step 595, where the track of the new standard logical device is set to be an indirect pointer to the corresponding track of the log device.

Following the step 592 or the step 595 is a step 598 to process the next track of the virtual device. Following the step 598, control transfer back to the step 583, discussed above.

As mentioned above, the protection bits corresponding to the restored virtual device session are not cleared in the embodiment illustrated by FIG. 22. This may be explained with reference to FIGS. 20A and 20C. First, note that some of the tracks of the standard logical device 532 may never have been written to after the virtual device 534 was established, and thus those tracks remain in their original state on the standard logical device 532. When the virtual device 534 is first restored to the new standard logical device 538 as shown in FIG. 20C, those tracks of the standard logical device 532 are indirectly pointed to by corresponding tracks of the standard logical device 538. If a subsequent write to one of those tracks on the standard logical device 532 were to occur prior to the track being copied to the standard logical device 538, then the standard logical device 538, with an indirect reference to the newly written track on the standard logical device 532, would no longer correspond to a restored version of the virtual device 534. However, the set protection bit for the track prevents this. After a restore such as that illustrated in FIG. 20C is performed, a write to a track of the standard logical device 532 having a set protection bit causes the track to first be copied to the standard logical device 538 before the write occurs. Note that, the protection bit for each track may be cleared after each track is copied from the standard logical device 532 to the standard logical device 538, irrespective of whether the copy occurred in connection with the special process caused by the set protection bit or by track migration initiated at the step 588. Thus, once all of the data has been migrated from the standard logical device 532 to the standard logical device 538, all of the protection bits associated with the session are expected to be clear.

Figure 23:
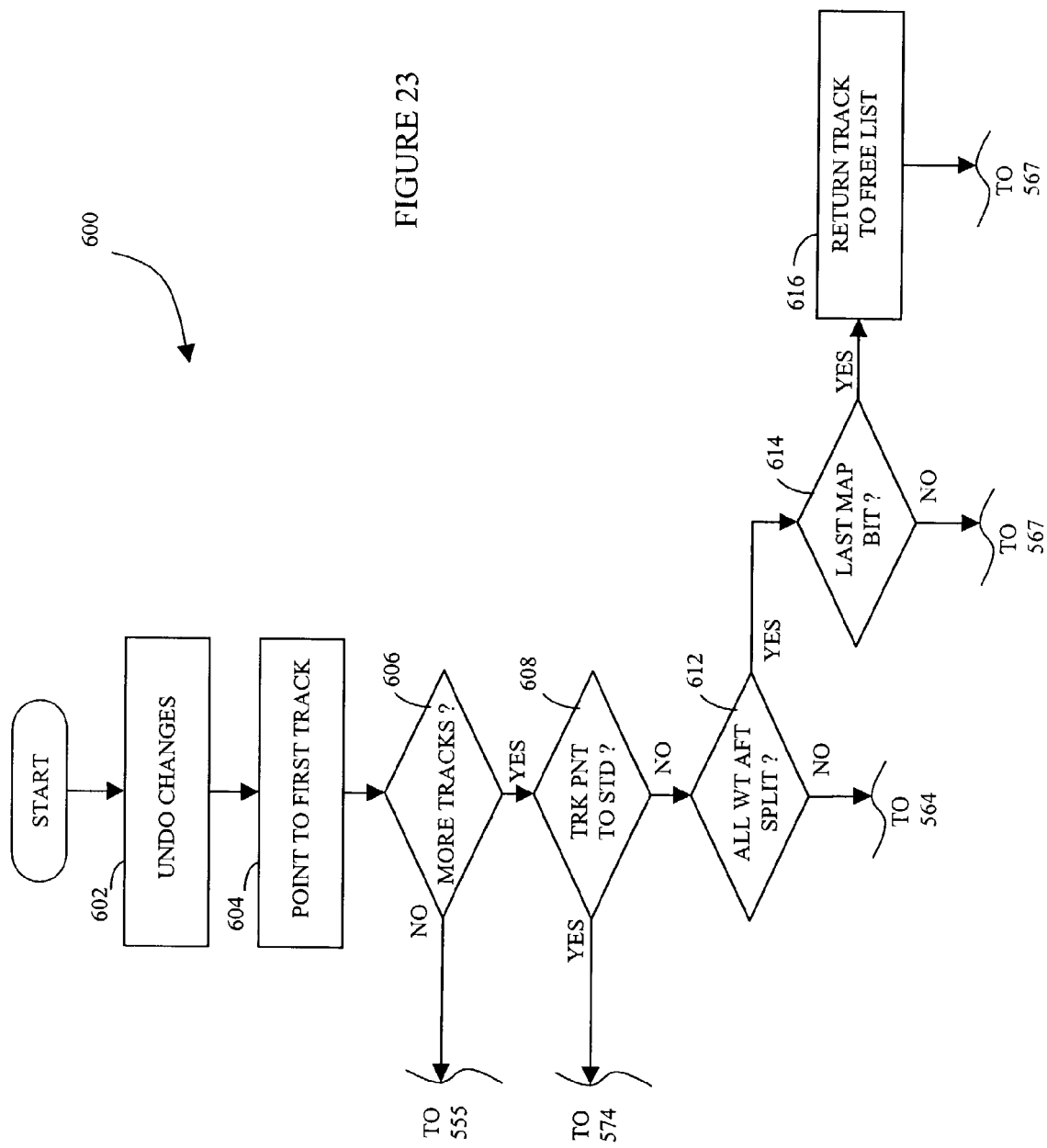
FIG. 23 is a flow chart that illustrates steps performed to restore a virtual logical device to a split mirror standard logical device according to a third embodiment of the system described herein.

Referring to FIG. 23, a partial flow chart 600 illustrates steps performed to restore a virtual device to a mirror logical device, as illustrated above in connection with FIG. 20D. The flow chart 600 illustrates steps performed that are different from those of the flow chart 550 of FIG. 21. Portions of the flow chart 600 which interface and flow into the flow chart 550 (i.e., where the same operations are performed) are shown in FIG. 23 and described herein.

Processing begins at a first step 602 where all changes (e.g., writes) performed on the mirror logical device since the split operation occurred are undone, rendering the mirror logical device substantially identical to the standard logical device at a point in time just prior to the split. For embodiments disclosed herein, a split may occur after the virtual device is established to the standard logical device but before the virtual device is restored. The ability to undo the changes since the split may be provided by the mirror facility that uses feature tracking to log and track the changes that occurred since the split.

Following the step 602 is a step 604, which is like the step 552 of FIG. 21 where a pointer is set to point to the first track of the virtual device. Following the step 604 is a test step 606, which is like the test step 554 of FIG. 21, where it is determined if there are more tracks to be processed. If not, then control transfers to the step 555 of FIG. 21, discussed above. Otherwise, control transfers to a test step 608, which is like the step 562 of FIG. 21, where it is determined if the pointer of the virtual device points to the standard logical device. If so, then control transfers to the step 574 of FIG. 21, discussed above.

If it is determined at the step 608 that the track of the virtual device being processed does not point to the standard logical device (indicating at least one write was performed after the virtual device was established), then control transfers from the step 608 to a step 612, where it is determined if all of the write operations to the track being processed occurred after the mirror logical device was split from the standard logical device. Note that if this is the case, the undo operation at the step 602 will have restored the track of the mirror logical device to the same state as the corresponding track of the standard logical device prior to the virtual device being established.

If it is determined that all writes to the track did not occur after the split, then control transfers from the step 608 to the step 564 of FIG. 21, discussed above, to cause the corresponding track of the mirror logical device to indirectly point to the appropriate track of the log device in a manner similar to that discussed above in connection with FIG. 21. If it is determined at the test step 612 that all writes occurred after the split, then control transfers from the step 612 to a test step 614, where it is determined if the virtual device is the last virtual device (i.e., the only virtual device) pointing to the corresponding track of the log device. If so, then control transfers from the step 614 to a step 616 where the track of the log device is returned to the free list of the log device tracks. The steps 614, 616 are analogous to the steps 386, 388 of FIG. 14, discussed above. Following the step 616, or following the step 614 if the track of the log device is being used by more than one virtual device, is the step 567 of FIG. 21, which tests if the protection bit is in the proper state and then clears the protection bit. In this instance, however, the protection bit on both the standard logical device 532 and the mirror logical device 532' are cleared. Note that transferring to the step 567 causes the track of the mirror logical device to be a direct track for accessing data.

It is useful for host applications that access the storage device to be able to use some of the functionality described herein. For example, a host application may want to create a virtual device to represent a point in time copy of a standard logical device and then run a backup from the virtual device, after which, the virtual device may be deallocated. In other instances, the virtual device may be used to maintain a point in time copy of the data from the standard logical device when software that uses the standard logical device is tested. After the testing period, the point in time copy represented by the virtual device may be restored back in the standard logical device.

Figure 24:
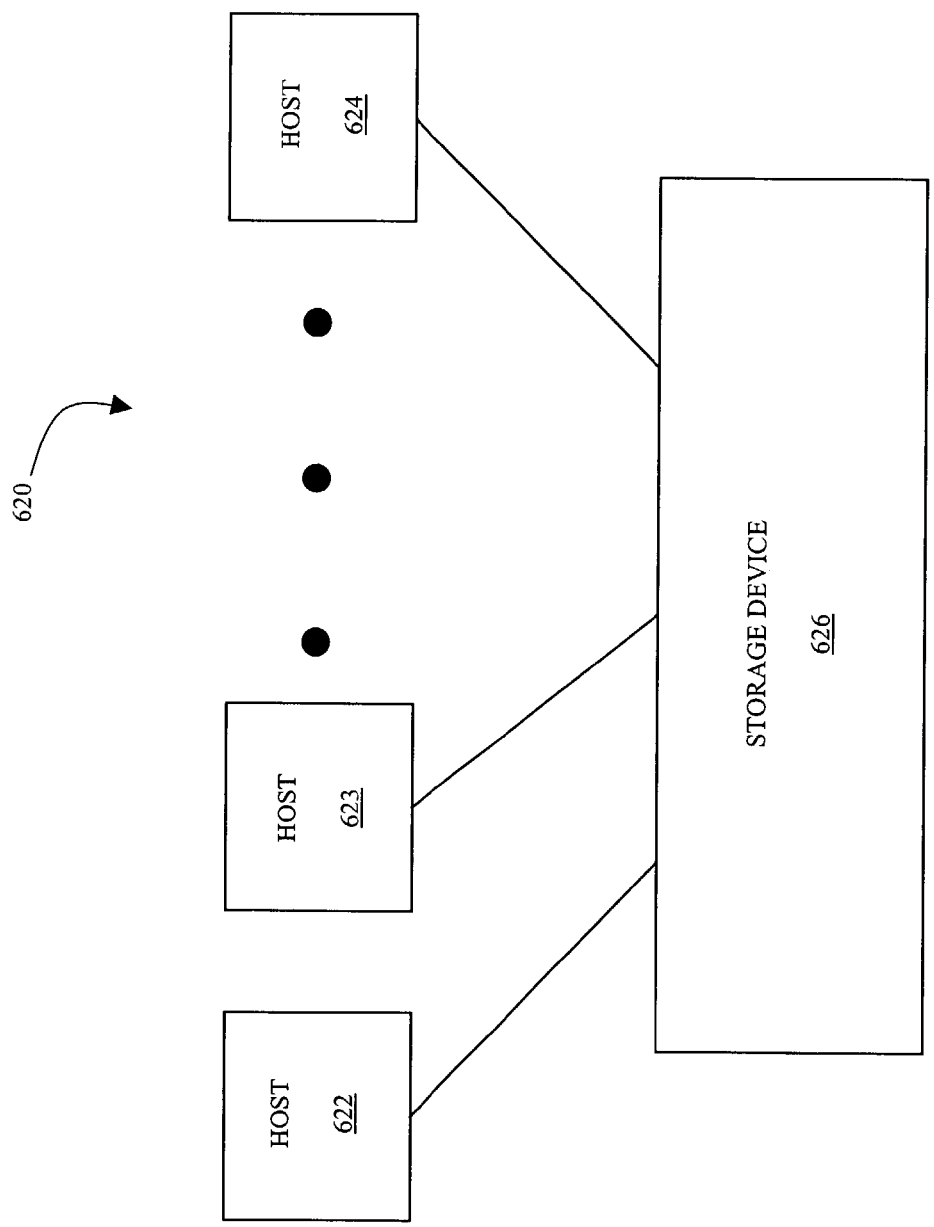
FIG. 24 is a flow chart illustrating interconnects between hosts and a storage device according to the system described herein.

Referring to FIG. 24, a diagram 620 illustrates a plurality of hosts 622-624 that access the storage device 626. Each of the hosts 622-624 may create, establish, deallocate, and restore standard logical device/virtual device pairs as described herein by making system calls to the storage device 626. In an embodiment disclosed herein, applications running on the hosts 622-624 would not directly make the system calls. Rather, an underlying layer of software translates higher level calls from the hosts 622-624 into the appropriate system calls that are provided to the storage device 626. For example, the host 622 may have an application that establishes a standard logical device/virtual device pair by calling an Establish routine that will ultimately cause the appropriate system calls (e.g., Register, Relate, and Activate) to be called using, for example, a library linked to the application running on the host 622, an operating system routine that runs on the host 622, or some other appropriate mechanism.

The parameters passed to the Establish routine may include one or more standard logical device/virtual device pairs as well as one or more optional name change parameters (discussed above) and one or more online/offline indicators that determine whether a newly-established virtual device will be on line or off line as discussed above. In some embodiments, an Establish routine called from an application will only accept one standard logical device/virtual device pair. In other embodiments, an Establish routine will accept multiple standard logical device/virtual device pairs (e.g., a list or list id as discussed above). In embodiments that accept multiple standard logical device/virtual device pairs, the underlying system calls may or may not cause the virtual devices to be established synchronously in the manner discussed elsewhere herein. In some cases, it may be possible for a host to handle synchronously establish multiple standard logical device/virtual device pairs by, for example, using the mechanism disclosed in U.S. patent application Ser. No. 10/134,420 U.S. Pat. No. 6,983,353 filed on Apr. 29, 2002, which is incorporated herein by reference, to establish appropriate consistency groups to cause synchronization of the activate operation. In addition, it may be possible to synchronously establish a plurality of pairs by the host simply waiting for all pairs to be established before performing operations on any of the devices that are part of the pairs. In some embodiments, the Establish routine may be passed one or more standard logical devices and corresponding virtual devices that are created and/or obtained by the establish routine.

Figure 25:
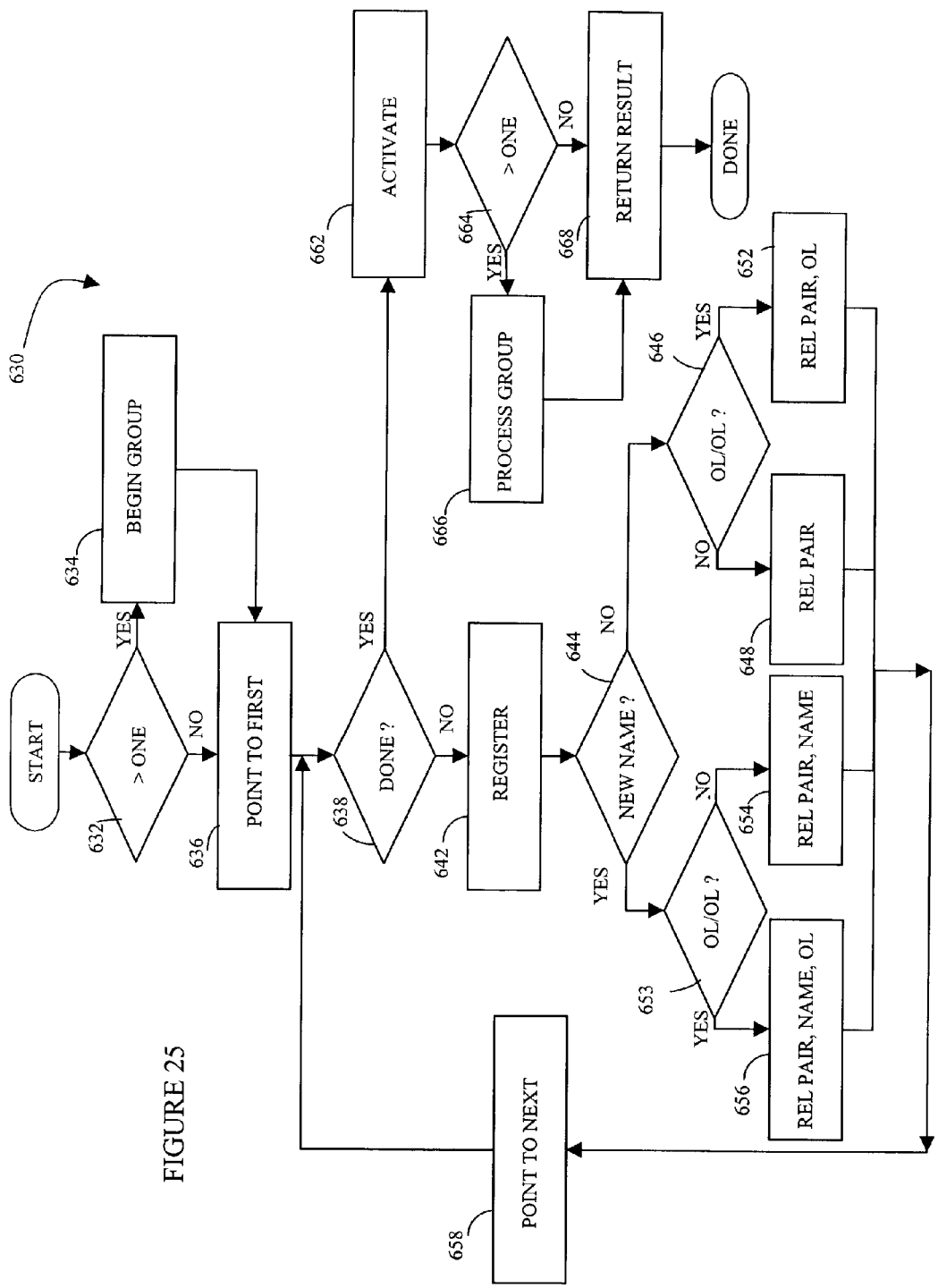
FIG. 25 is a flow chart illustrating a host application call to establish a standard logical device/virtual device pair according to the system described herein.

Referring to FIG. 25, a flow chart 630 illustrates steps performed by an Establish routine that translates a higher level application call for establishing one or more standard logical device/virtual device pairs into appropriate system calls that can be made to the storage device 626. The translation may be performed in library code linked to the application itself, by the operating system on one of the host devices 622-624, or by using any other appropriate mechanism that translates high level host application calls to system calls.

Processing begins at a first step 632 where it is determined if more than one standard logical device/virtual device pair is being established. As discussed above, it is possible in some embodiments to establish more then one standard logical device/virtual device pair in a single call and, in some embodiments, in a way that causes all of the virtual devices to be activated synchronously. If it is determined at the test step 632 that more than one standard logical device/virtual device pair is being established, then control passes from the step 632 to a step 634 where a Begin Group call is performed to create the list of standard logical device/virtual device pairs discussed above. Note that it is possible to synchronously process and establish multiple standard logical device/virtual device pairs without using Begin Group and Process Group, as described above. In those cases, another appropriate mechanism, such as one or more of those discussed above (e.g., lists, list ids), may be invoked at the step 634 to cause multiple standard logical device/virtual device pairs to be established simultaneously. Alternatively still, it may be possible to establish appropriate consistency groups as described in U.S. patent application Ser. No. 10/134,420 U.S. Pat. No. 6,983,353, referenced above and use the consistency group mechanisms to activate multiple pairs synchronously.

If it is determined at the step 632 that only one standard logical device/virtual device pair is to be established, or following the step 634, is step 636 where the first standard logical device/virtual device pair is pointed to in order to facilitate processing thereof. In some embodiments, each standard logical device/virtual device pair is stored in a data structure (containing possibly other optional parameters, such as a new name and/or an online/offline specifier). The data structures may be linked together in a linked list. Thus, the pointer set at the step 636 and used for follow on processing is provided to traverse the list. In embodiments where the Establish routine creates or otherwise provides corresponding virtual device(s), data location(s) may be passed to the Establish routine, which places one or more appropriate virtual device identifiers in the location(s).

Following step 636 is the step 638 which determines if processing of the list of passed parameters is complete (e.g., if the pointer points to the end of the list). Of course, on the first iteration, the result of the test of the step 638 are expected to indicate that processing is not complete. If it is determined at the test step 638 that not all of the standard logical device/virtual device pairs (or, in some embodiments, just standard logical devices) have been processed, then control transfer from the step 638 to a step 642 to invoke the Register routine, discussed above.

Following the step 642 is a test step 644 where it is determined if an optional new name has been specified. If it is determined at the test step 644 that an optional new name has not been provided, then control transfers from the step 644 to a test step 646 which determines if an optional online/offline boolean parameter has been provided. As discussed above, the online/offline option allows the calling routine to determine whether the virtual device that is being established will be online (become available to the host) or offline (not available to the host) upon being established. If it is determined at the test step 646 that an online/offline parameters is not being provided, then control passes from the test step 646 to a step 648 where a Relate system call is provided to relate the standard logical device/virtual device pair.

If it is determined at the test step 646 that an optional online/offline parameter has been provided, then control transfers from the step 646 to a step 652 where the Relate system call is made. However, at the step 652, the online/offline parameters may also be passed by the system call to indicate whether the virtual device should be made online or offline at the time of establishment.

If it is determined at the test step 644 that a new name for the virtual device has been provided, then control transfers from the step 644 to a step 653 where it is determined if an optional online/offline parameter has been provided. If it is determined at the test step 655 that an optional online/offline parameters is not being provided, then control transfers from the step 653 to a step 654 to provide a system call to Relate the pair along with the new name parameter, as discussed above.

If it is determined at the test step 653 that an optional online/offline parameter has been provided in connection with the standard logical device/virtual device pair, then control transfers from the step 653 to a step 656 where the pair is related along with the new name for the virtual device and with an indication of whether the virtual device will be online or offline upon establishment.

Following each of the steps 648, 652, 654, 656, is a step 658 where the pointer set at the step 636 is made to point to the next standard logical device/virtual device pair, if any. Following step 658, control transfers back to the test up 638 to determine if all of the standard logical device/virtual device pairs have been processed.

If it is determined at the test step 638 that all the standard logical devices/virtual device pairs have been processed, than control transfers from the step 638 to a step 662 where an Activate system call is provided for each of the pairs (or, for different embodiments discussed above, Activate may be called for all of the pairs). Following step 662 is a step 664 where it is determined if there is more than one standard logical device/virtual device pair. If so, then controlled transfers from the step 664 to a step 666 where a Process Group call is made. Just as with the step 634 where Begin Group has been called, the step 666 may represent another mechanism to synchronously establish multiple standard logical device/virtual device pairs. In some embodiments, the routine performing the processing illustrated by the flow chart 630 keeps track of a list of standard logical device/virtual device pairs, in which case the entire list (or a list id, as discussed above) may be passed to the Activate routine, as discussed above. In other embodiments, a consistency group is formed, as described in U.S. patent application Ser. No. 10/134,420 U.S. Pat. No. 6,983,353, mentioned above.

Following the step 666 or following the step 664 if there is only one standard logical device/virtual device pair, is a step 668 where the result of performing the processing set forth in the previous steps is returned to the calling routine (e.g., success or failure and, in some embodiments, identifiers for the newly established virtual devices). Following the step 668, processing is complete.

It is also possible to provide a Restore routine that is called from an application at one of the hosts 622-624 where the Restore routine takes, as parameters, one or more standard logical device/virtual device pairs as well as optional names for renaming the standard logical device(s) to which the virtual devices(s) are restored and optional online/offline boolean values indicating whether the standard logical device(s) will be online or offline. The parameters may be passed in a linked list in a manner similar to that discussed above in connection with the Establish routine. Note also that, in the case of the Restore routine, the standard logical device of a standard logical device/virtual device pair may be the same standard logical device to which the virtual device was established or could be a different standard logical device or a mirror logical device, as discussed above. Also as discussed above, a virtual device may be restored to another virtual device.

Figure 26:
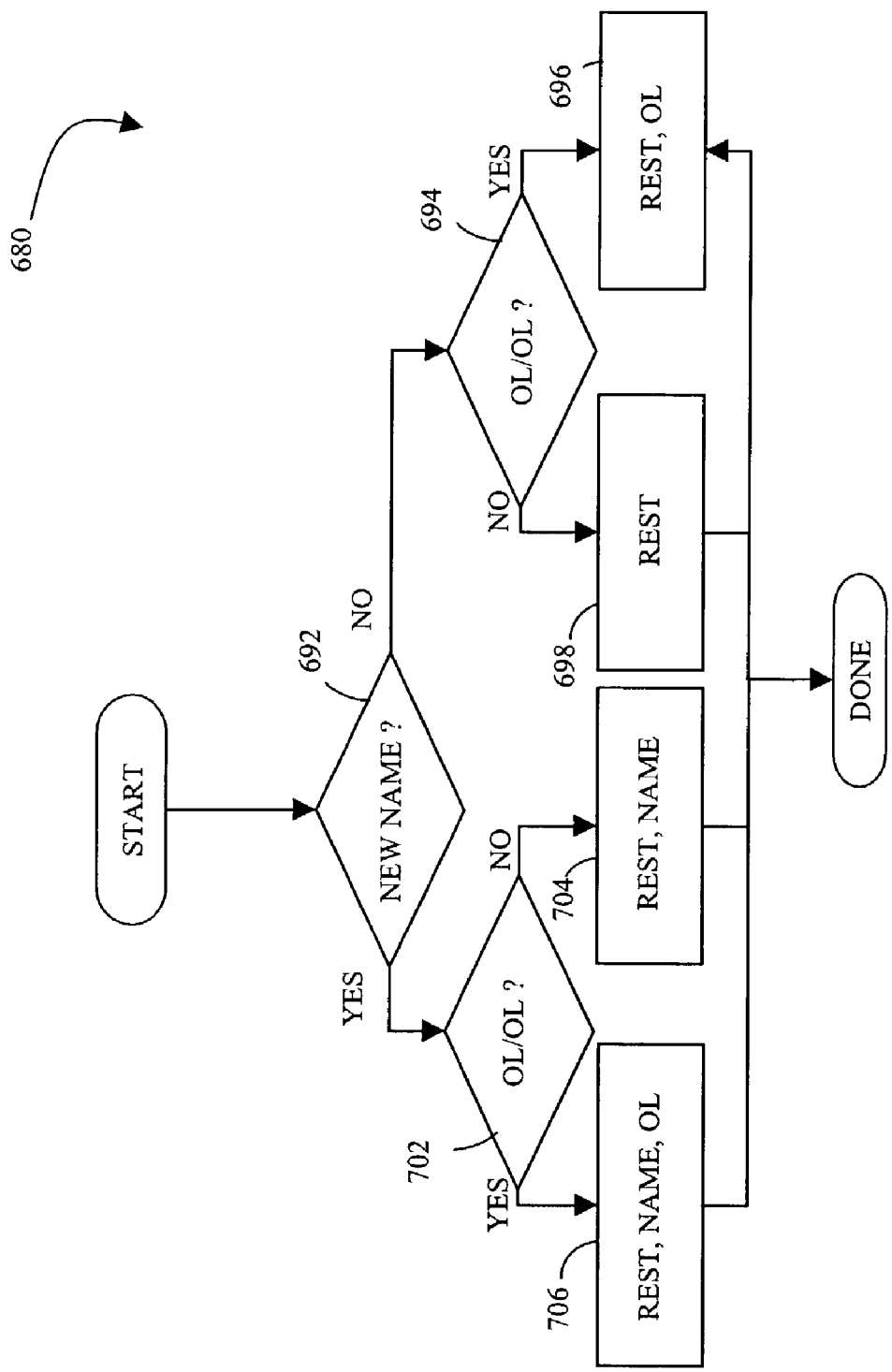
FIG. 26 is a flow chart illustrating a host application call to restore a virtual device to a standard logical device according to the system described herein.

Referring to FIG. 26, a flow chart 680 illustrates steps performed in connection with a host application calling a Restore routine to restore a virtual device as illustrated in FIGS. 20B, 20C, 20D, 20E. Processing begins at a first step 692 where it is determined if an optional new name has been provided as a parameter to the Restore routine. As discussed above, in some instances it is possible to restore a virtual device to a standard logical device or to a new virtual device and, at the same time, provide the standard logical device or new virtual device with a different name than that associated with the old virtual device. If it is determined at the test step 692 that a new name has not been provided, then control transfers from the step 692 to a test step 694 where it is determined if an optional online/offline parameter has been provided. As discussed above, in some instances it is possible to restore a virtual device to a standard logical device or new virtual device while, at the same time, making the standard logical device or new virtual device not available to the host (offline).

If it is determined at the test step 694 that an optional online/offline parameter has not been provided, then control transfers from the step 694 to a step 696 where the virtual device is restored by making a Restore system call, as discussed above. Alternatively, if it is determined at the test step 694 that an optional online/offline parameter has been provided, then control transfers from the test step 694 to a step 698 where a Restore system call is provided with the optional online/offline parameter.

If it is determined at the test step 692 that a new name has been provided to the Restore routine, then control transfers from the step 692 to a test step 702 where it is determined if an optional online/offline parameter has also been provided. If not, then control transfers from the test step 702 to a step 704 where a Restore system call is provided, along with the new name of the standard logical device or new virtual device, to restore the virtual device. If it is determined that the test step 702 that an optional online/offline parameter has been provided, then control transfers from the test step 702 to a step 706 where a Restore system call is performed with the new name and online/offline parameter. Following any of the steps 696, 698, 704, 706, processing is complete.

In some instances, it may be desirable to deactivate (rather than deallocate) a virtual device such that, while the virtual device is no longer accessible, the tracks written to the log device in connection with using the virtual device are still available. That is, a call to deactivate a virtual device makes the virtual device not ready to any host that attempts to access it and causes writes to the corresponding standard logical device to not result in any special processing such as that discussed above. In effect, a deactivated virtual device represents the tracks of the corresponding standard logical device that changed from the time that the virtual device was established until the time that the virtual device was deactivated. For example, if a virtual device was established at noon and deactivated at 6 p.m., then the tracks of the log device pointed to by the table of the deactivated virtual device represent only those tracks of the standard logical device that changed between noon and 6 p.m.

Figure 27:
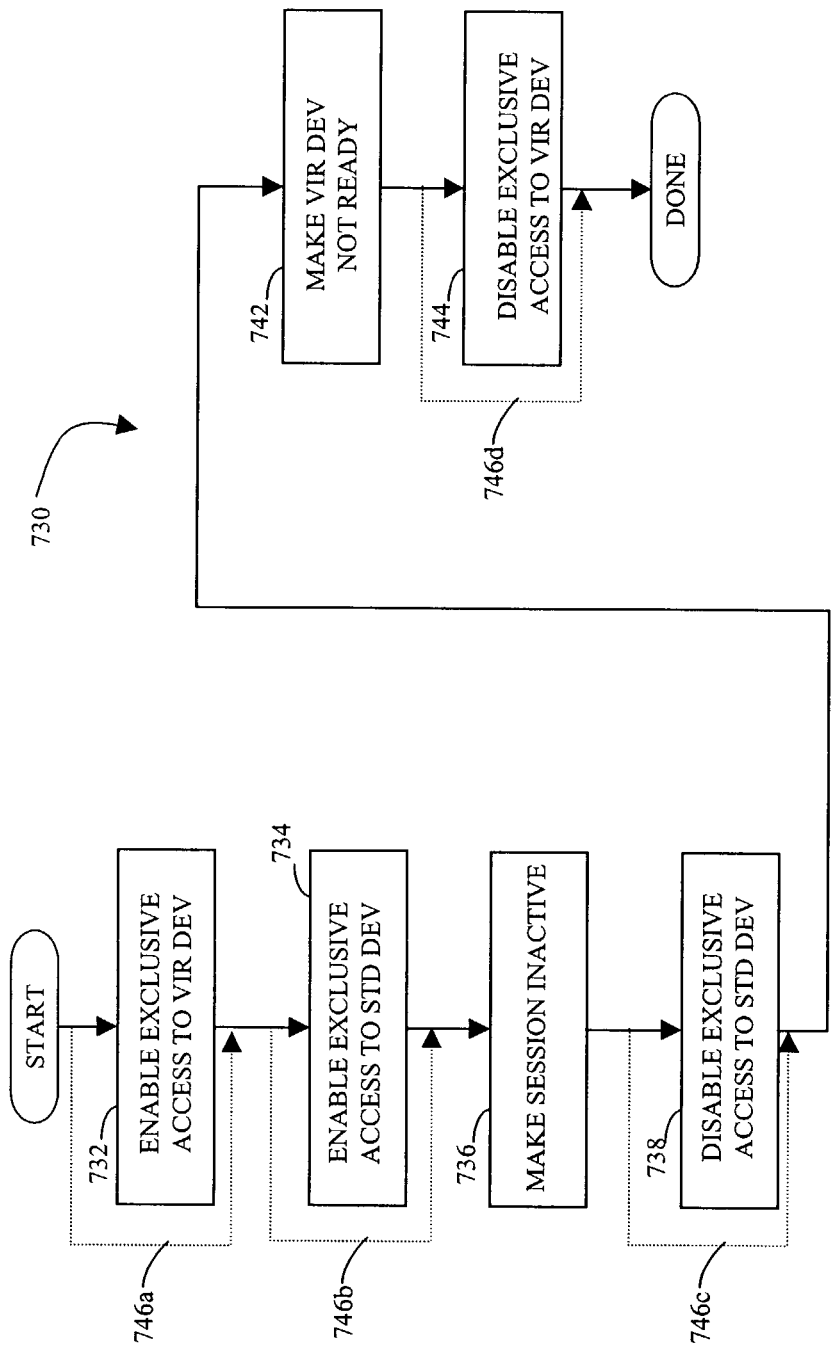
FIG. 27 is a flow chart illustrating deactivating a virtual device according to the system described herein.

Referring to FIG. 27, a flow chart 730 illustrates steps performed in connection with deactivating a virtual device. Processing begins at a first step 732 where exclusive access to appropriate resources (e.g., the virtual device) is enabled in a manner similar to that discussed above in connection with FIGS. 15B and 15C. Following the step 732 is a step 734 where exclusive access to appropriate resources (e.g., the corresponding standard logical device) is enabled in a manner similar to that discussed above in connection with FIGS. 15B and 15C.

Following the step 734 is a step 736 where the session corresponding to the standard logical/virtual device pair is made inactive by, for example, writing an appropriate value to the device header field. Following this, any writes to the standard logical device will not cause any special processing to occur. This effectively freezes the changes to the virtual device.

Following the step 736 is a step 738 where exclusive access to appropriate resources of the standard logical device is disabled in a manner similar to that discussed above. Note that since the session is made inactive at the step 736, any subsequent writes to the standard logical device will not effect the virtual device. Following the step 738 is a step 742 where the virtual device is made not ready. Making the virtual device not ready at the step 742 will prevent the virtual device from being modified by, for example, a host. However, the table corresponding to the virtual device is maintained in order to provide access to the tracks of the log device corresponding to the virtual device. In other embodiments, it is possible to read the tracks of the log device through the virtual device (i.e., read the virtual device) by making the virtual device not ready for writes only at the step 742 in conjunction with making the session inactive at the step 736.

Following the step 742 is a step 744 where exclusive access to appropriate resources of the standard logical device is disabled in a manner similar to that discussed above. Note, however, that the processing at the step 744 does not facilitate access (or at least write access) by any host device to the virtual device, since the virtual device was made not ready at the step 742. In addition, the processing at the step 744 does not cause data from the corresponding standard logical device to be written to the virtual device since, as described above, the session was made inactive at the step 736 in order to prevent further manipulation of the virtual device on account of the standard logical device. Following the step 744, processing is complete.

Note that, just as with FIGS. 15B and 15C, for some embodiments it may not be necessary to enable and disable exclusive access to the resources used in connection with one or more of the steps 736, 742. This is illustrated by alternative paths 746a-746d.

A host application may access the tracks of the log device corresponding to the deactivated virtual device by making two system calls. The first system call reads the protection bits for the standard logical device, and thus provides information as to which tracks of the virtual device point to the log device, and thus correspond to tracks modified in between the time that the virtual device is established and the virtual device is deactivated. That is, for any protection bit of the standard logical device that is set, there is no corresponding track of the deactivated virtual device that points to the log device. Conversely, if a bit for a track of the standard logical device is clear, thus indicating that a write to the track occurred after the virtual device was established but before the virtual device was deactivated, then there is a corresponding track on the log device pointed to by the deactivated virtual device. This system call would pass as a parameter an identifier for a track and would receive back the state of the protection bit for the track. Alternatively, the system call could be passed a pointer to a data structure for storing the state of a range of tracks (including all the tracks) that are filled in and returned to the calling routine.

Another system call would allow reading of saved tracks corresponding to a deactivated virtual device. The routine for reading of save tracks of a deactivated virtual device would take, as parameters, an identifier for the virtual device and a track identifier indicating which track is to be read. Note that one possible mechanism for reading log tracks corresponding to a deactivated virtual device is to have the virtual device be not ready for writing only and to deactivate the session corresponding to the virtual device. In such a case, the log tracks may be accessed through the virtual device by reading the virtual device.

Figure 28:
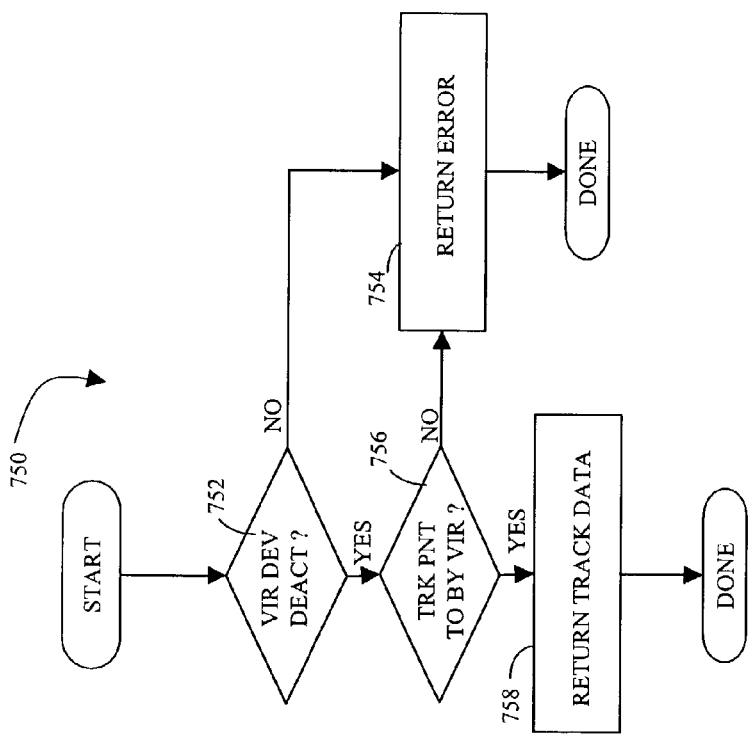
FIG. 28 is a flow chart illustrating obtaining data for deactivated from tracks of a deactivated virtual device according to the system described herein.

Referring to FIG. 28, a flow chart 750 illustrates steps performed in an embodiment that reads a track of a deactivated virtual device. Processing begins at a first step 752 where it is determined if the virtual device passed as a parameter to the routine for reading tracks corresponding to deactivated virtual devices is in fact a deactivated virtual device. If not, then control passes from the step 752 to a step 754 where an error is returned to the calling routine. Following the step 754, processing is complete.

If it is determined at the step 752 that the virtual device identifier that is passed by the calling routine corresponds to a deactivated virtual device, then control passes from the step 752 to a step 756 where it is determined if the requested track corresponds to a track on the virtual device that points to the log device. As discussed above, only some of the tracks of the virtual device will correspond to a track of the log device (i.e., tracks that correspond to tracks of the standard logical device that were written after the virtual device was established and before the virtual device is deactivated). Tracks which have not been written to in between the time that the virtual device is established and the virtual device is deactivated will not be pointed to on the log device by the virtual device. Thus, if it is determined at the step 756 that the track identifier passed by the calling routine does not correspond to a track pointed to by the virtual device, then control passes from the step 756 to the step 754 where an error is returned, as discussed above. Otherwise, if it is determined at the step 756 that the track is pointed to by the virtual device, then control passes from the step 756 to a step 758 where the requested track data is returned. Following the step 758, processing is complete. Note that, for some embodiments, it may be possible to request data from a plurality of tracks with one call.

At some point, it may be useful to deallocate a deactivated virtual device. In that case, it would be possible to invoke the routine which is discussed above in connection with the flow chart 370 of FIG. 14. Note that the steps shown in the flow chart 370 are the same as those that would be executed to deallocate a deactivated virtual device.

In some instances, it is useful to be able to obtain data that existed on a computer system at a particular time in the past. In systems where daily backups are made and saved, it may be possible to request a file or a set of files from a particular day. However, in some cases, the granularity of one day is not sufficient for certain applications. In addition, such a system may require saving an entire system's worth of data every day, which may be considerable. In other cases, it may only be necessary to provide incremental backups. However, incremental backups typically require that the data be first backed up completely and then, going forward, only files that have changed since the complete backup or the most recent incremental backup are saved. A difficulty with this is that entire files are saved even though, in some cases, only one track of a file may have changed. In addition, retrieving a file from a particular day may require restoring the entire file and then rolling the system forward. It would be desirable in some cases instead to be able to start with the current state of the system and be able to work backwards.

Figure 29:
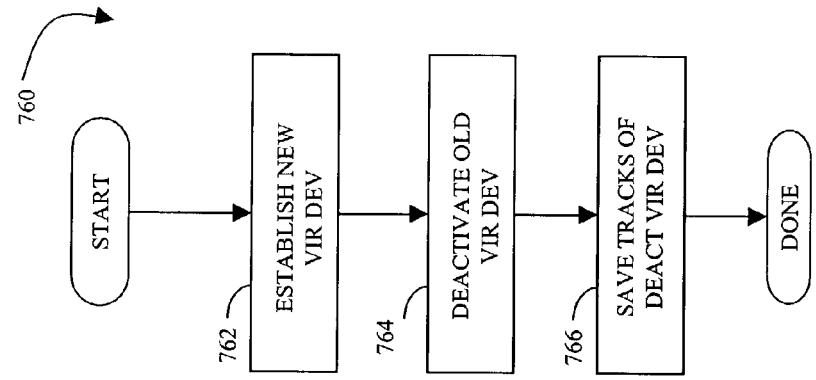
FIG. 29 is a flow chart illustrating steps performed in connection with providing a rolling back up according to the system described herein.

Referring to FIG. 29, a flow chart 760 illustrates a backup system that uses virtual devices to provide track level incremental backups. The steps of the flow chart 760 may be performed by a host system running a host application. Processing begins at a first step 762 where a new virtual device is established to a standard logical device that is the subject of the backup. Following the step 762 is a step 764 where an old virtual device that had been previously established to the standard logical is deactivated. Following the step 764 is a step 766 where the tracks corresponding to the old virtual device are saved. Saving the tracks may involve collecting the tracks pointed to by the deactivated virtual device (i.e., tracks that were modified in between the time that the virtual device was established and the time that the virtual device was deactivated) using, for example, the mechanism discussed above. The tracks may be saved by indicating a corresponding source track of the standard logical device (which, as discussed above, is saved with each track of the log device). Other information that may be saved may include a time stamp or an identifier indicating which backup session the saved tracks are from.

The steps of the flow chart 760 may be run every incremental period such as every six hours. Thus, a user wishing to have a version of a file from one of those six hour increments would be able to do so, as discussed below. Note also that it is possible in some embodiments to deallocate the deactivated virtual device after executing the step 766.

Figure 30:
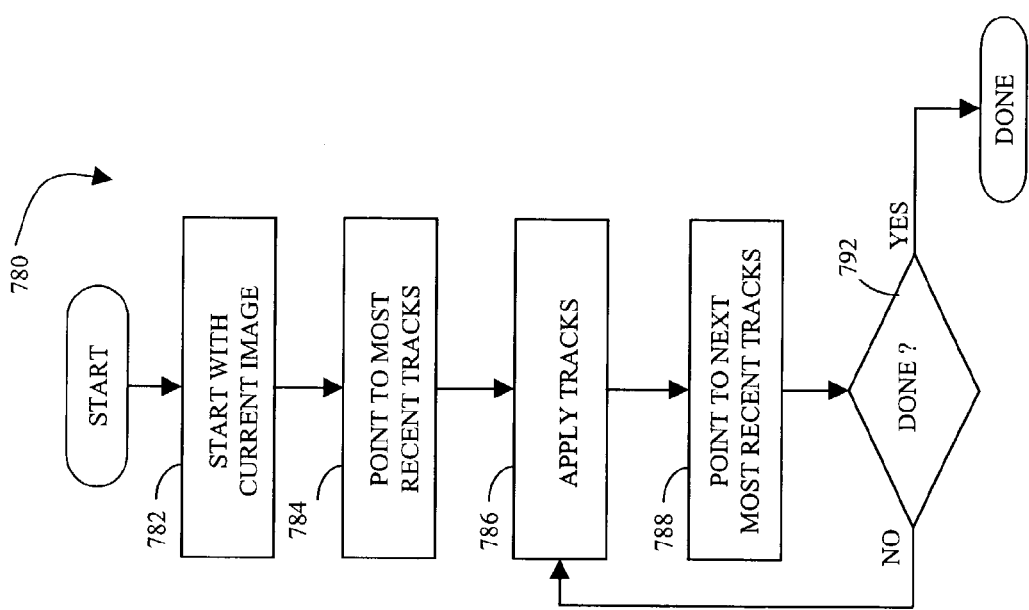
FIG. 30 is a flow chart illustrating restoring data from a rolling back up according to the system described herein.

Referring to FIG. 30, a flow chart 780 illustrates steps performed in connection with restoring data using the tracks saved in connection with the flow chart 760 of FIG. 29. The steps of the flow chart 780 may be performed by a host system running a host application. Processing begins at a first step 782 which starts with the current data image. Following step 782 is a step 784 where a pointer is set to point to the most recent tracks that have been saved. Following step 784 is a step 786 where the tracks that are pointed to are applied to the image. The step 786 represents copying saved tracks to the image to roll the image back to its state at an earlier time.

Following the step 786 is a step 788 where the pointer is made to point to the next most recent set of saved tracks. Following the step 788 is a test step 792 where it is determined if processing is complete (i.e., if the rolling backup has worked backwards to the desired time). If it is determined at the step 792 that processing is not complete, then control transfers back to the step 786. Otherwise, it may be determined at the step 792 that processing is complete.

While the invention has been disclosed in connection with various embodiments, modifications thereon will be readily apparent to those skilled in the art. Accordingly, the spirit and scope of the invention is set forth in the following claims.

What is claimed is:

1. A computer implemented method of handling data, comprising:
   providing a first storage area of a first type that contains sections of data;
   copying sections of data from the first storage area to a second storage area of the first type, wherein the second storage area is separate from the first storage area;
   providing a third storage area of a second type wherein the second type has, for each section thereof, a pointer to one of: a corresponding section of data of the first storage area and a corresponding section of data of the second storage area and wherein the third storage area is separate from the first storage area and the second storage area;
   causing the third storage area to be not available for accessing; and
   after causing the third storage area to not be available for accessing, providing data from the second storage area corresponding to pointers of the third storage area that point to sections of the second storage area.

2. A method, according to claim 1, further comprising:
   after providing the storage areas and prior to causing the third storage area to not be available, handling a write to a particular section of the first storage area pointed to by a corresponding pointer of the third storage area by copying data from the particular section of the first storage area to a corresponding section of the second storage area and adjusting the corresponding pointer of the third storage area to point to the corresponding section of the second storage area.

3. A method, according to claim 2, further comprising:
   after causing the third storage area to not be available, handling a write to a particular section of the first storage area by writing the data thereto.

4. A method, according to claim 2, wherein causing the third storage area to not be available includes providing a value in a header for the first storage area, wherein the value indicates that no operation is to be performed in connection with a set protection bit encountered when data is written to a corresponding section of the first storage area.

5. A method, according to claim 4, further comprising:
   inhibiting access to the first storage area prior to providing the value to the header; and
   allowing access to the first storage area after providing the value to the header.

6. A method, according to claim 1, wherein the storage areas are devices.

7. A computer implemented method of retrieving requested data from a virtual storage area, comprising:
- determining if the virtual storage area is deactivated, wherein the virtual storage area contains pointers to sections of data of a logical storage area and wherein, in response to a write to a section of the logical storage area, data is copied from the logical storage area to an other area and the virtual storage area is adjusted to point to the other area;
- if the virtual storage area is not deactivated, then providing the requested data using the virtual storage area; and
- if the virtual storage area is deactivated and the requested data corresponds to data handled by the virtual storage area prior to being deactivated, then providing the requested data from the other area.

8. A method, according to claim 7, wherein determining if the requested data corresponds to data handled by the virtual storage area prior to being deactivated includes examining protection bits of a corresponding standard logical storage area.

9. A method, according to claim 8, wherein the storage areas are devices.

10. A method, according to claim 7, wherein providing the requested data includes reading the virtual storage area.

11. A computer implemented method of restoring data to a previous version, comprising:
- providing a virtual storage area containing pointers to sections of data of a logical storage area;
- in response to a write to a section of the logical storage area, copying data from the logical storage area to an other area containing archived sections of data and causing the virtual storage area to point to the other area;
- obtaining a current version of the data;
- obtaining previously archived sections of the data; and
- iteratively applying the previously archived sections of data to the current version and to resulting intermediate versions until the data corresponds to the previous version of the data.

12. A method, according to claim 11, wherein previously archived sections correspond to versions of the sections that existed prior to archiving.

13. Computer software, provided in a computer readable storage medium, the computer software comprising executable code that causes a computing device or processor to handle data used in connection with a first storage area of a first type that contains sections of data, a second storage area of the first type, wherein the second storage area is separate from the first storage area, and a third storage area of a second type wherein the second type has, for each section thereof, a pointer to one of: a corresponding section of data of the first storage area and a corresponding section of data of the second storage area and wherein the third storage area is separate from the first storage area and the second storage area, the software comprising executable code that copies sections of data from the first storage area to the second storage area;
- executable code that causes the third storage area to be not available for accessing; and
- executable code that, after the third storage area is not available for accessing, provides data from the second storage area corresponding to pointers of the third storage area that point to sections of the second storage area.

14. Computer software, according to claim 13, wherein executable code that causes the third storage area to not be available includes executable code that provides a value in a header for the first storage area, wherein the value indicates that no operation is to be performed in connection with a set protection bit encountered when data is written to a corresponding section of the first storage area.

15. Computer software, provided in a computer readable storage medium, the computer software comprising executable code that causes a computing device or processor to retrieve requested data from a virtual storage area, the software comprising:
- executable code that determines if the virtual storage area is deactivated, wherein the virtual storage area contains pointers to sections of data of a logical storage area and wherein, in response to a write to a section of the logical storage area, data is copied from the logical storage area to an other area and the virtual storage area is adjusted to point to the other area;
- executable code that, if the virtual storage area is deactivated, then determines if the requested data corresponds to data handled by the virtual storage area prior to being deactivated; and
- executable code that, if the requested data corresponds to data handled by the virtual storage area prior to being deactivated, then provides the requested data from the other area.

16. Computer software, according to claim 15, further comprising:
- executable code that examines protection bits of a corresponding standard logical storage area.

17. Computer software, according to claim 15, further comprising:
- executable code that reads the virtual storage area.

18. Computer software, provided in a computer readable storage medium, the computer software comprising executable code that causes a computing device or processor to restore data to a previous version using a virtual storage area that contains pointers to sections of a logical storage area, the software comprising:
- executable code that copies data from the logical storage area to an other area that contains archived sections of data and causes the virtual storage area to point to the other area in response to a write to a section of the logical storage area;
- executable code that obtains a current version of the data;
- executable code that obtains previously archived sections of the data; and
- executable code that iteratively applies the previously archived sections of data to the current version and to resulting intermediate versions until the data corresponds to the previous version of the data.

19. Computer software, according to claim 18, wherein previously archived sections correspond to versions of the sections that existed prior to archiving.

* * * * *